(12) United States Patent
Lisseman et al.

(10) Patent No.: US 11,208,037 B2
(45) Date of Patent: Dec. 28, 2021

(54) VEHICLE ILLUMINATION SYSTEMS AND METHODS

(71) Applicant: JOYSON SAFETY SYSTEMS ACQUISITION LLC, Auburn Hills, MI (US)

(72) Inventors: Jason Lisseman, Shelby Township, MI (US); Adorian Marc, Troy, MI (US); Erick Staszak, Clarkston, MI (US); Valerie Gardner, St. Clair Township, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 16/915,330

(22) Filed: Jun. 29, 2020

(65) Prior Publication Data

US 2020/0406817 A1 Dec. 31, 2020

Related U.S. Application Data

(63) Continuation of application No. 15/862,437, filed on Jan. 4, 2018, now Pat. No. 10,696,217.
(Continued)

(51) Int. Cl.
*B60Q 3/283* (2017.01)
*B60Q 3/64* (2017.01)
(Continued)

(52) U.S. Cl.
CPC .............. *B60Q 3/283* (2017.02); *B60K 35/00* (2013.01); *B60Q 3/14* (2017.02); *B60Q 3/64* (2017.02);
(Continued)

(58) Field of Classification Search
CPC . B60Q 3/14; B60Q 3/283; B60Q 3/64; B60Q 3/80; B60Q 9/008; G02B 6/0036;
(Continued)

(56) References Cited

U.S. PATENT DOCUMENTS

| 2,825,567 A | 3/1958 | Simons et al. |
| 3,485,974 A | 12/1969 | Prentice et al. |

(Continued)

FOREIGN PATENT DOCUMENTS

| CN | 101639181 A | 2/2010 |
| CN | 201487849 U | 5/2010 |

(Continued)

OTHER PUBLICATIONS

International Preliminary Report on Patentability, dated Sep. 8, 2020, received in connection with International Patent Application No. PCT/US2019/021411.
(Continued)

*Primary Examiner* — Thomas M Sember
(74) *Attorney, Agent, or Firm* — Meunier Carlin & Curfman LLC

(57) ABSTRACT

Various implementations of illumination systems are described herein. For example, the illumination system includes a light guide having an outer surface and an inner surface that extend between a first end and a second end of the light guide, and at least one light source disposed adjacent the first end of the light guide. The light source emits infrared or visible light into the first end of the light guide. The light guide transmits the light from the light source through at least a portion of the outer surface of the light guide. In addition, the system may include a second light source disposed adjacent the second end of the light guide. The second light source emits infrared or visible light into the second end of the light guide.

21 Claims, 49 Drawing Sheets

Related U.S. Application Data

(60) Provisional application No. 62/442,273, filed on Jan. 4, 2017.

(51) Int. Cl.
*F21V 8/00* (2006.01)
*B60Q 9/00* (2006.01)
*B62D 15/02* (2006.01)
*B62D 1/06* (2006.01)
*B60K 35/00* (2006.01)
*B60Q 3/80* (2017.01)
*B62D 1/04* (2006.01)
*B60Q 3/14* (2017.01)

(52) U.S. Cl.
CPC .............. *B60Q 3/80* (2017.02); *B60Q 9/008* (2013.01); *B62D 1/046* (2013.01); *B62D 1/06* (2013.01); *B62D 15/029* (2013.01); *G02B 6/005* (2013.01); *G02B 6/006* (2013.01); *G02B 6/0036* (2013.01); *G02B 6/0045* (2013.01); *G02B 6/0055* (2013.01); *G02B 6/0085* (2013.01); *G02B 6/0088* (2013.01); *B60K 2370/15* (2019.05); *B60K 2370/33* (2019.05); *B60K 2370/685* (2019.05); *B60K 2370/782* (2019.05); *G02B 6/0061* (2013.01)

(58) Field of Classification Search
CPC .... G02B 6/0045; G02B 6/005; G02B 6/0055; G02B 6/006; G02B 6/0085; G02B 6/088; B62D 15/029; B62D 1/046; B62D 1/06; B60K 35/00
See application file for complete search history.

(56) References Cited

U.S. PATENT DOCUMENTS

| | | |
|---|---|---|
| 4,664,127 A | 5/1987 | Ikeyama et al. |
| 4,835,512 A | 5/1989 | Bratton et al. |
| 4,993,281 A | 2/1991 | Miller |
| 5,203,226 A | 4/1993 | Hongou et al. |
| D342,474 S | 12/1993 | Oki |
| D342,925 S | 1/1994 | Brajcki |
| 5,333,102 A | 7/1994 | Oberman et al. |
| 5,516,143 A | 5/1996 | Lang et al. |
| 5,558,364 A | 9/1996 | Davis |
| 5,661,839 A | 8/1997 | Whitehead et al. |
| 5,666,102 A | 9/1997 | Lahiff |
| 5,855,144 A | 1/1999 | Parada |
| 5,895,115 A | 4/1999 | Parker et al. |
| D418,786 S | 1/2000 | Giamos |
| 6,190,026 B1 | 2/2001 | Moore et al. |
| 6,296,380 B1 | 10/2001 | Dawli et al. |
| 6,538,405 B1 | 3/2003 | Brzozowski et al. |
| D475,064 S | 5/2003 | Nashida et al. |
| 6,651,526 B1 | 11/2003 | Imaizumi et al. |
| 6,668,682 B1 | 12/2003 | Rosenberger et al. |
| 6,703,999 B1 | 3/2004 | Iwanami et al. |
| 6,768,067 B2 | 7/2004 | Adachi et al. |
| 6,817,100 B2 | 11/2004 | Mori et al. |
| 7,143,663 B2 | 12/2006 | Menaldo et al. |
| 7,173,536 B2 | 2/2007 | Duval |
| D556,768 S | 12/2007 | Morris |
| D556,769 S | 12/2007 | Morris |
| 7,377,186 B2 | 5/2008 | Duval |
| 7,414,520 B2 | 8/2008 | Meβner |
| 7,468,656 B1 | 12/2008 | Frank |
| 7,525,449 B1 | 4/2009 | Lafontaine |
| 7,602,278 B2 | 10/2009 | Prost-Fin et al. |
| 7,605,693 B2 | 10/2009 | Kulas |
| 7,605,694 B2 | 10/2009 | Neumann et al. |
| D607,005 S | 12/2009 | Ording et al. |
| 7,672,759 B1 | 3/2010 | Lafontaine et al. |
| 7,679,495 B2 | 3/2010 | Beutnagel-Buchner et al. |
| 7,680,574 B2 | 3/2010 | Berg et al. |
| 7,710,279 B1 | 5/2010 | Fields et al. |
| 7,786,886 B2 | 8/2010 | Maruyama et al. |
| 7,969,531 B1 | 6/2011 | Li et al. |
| 7,987,030 B2 | 7/2011 | Flores et al. |
| D643,438 S | 8/2011 | Gardner et al. |
| 7,997,612 B2 | 8/2011 | Gulde et al. |
| 8,061,861 B2 | 11/2011 | Paxton et al. |
| 8,067,709 B2 | 11/2011 | Han et al. |
| 8,136,425 B2 | 3/2012 | Bostick et al. |
| 8,198,996 B2 | 6/2012 | Golomb et al. |
| 8,210,564 B2 | 7/2012 | Helmstetter et al. |
| 8,264,622 B2 | 9/2012 | Gourlay |
| 8,269,452 B2 | 9/2012 | Watanabe |
| D698,819 S | 2/2014 | Gardner et al. |
| D699,251 S | 2/2014 | Rao et al. |
| 8,645,001 B2 | 2/2014 | Basson et al. |
| 8,761,565 B1 | 6/2014 | Yeo et al. |
| 8,783,132 B2 | 7/2014 | Neumann et al. |
| D738,900 S | 9/2015 | Drozd et al. |
| 9,134,729 B1 | 9/2015 | Szybalski et al. |
| 9,159,221 B1 | 10/2015 | Stantchev |
| 9,223,638 B2 | 12/2015 | Hudzia et al. |
| 9,233,638 B2 | 1/2016 | Lisseman et al. |
| D752,632 S | 3/2016 | Seo et al. |
| 9,308,856 B2 | 4/2016 | Staszak et al. |
| 9,308,857 B2 | 4/2016 | Lisseman et al. |
| D766,305 S | 9/2016 | Mochizuki et al. |
| D771,072 S | 11/2016 | Protzman et al. |
| D778,313 S | 2/2017 | Cho |
| D785,003 S | 4/2017 | Yun et al. |
| D786,304 S | 5/2017 | Cronin et al. |
| D787,547 S | 5/2017 | Basargin et al. |
| 9,815,406 B2 | 11/2017 | Lisseman et al. |
| 9,821,703 B2 | 11/2017 | Lisseman et al. |
| 9,873,446 B2 | 1/2018 | Gardner et al. |
| D806,729 S | 7/2018 | Lisseman |
| 10,036,843 B2 | 7/2018 | Lisseman |
| 2002/0068605 A1 | 6/2002 | Stanley et al. |
| 2003/0121360 A1 | 7/2003 | Hussy et al. |
| 2004/0030807 A1 | 2/2004 | Wessler et al. |
| 2004/0045396 A1 | 3/2004 | Hosokawa et al. |
| 2004/0143379 A1 | 7/2004 | Borroni-bird et al. |
| 2004/0267422 A1 | 12/2004 | Bossler et al. |
| 2005/0021190 A1 | 1/2005 | Worrell et al. |
| 2005/0021990 A1 | 1/2005 | Liardet et al. |
| 2005/0189159 A1 | 9/2005 | Weber et al. |
| 2006/0044144 A1 | 3/2006 | Duval et al. |
| 2006/0236807 A1 | 10/2006 | Yasuda et al. |
| 2006/0241818 A1 | 10/2006 | Kumon et al. |
| 2006/0271261 A1 | 11/2006 | Flores et al. |
| 2007/0010944 A1 | 1/2007 | Ferrebee et al. |
| 2007/0173983 A1 | 7/2007 | Takahashi et al. |
| 2007/0260375 A1 | 11/2007 | Hilton et al. |
| 2007/0290375 A1 | 12/2007 | Huang |
| 2008/0023253 A1 | 1/2008 | Prost-Fin et al. |
| 2008/0023254 A1 | 1/2008 | Prost-fin et al. |
| 2008/0061954 A1 | 3/2008 | Kulas |
| 2008/0080741 A1 | 4/2008 | Yokoo et al. |
| 2008/0202281 A1 | 8/2008 | Bruyere et al. |
| 2008/0202282 A1 | 8/2008 | Bassett et al. |
| 2008/0211651 A1 | 9/2008 | Beutnagel-Buchner et al. |
| 2009/0002586 A1 | 1/2009 | Kimura |
| 2009/0063053 A1 | 3/2009 | Basson et al. |
| 2009/0096937 A1 | 4/2009 | Bauer et al. |
| 2009/0189373 A1 | 7/2009 | Schramm et al. |
| 2009/0223321 A1 | 9/2009 | Stefani et al. |
| 2009/0319095 A1 | 12/2009 | Cech et al. |
| 2010/0107806 A1 | 5/2010 | Corinaldi et al. |
| 2010/0194080 A1 | 8/2010 | Paxton et al. |
| 2010/0201896 A1 | 8/2010 | Ostreko et al. |
| 2010/0218641 A1 | 9/2010 | Neumann et al. |
| 2010/0295670 A1 | 11/2010 | Sato et al. |
| 2011/0153160 A1 | 6/2011 | Hesseling et al. |
| 2011/0187518 A1 | 8/2011 | Strumolo et al. |
| 2011/0194047 A1 | 8/2011 | Bruyneel et al. |
| 2011/0198201 A1 | 8/2011 | Chuang et al. |
| 2011/0198999 A1 | 8/2011 | Honma et al. |
| 2011/0310331 A1 | 12/2011 | Heo et al. |

(56) References Cited

U.S. PATENT DOCUMENTS

| | | |
|---|---|---|
| 2011/0317120 A1 | 12/2011 | Kajiya et al. |
| 2012/0013490 A1 | 1/2012 | Pance et al. |
| 2012/0146776 A1 | 6/2012 | Eguchi |
| 2012/0150387 A1 | 6/2012 | Watson et al. |
| 2012/0267222 A1 | 10/2012 | Gohng et al. |
| 2013/0082874 A1 | 4/2013 | Zhang et al. |
| 2013/0128190 A1 | 5/2013 | Huang |
| 2013/0152721 A1 | 6/2013 | Trendov et al. |
| 2013/0245886 A1 | 9/2013 | Fung et al. |
| 2014/0081521 A1 | 3/2014 | Fröjdh et al. |
| 2014/0098558 A1 | 4/2014 | Vasylyev |
| 2014/0109719 A1 | 4/2014 | Lisseman et al. |
| 2014/0111324 A1 | 4/2014 | Lisseman et al. |
| 2014/0111325 A1 | 4/2014 | Lisseman et al. |
| 2014/0111736 A1 | 4/2014 | An et al. |
| 2014/0232538 A1 | 8/2014 | Sobue et al. |
| 2014/0240114 A1 | 8/2014 | Waeller et al. |
| 2014/0244115 A1 | 8/2014 | Sanma et al. |
| 2014/0301097 A1 | 10/2014 | Neumann et al. |
| 2014/0375785 A1 | 12/2014 | Kogut et al. |
| 2015/0062490 A1 | 3/2015 | Kwon |
| 2015/0123947 A1 | 5/2015 | Jubner et al. |
| 2015/0212705 A1 | 7/2015 | Sasaki et al. |
| 2015/0251600 A1 | 9/2015 | Mochizuki et al. |
| 2015/0253922 A1 | 9/2015 | Goodlein |
| 2015/0375677 A1 | 12/2015 | Salter et al. |
| 2016/0025281 A1 | 1/2016 | Gardner et al. |
| 2016/0191859 A1 | 6/2016 | Lisseman |
| 2016/0200246 A1 | 7/2016 | Lisseman et al. |
| 2016/0200343 A1 | 7/2016 | Staszak et al. |
| 2016/0257248 A1 | 9/2016 | Smith et al. |
| 2016/0311366 A1 | 10/2016 | Lisseman |
| 2016/0334876 A1 | 11/2016 | Park |
| 2017/0166117 A1 | 6/2017 | Nagata et al. |
| 2017/0166125 A1 | 6/2017 | Lisseman et al. |
| 2018/0118089 A1 | 5/2018 | Lisseman et al. |
| 2018/0126900 A1 | 5/2018 | Lisseman et al. |
| 2018/0237050 A1 | 8/2018 | Gardner et al. |
| 2019/0009675 A1 | 1/2019 | Groleau |
| 2019/0016383 A1 | 1/2019 | Spencer et al. |

FOREIGN PATENT DOCUMENTS

| | | |
|---|---|---|
| CN | 102066181 A | 5/2011 |
| CN | 201998981 U | 10/2011 |
| CN | 202371573 U | 8/2012 |
| DE | 20018732.5 U1 | 2/2001 |
| DE | 20014731.5 U1 | 2/2002 |
| DE | 10113493 A1 | 9/2002 |
| DE | 102005013202 A1 | 9/2006 |
| DE | 202009003968 U1 | 6/2009 |
| EP | 801373 A1 | 10/1997 |
| FR | 2744976 A1 | 8/1997 |
| FR | 3028476 A1 | 5/2016 |
| JP | H0329205 A | 2/1991 |
| JP | 10-059190 | 3/1998 |
| JP | 2000153769 A | 6/2000 |
| JP | 200155149 A | 2/2001 |
| JP | 2001055149 A | 2/2001 |
| JP | 2001114112 A | 4/2001 |
| JP | 2002157685 A | 5/2002 |
| JP | 2004148911 A | 5/2004 |
| JP | 2005088792 A | 4/2005 |
| JP | 2006-521954 A | 9/2006 |
| JP | 2007114379 A | 5/2007 |
| JP | 2007153048 A | 6/2007 |
| JP | 2008-526609 A | 7/2008 |
| JP | 2008273521 A | 11/2008 |
| JP | 2009018722 A | 1/2009 |
| JP | 2010017007 A | 1/2010 |
| JP | 2010241275 A | 10/2010 |
| JP | 2010264829 A | 11/2010 |
| JP | 2010-537888 A | 12/2010 |
| JP | 2012093584 A | 5/2012 |
| JP | 2012129742 A | 7/2012 |
| JP | 2012226923 A | 11/2012 |
| JP | 6292804 B2 | 3/2018 |
| KR | 10-2014-0107864 | 9/2014 |
| WO | 9803365 A1 | 1/1998 |
| WO | 02096745 A1 | 12/2002 |
| WO | 2005025936 A2 | 3/2005 |
| WO | 2006076903 A1 | 7/2006 |
| WO | 2006076904 | 7/2006 |
| WO | 2006127835 A2 | 11/2006 |
| WO | 2009026223 A2 | 2/2009 |
| WO | 2009111098 A2 | 9/2009 |
| WO | 2010051090 A1 | 5/2010 |
| WO | 2010087931 A1 | 8/2010 |
| WO | 2010131305 A1 | 11/2010 |
| WO | 2014066476 A1 | 5/2014 |
| WO | 2014066477 A1 | 5/2014 |
| WO | 2014066512 A1 | 5/2014 |
| WO | 2016172709 A1 | 10/2016 |

OTHER PUBLICATIONS

Office Action, dated Jun. 28, 2020, in Chinese Application No. 201711420084.4.
English Translation of Chinese Office Action for Application No. 201380055394.4 dated Jun. 28, 2016.
Non-Final Office Action in U.S. Appl. No. 15/137,646 dated Oct. 27, 2017.
Notice of Allowance in U.S. Appl. No. 15/137,646 dated Mar. 28, 2018.
Non-Final Office Action Issued in U.S. Appl. No. 15/443,354, dated Oct. 10, 2017.
Final Office Action Issued in U.S. Appl. No. 15/443,354, dated May 17, 2018.
Non-Final Office Action Issued in U.S. Appl. No. 15/443,354, dated Oct. 4, 2018.
International Preliminary Report on Patentability, dated Nov. 2, 2017, received in connection with International Patent Application No. PCT/US2016/029218.
International Search Report and Written Opinion conducted in International Application No. PCT/US2016/29218, dated Aug. 5, 2016.
Non-Final Office Action issued in U.S. Appl. No. 29/525,000, dated Nov. 1, 2016.
Final Office Action issued in U.S. Appl. No. 29/525,000, dated May 5, 2017.
Notice of Allowance issued in U.S. Appl. No. 29/525,000, dated Aug. 23, 2017.
Non-Final Office Action issued in U.S. Appl. No. 14/465,421, dated Jun. 2, 2015.
Final Office Action issued in U.S. Appl. No. 14/465,421, dated Sep. 28, 2015.
Non-Office Action issued in U.S. Appl. No. 14/465,421, dated Feb. 26, 2016.
Notice of Allowance in U.S. Appl. No. 14/465,421, dated Jun. 22, 2016.
Non-Final Office Action issued in U.S. Appl. No. 14/806,325, dated May 11, 2017.
Notice of Allowance, dated Sep. 8, 2017, received in connection with U.S. Appl. No. 14/806,325.
U.S. Appl. No. 29/524,993, filed Apr. 24, 2015.
Non-Final Office Action issued in U.S. Appl. No. 29/524,993, dated Nov. 2, 2016.
Final Office Action issued in U.S. Appl. No. 29/524,993, dated May 5, 2017.
Final Office Action issued in U.S. Appl. No. 29/524,993, dated Sep. 27, 2017.
Advisory Action issued in U.S. Appl. No. 29/524,993, dated Dec. 18, 2017.
U.S. Appl. No. 29/524,998, filed Apr. 24, 2015.
Non-Final Office Action issued in U.S. Appl. No. 29/524,998, dated Oct. 31, 2016.
Final Office Action issued in U.S. Appl. No. 29/524,998, dated May 5, 2017.

(56) References Cited

OTHER PUBLICATIONS

Final Office Action issued in U.S. Appl. No. 29/524,998, dated Sep. 25, 2017.
Advisory Action issued in U.S. Appl. No. 29/524,998, dated Dec. 14, 2017.
"NaviGadget", CSW Steering Wheel With Driving Instruction, NaviGadget [online], published Apr. 8, 2008, [retrieved Oct. 24, 2016], retrieved from the Internet <URL:http://www.navigaget.com/index.php/2008/04/08/csw-steering-wheel-with-driving-instructions>.
Final Office Action, dated Mar. 28, 2017, received in connection with U.S. Appl. No. 14/307,780.
Office Action, dated Oct. 28, 2016, received in connection with U.S. Appl. No. 14/307,780.
Restriction Requirement dated Jun. 8, 2016, received in connection with U.S. Appl. No. 14/307,780.
Non-Final Office Action, dated Sep. 20, 2016, received in connection with U.S. Appl. No. 15/075,519.
Notice of Allowance, dated Feb. 9, 2017, received in connection with U.S. Appl. No. 15/075,519.
Supplemental Notice of Allowance dated Oct. 23, 2017, in U.S. Appl. No. 15/075,519.
Office Action, dated Sep. 20, 2016, received in connection with U.S. Appl. No. 15/075,527.
Final Office Action, dated Feb. 13, 2017, received in connection with U.S. Appl. No. 15/075,527.
Notice of Allowance issued in U.S. Appl. No. 15/075,527, dated Mar. 20, 2017.
Supplemental Notice of Allowance dated Oct. 16, 2017 in U.S. Appl. No. 15/075,527.
Notice of Allowance, dated Apr. 24, 2018, received in connection with U.S. Appl. No. 15/722,512.
Office Action, dated Apr. 5, 2018, received in connection with U.S. Appl. No. 15/728,193.
Notice of Allowance dated Sep. 12, 2018, received in connection with U.S. Appl. No. 15/728,193.
Office Action issued in counterpart Japanese Application No. 2010-523275 dated Jun. 5, 2012 (2 pages) and an English translation of the same (1 page).
First Office Action (English translation), dated Jul. 29, 2016, in Chinese Application No. 201380055391.0.
Second Office Action (English translation), dated Apr. 19, 2017 in Chinese Application No. 201380055391.0.
Third Office Action (English translation), dated Jan. 5, 2018, Chinese Application No. 201380055391.0.
Notice of Grant, Chinese Application No. 201380055391.0, dated Apr. 8, 2018.
First Office Action (English Translation) issued in Chinese Application No. 201380055394.4, dated Jun. 28, 2016.
Second Office Action (English Translation) issued in Chinese Application No. 201380055394.4, dated Feb. 28, 2017.
Third Office Action (English Translation) issued in Chinese Application No. 201380055394.4, dated Sep. 8, 2017.
Fourth Office Action (English translation), dated May 11, 2018, in Chinese Application No. 2013580055394.4.
Office Action in Chinese Application No. 201380055405.9, dated Jun. 2, 2016.
Office Action issued in Chinese Application No. 201380055405.9 dated Nov. 28, 2016.
Video: BMW M Performance Steering Wheel with Digital Race Display in Action, bimmerpost.com [on line], published Nov. 3, 2012, [retrieved Aug. 12, 2017], retrieved from the Internet <URL:http://www.bimmerpost.com/tag/bmw-m-performance-steering-wheeldigital-display/>.
Office Action (English Translation) issued in Japanese Application No. JP2015-538152, dated Aug. 29, 2017.
Second Office Action, dated Jul. 3, 2018, in in Japanese Application No. JP2015-538152.
Office Action (English Translation) issued in Japanese Application No. JP2015-538153, dated Aug. 29, 2017.
Notice of Allowance, dated Jul. 31, 2018, in Japanese Application No. JP2015-538153.
Office Action (English Translation) issued in Japanese Application No. JP2015-538159, dated Aug. 29, 2017.
Notice of Allowance, dated Jul. 31, 2018, in Japanese Application No. JP2015-538159.
English translation of the International Preliminary Report on Patentability (Chapter I or Chapter II of the Patent Cooperation Treaty) from the International Bureau of WIPO for International Application No. PCT/DE2008/001527 dated Apr. 7, 2010, 17 pages.
International Search Report and Written Opinion dated, Feb. 7, 2014, received in connection with International Patent Application No. PCT/US2013/066329.
International Preliminary Report on Patentability, dated Apr. 28, 2015, received in connection with International Patent Application No. PCT/US2013/066329.
International Preliminary Report on Patentability received in International Patent Application No. PCT/US2013/066330, dated May 7, 2015.
International Search Report and Written Opinion dated, Feb. 7, 2014, received in connection with International Patent Application No. PCT/US2013/066330.
International Search Report and Written Opinion, dated Feb. 7, 2014, received in connection with International Patent Application No. PCT/US2013/066399.
International Preliminary Report on Patentability and Written Opinion, dated Apr. 28, 2015, received in connection with International Patent No. PCT/US2013/066399.
International Search Report and Written Opinion in PCT/US2018/012387, dated May 9, 2018.
International Search Report and Written Opinion, dated Oct. 29, 2015, received in connection with International Patent Application No. PCT/US2015/041582.
International Preliminary Report on Patentability issued in International Application No. PCT/US2015/041582 dated Feb. 2, 2017.
Non-final Office Action, dated Feb. 18, 2015, received in connection with U.S. Appl. No. 14/061,383.
Final Office Action, dated Aug. 25, 2015, received in connection with U.S. Appl. No. 14/061,383.
Notice of Allowance in U.S. Appl. No. 14/061,383, dated Dec. 4, 2015.
Non-final Office Action, dated Mar. 13, 2015, received in connection with U.S. Appl. No. 14/061,397.
Notice of Allowance, dated Sep. 9, 2015, received in connection with U.S. Appl. No. 14/061,397.
Non-final Office Action, dated Feb. 18, 2015, received in connection with U.S. Appl. No. 14/061,408.
Final Office Action, dated Aug. 25, 2015, received in connection with U.S. Appl. No. 14/061,408.
Notice of Allowance, dated Dec. 7, 2015, received in connection with U.S. Appl. No. 14/061,408.
Non-Final Office Action, dated Feb. 26, 2016, received in connection with U.S. Appl. No. 14/635,547.
Notice of Allowance dated Oct. 14, 2016, received in connection with U.S. Appl. No. 14/635,547.
U.S. Appl. No. 29/631,758, filed Jan. 1, 2018.
U.S. Appl. No. 16/048,982, filed Jul. 30, 2018.
First Office Action (English translation), dated Jul. 30, 2018, in Chinese Application No. 201580039946.1.
Second Office Action (English translation), dated Dec. 17, 2018, in Chinese Application No. 201580039946.1.
English Translation of Office Action issued in Japanese Application No. 2017-503574; dated Apr. 16, 2019; 6 pages.
English Translation of Notice of Reexamination issued in Chinese Application No. 201380055394.4; dated May 31, 2019; 4 pages.
International Search Report issued in PCT Application No. PCT/US2019/021411; dated Jun. 21, 2019; 19 pages.
Japanese Search Report issued in Japanese Application No. 2018-206705; dated Aug. 27, 2019; 4 pages.
Office Action issued in CN Application No. 201711420084.4 dated Apr. 7, 2021; 32 pages.

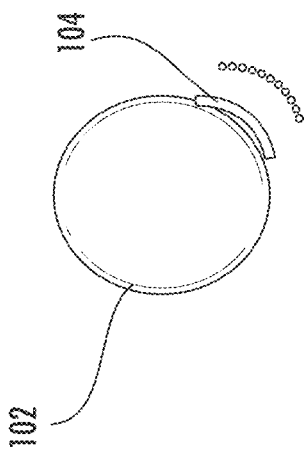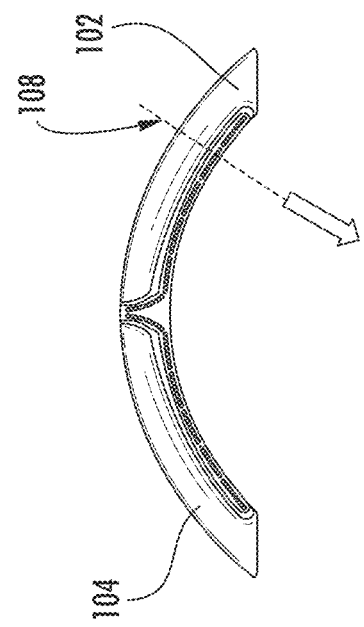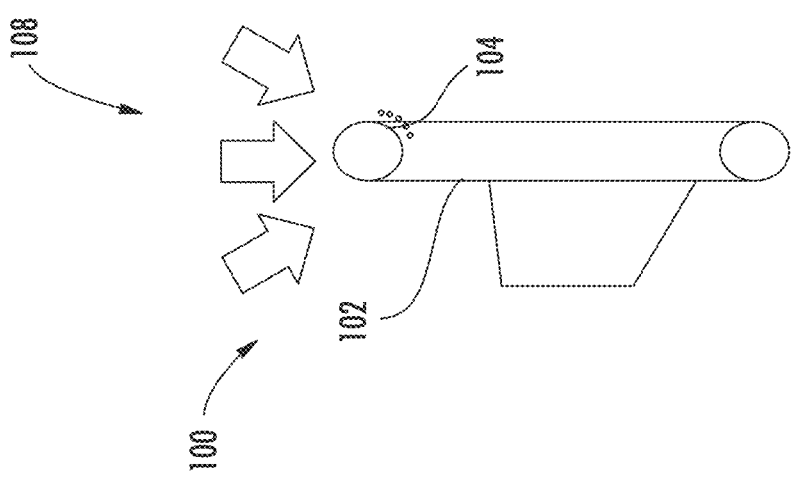
FIG. 3C
FIG. 3B
FIG. 3A

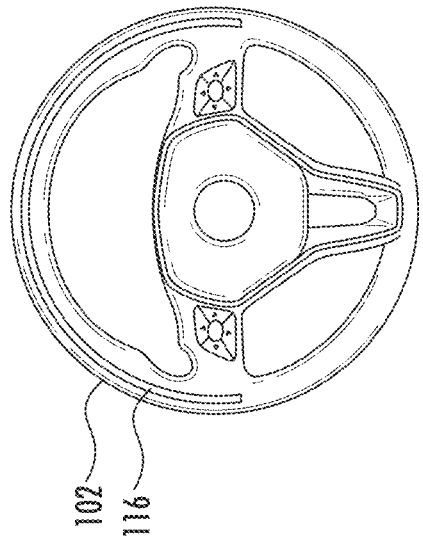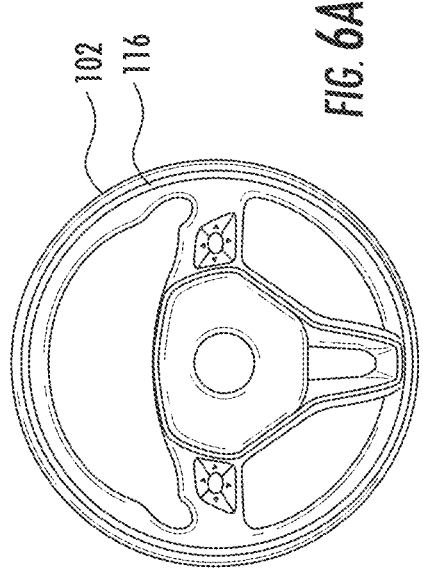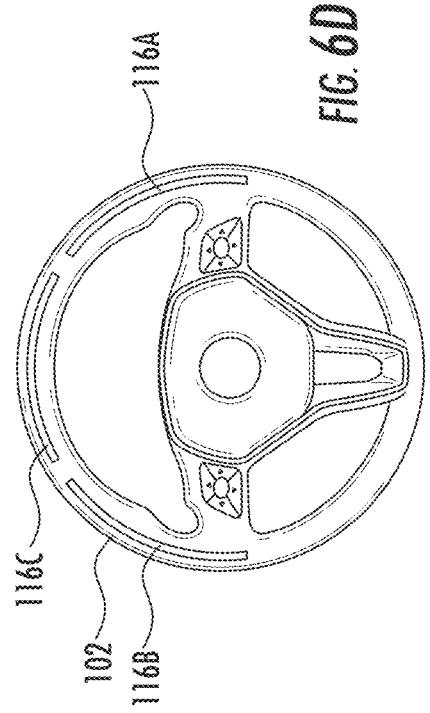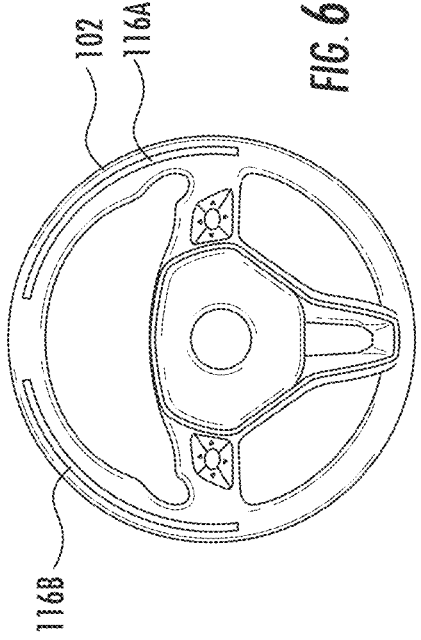

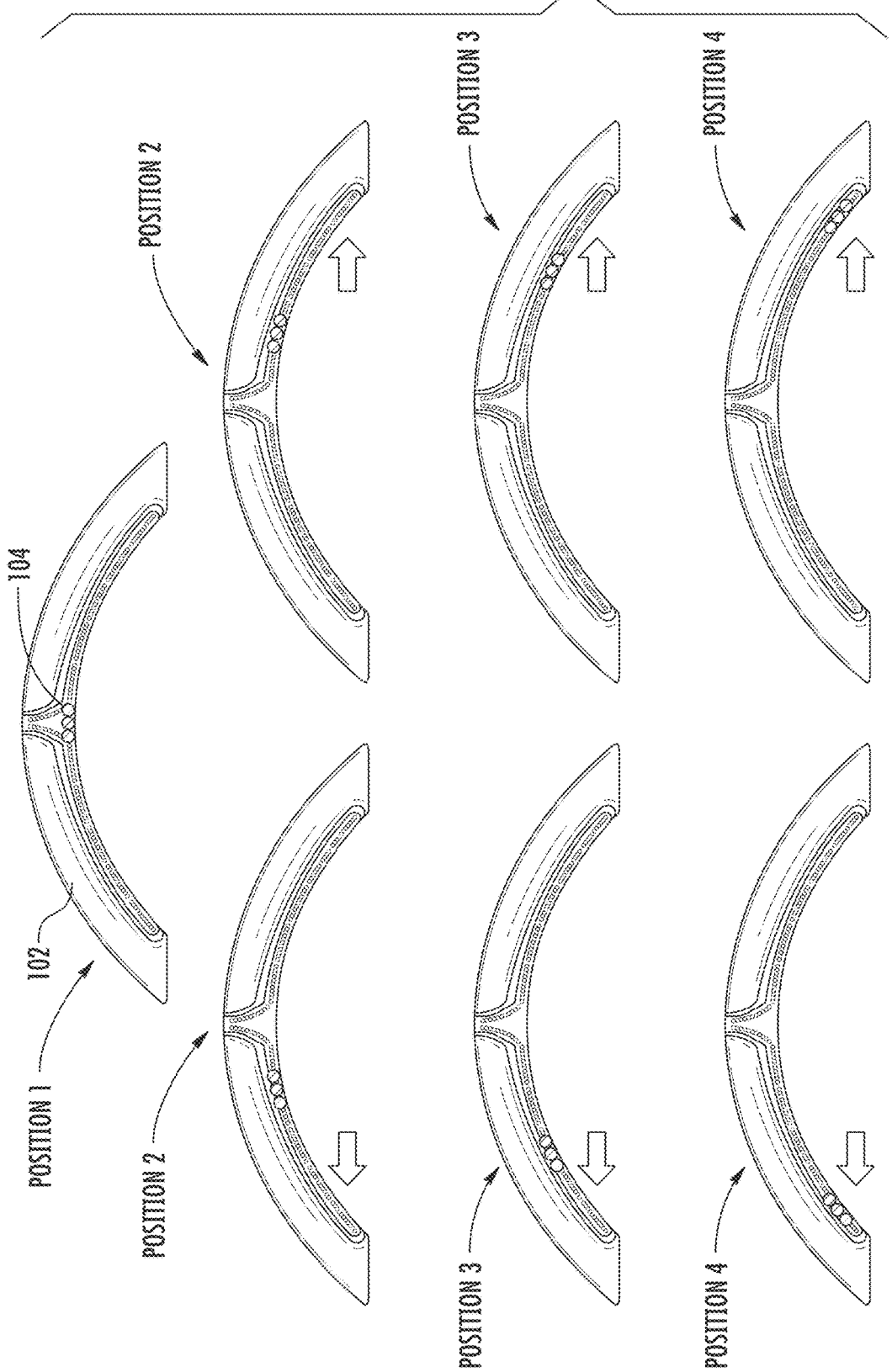

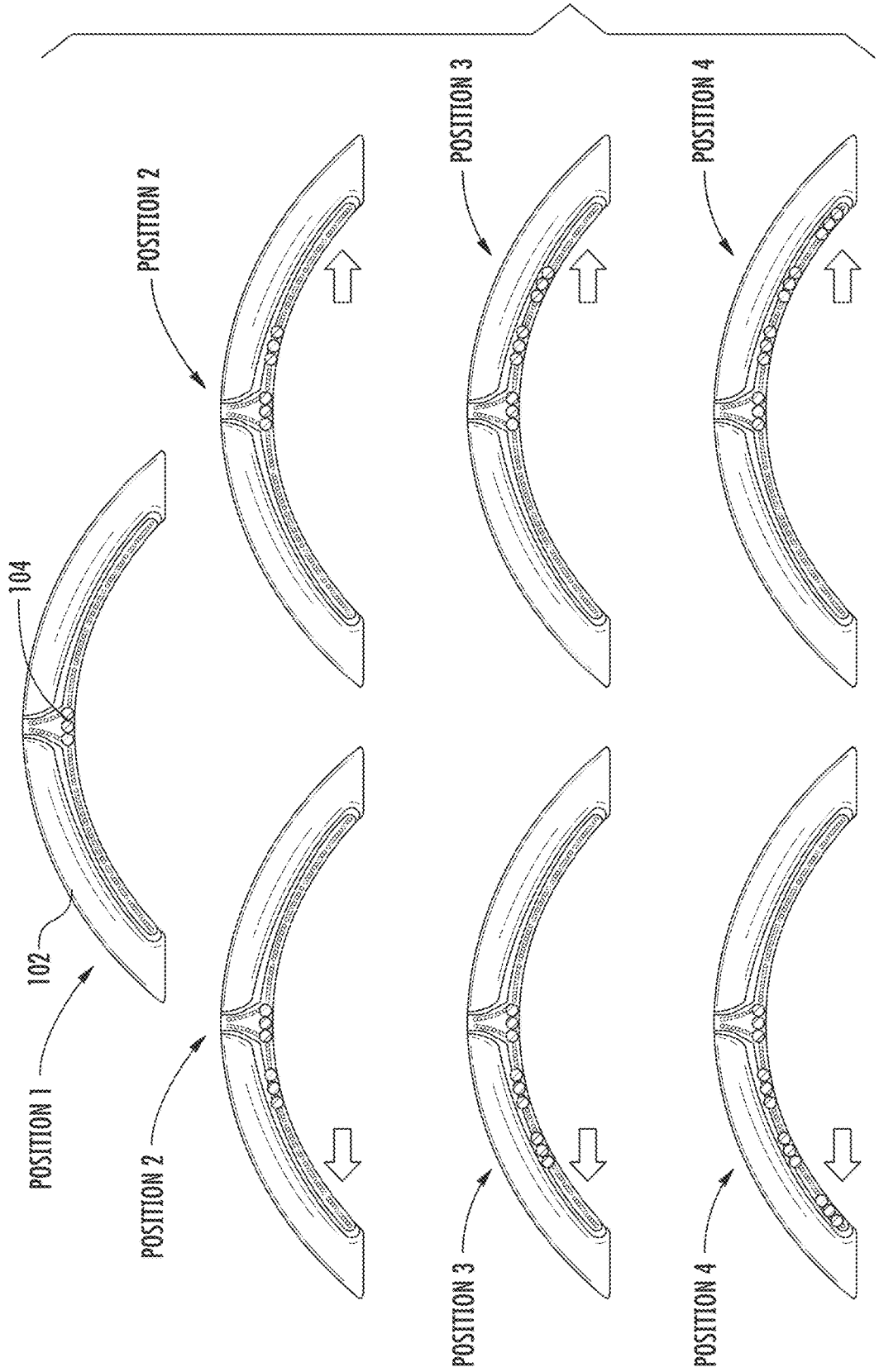

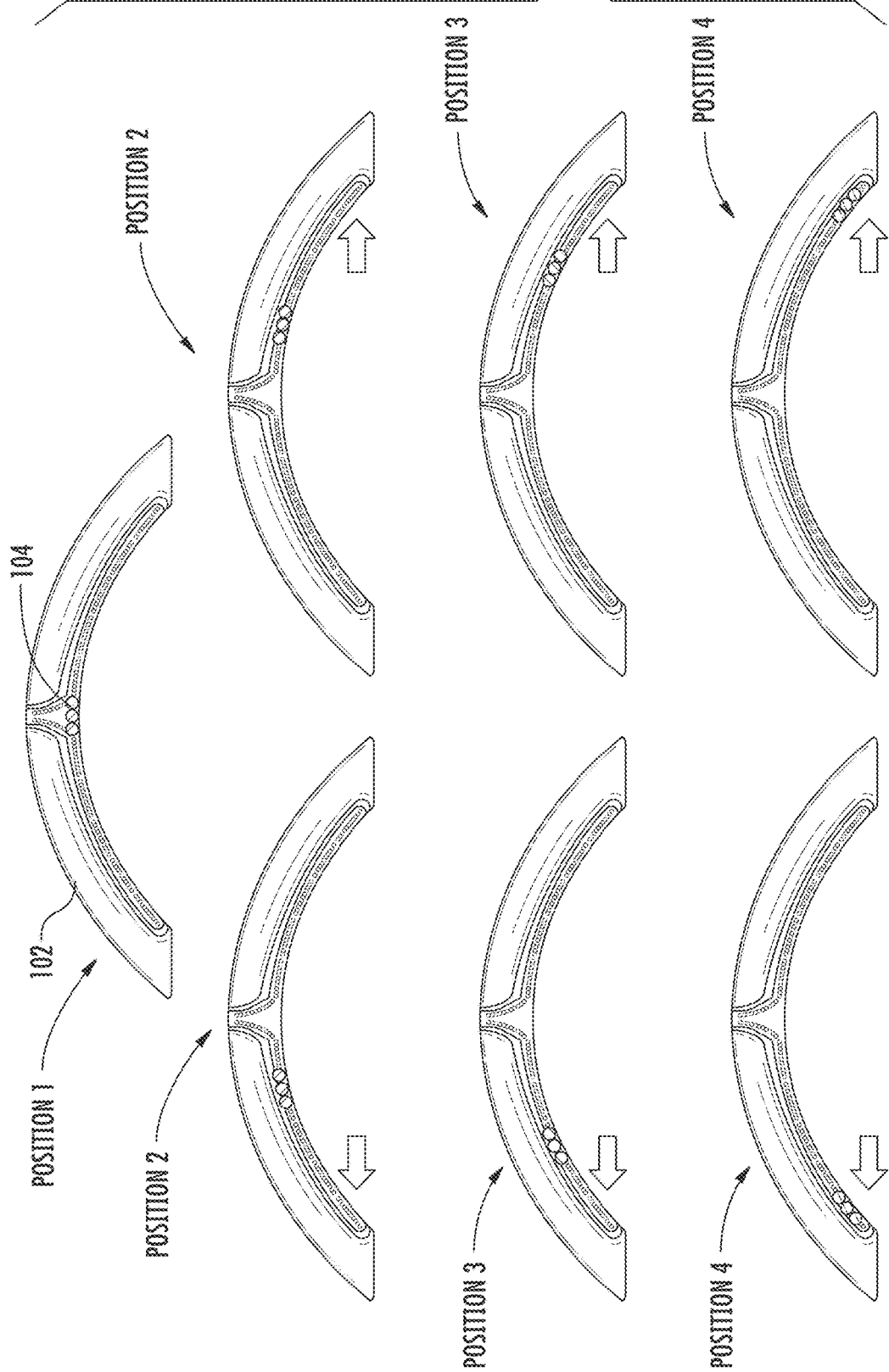

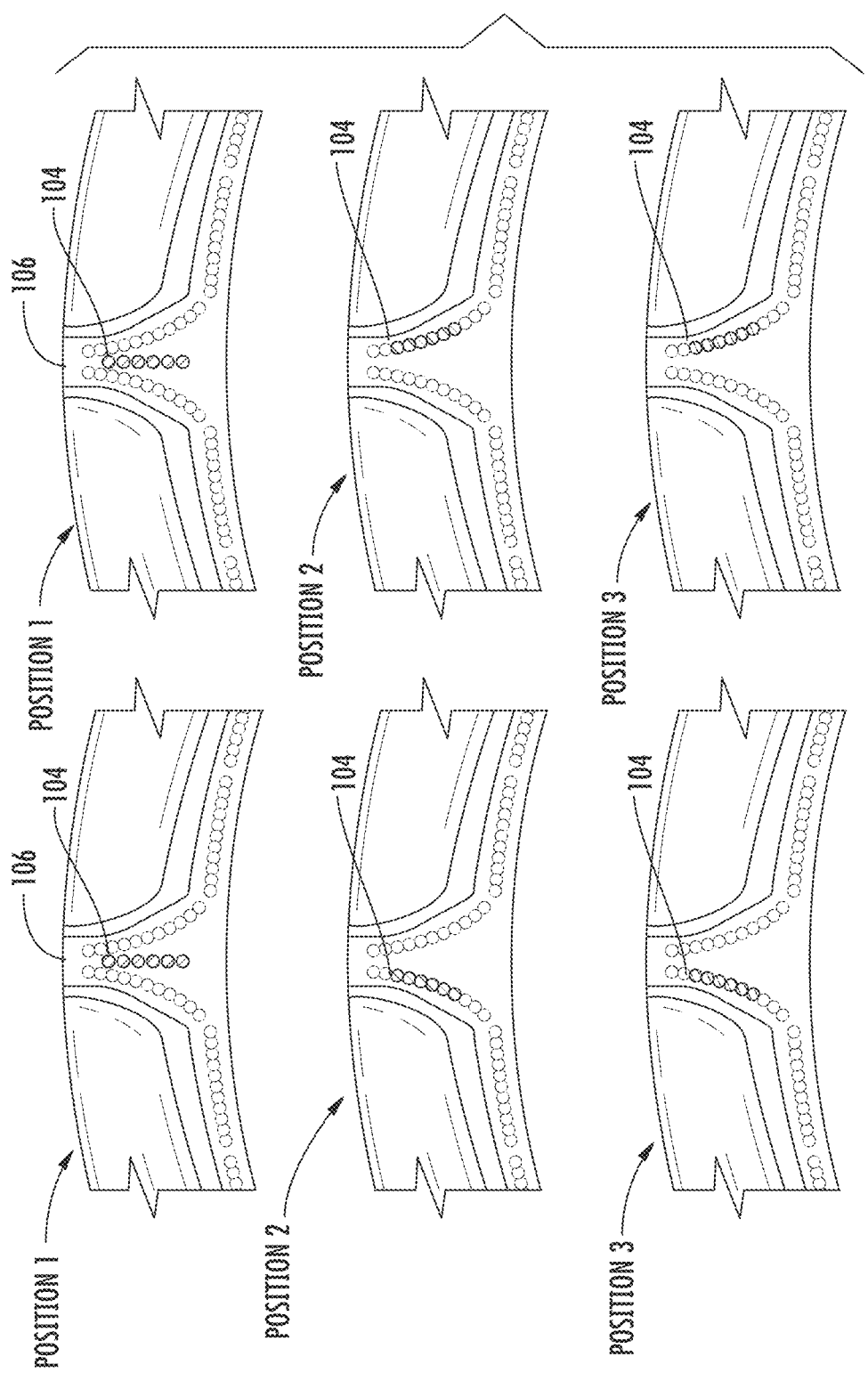

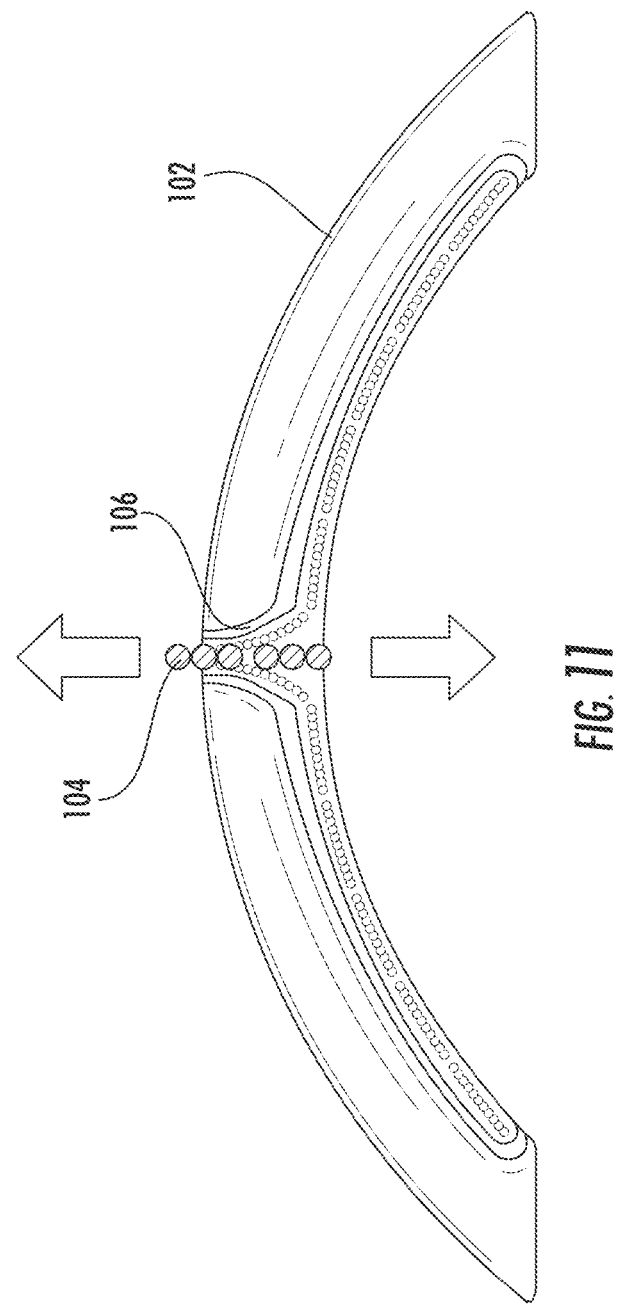

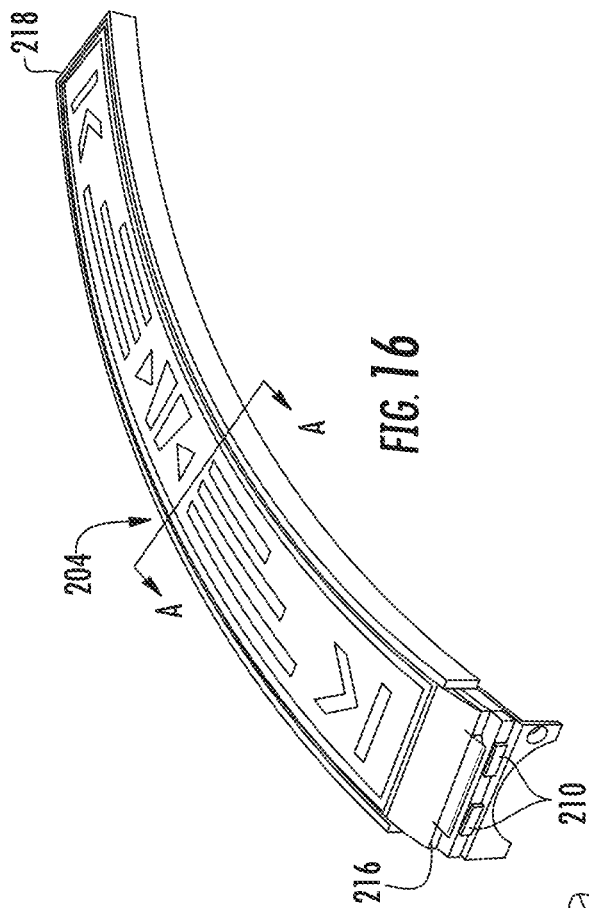
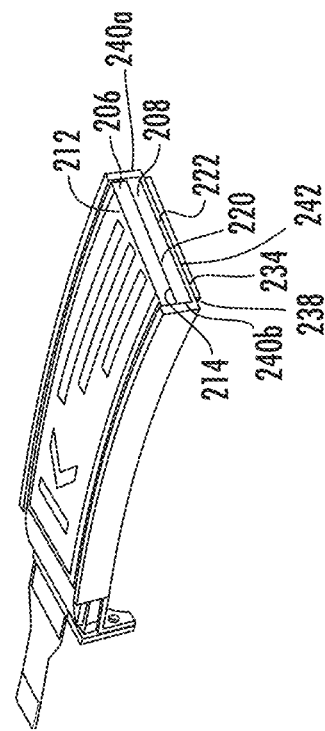
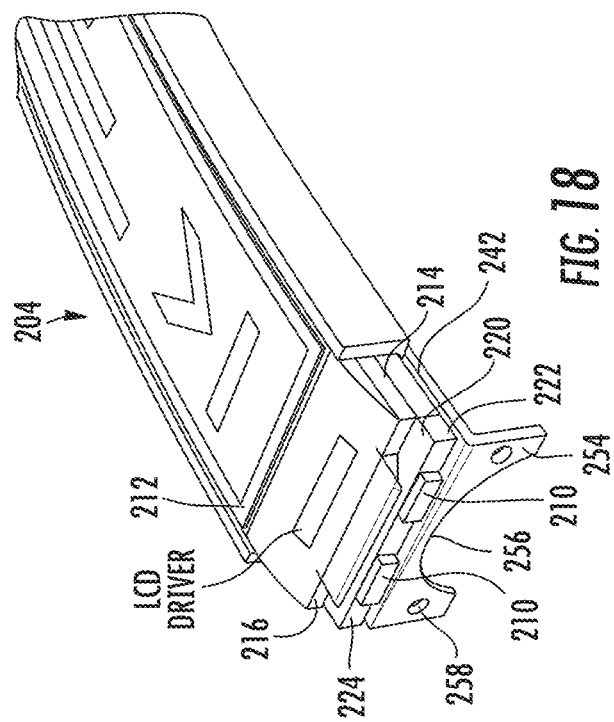

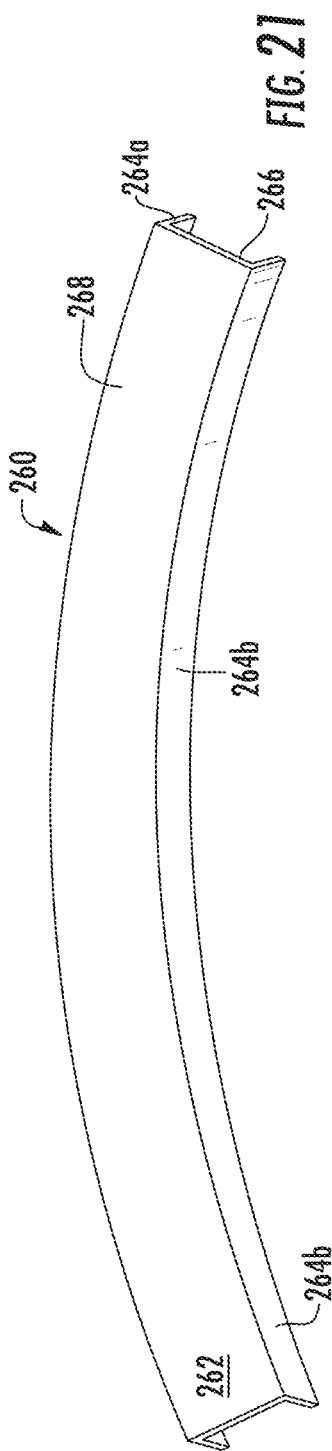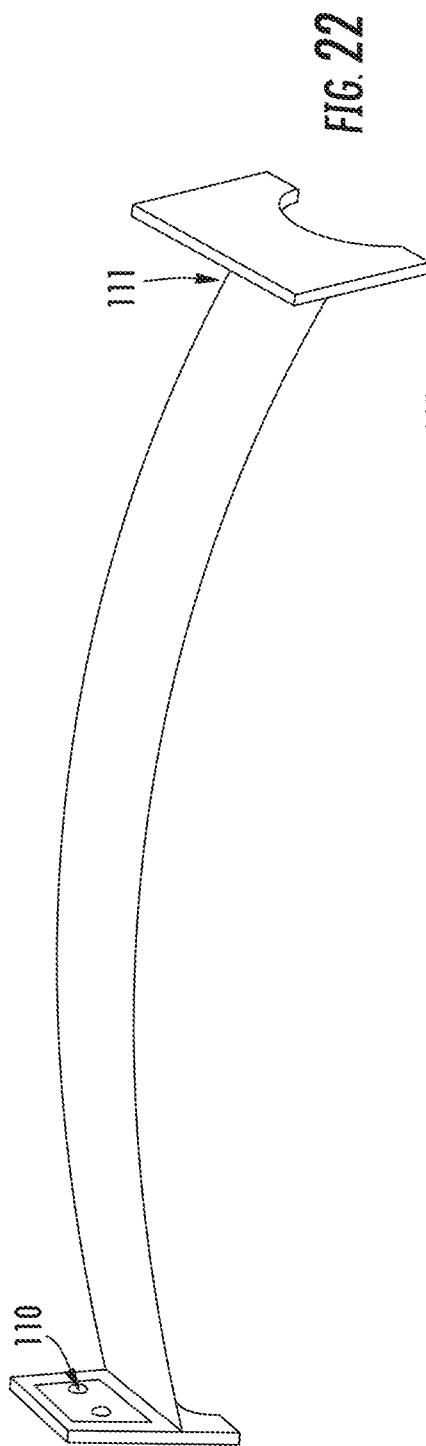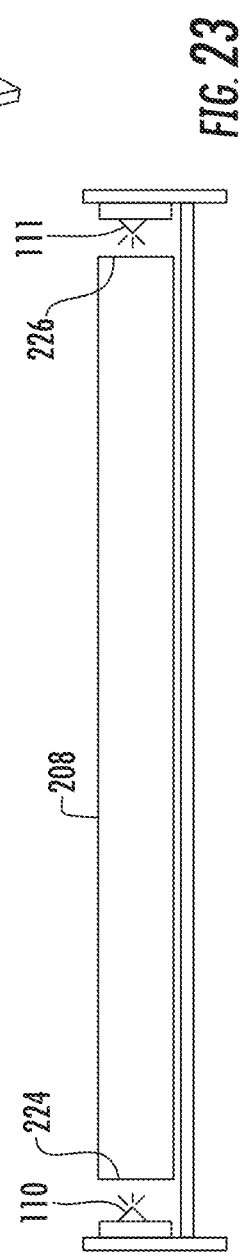

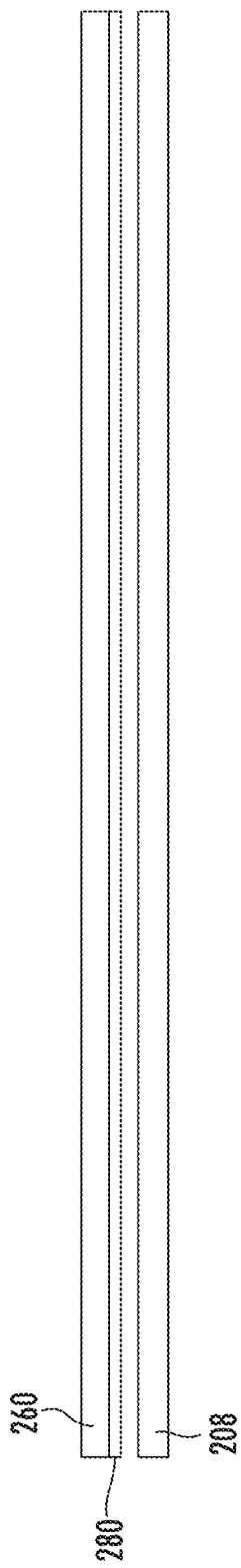
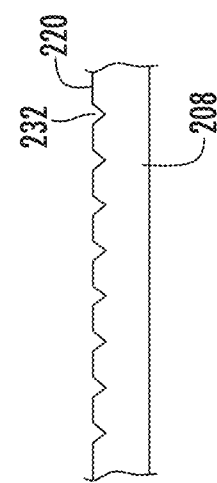

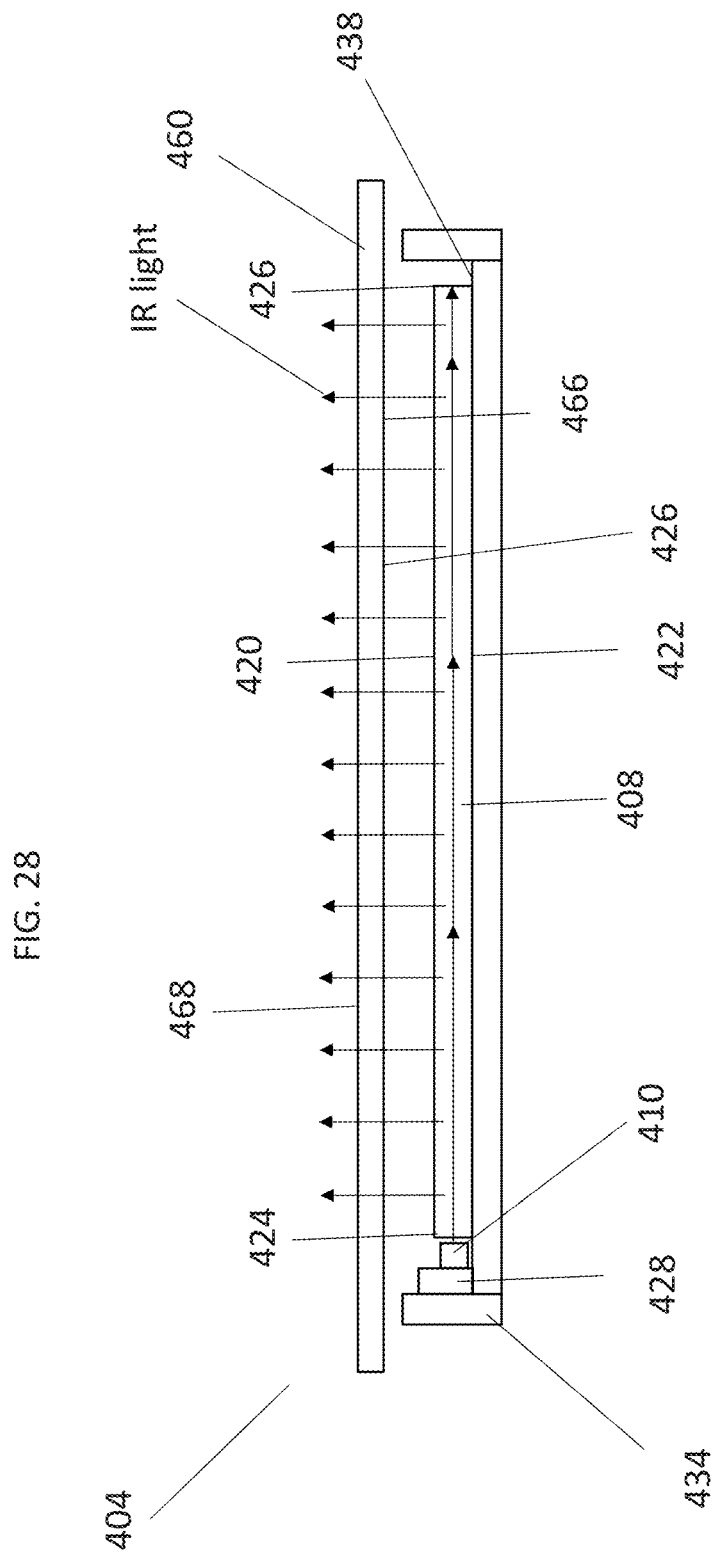

VEHICLE ILLUMINATION SYSTEMS AND METHODS

CROSS REFERENCE TO RELATED APPLICATION

This application is a continuation application of U.S. application Ser. No. 15/862,437, entitled "Vehicle Illumination System and Methods," filed Jan. 4, 2018, which claims priority to U.S. Provisional Application No. 62/442,273, entitled "Vehicle Illumination Systems and Methods," filed Jan. 4, 2017, the content of which are herein incorporated by reference in their entirety.

BACKGROUND

Various advanced driver assistance systems incorporate visual, acoustic and/or sensor warnings. Visual interfaces for these assistance systems must minimize both driver reaction time to warnings and the workload on the driver to comprehend and respond to the warning or information. Conventional instrument panel and center-stack displays require the driver's attention be drawn away from navigating the vehicle. Similarly, idealized heads up displays can be jarring and sometimes distracting to the driver.

Therefore, a need in the art exists for a driver assistance system that utilizes the driver's peripheral vision and allows the driver to keep both hands on the wheel while maintaining focus in their direct line of sight. In doing so, drivers can gain valuable and important reaction time in critical driving situations. There is also a need in the art for improved illumination systems and methods that illuminate the interior of the vehicle using visible and/or infrared light. These illumination systems may be used by occupant monitoring systems to monitor the occupants of the vehicle.

BRIEF SUMMARY

Various implementations include an illumination system for a steering assembly of a vehicle. The illumination system comprises a base, a housing, a light guide, and at least one light source. The base has first and second sidewalls, and the first and second side walls are spaced apart from each other and define a channel therebetween. The housing has a ceiling and defines a window that faces an occupant of the vehicle. The light guide has a first surface and a second surface that extends between a first end and a second end of the light guide. The light guide further comprises an inner surface and an outer surface. The inner surface and outer surface are spaced apart from each other and extend between the first and second ends and the first and second surfaces. At least one light source is disposed adjacent the first end of the light guide, and the light source emits light into the first end of the light guide. At least a first portion of the first surface of the light guide is disposed within the channel between the first and second sidewalls of the base. The base is coupled to the housing such that the light guide is disposed within the housing and such that at least a portion of the outer surface of the light guide is adjacent the window and the light guide transmits light from the light source through the portion of the outer surface of the light guide and through the window.

In some implementations, the first sidewall of the base extends between the outer surface of the light guide and the window, and at least a portion of said first sidewall is transparent or translucent.

In some implementations, a lens is disposed between the outer surface of the light guide and the window.

In some implementations, the system includes one or more light directing films disposed adjacent the outer surface of the light guide.

In some implementations, the second sidewall of the base comprises a first surface and a second surface that is spaced apart from and opposite the first surface, and the second sidewall defines at least one opening that extends between the first and second surfaces of the second sidewall. The housing also defines at least one opening, and the openings in the second sidewall and the housing are alignable for receiving a fastener to couple the base and the housing.

In some implementations, the light source is thermally coupled to a frame of the steering assembly such that the frame transfers heat from the light source toward the frame.

In some implementations, the light guide transmits light through the entire outer surface of the light guide.

In some implementations, the light source is a first light emitting diode, and the system further comprises a second light emitting diode adjacent the second end of the light guide. The second light emitting diode emits light into the second end of the light guide.

In some implementations, the first light source comprises at least one infrared LED, and the second light source comprises at least one visible LED.

In some implementations, the first surface of the light guide is arcuate shaped between the first and second ends and has a radius of curvature, and the base comprises an arcuate shaped support surface disposed within the channel between the first and second side walls. The arcuate shaped support surface has a radius of curvature that matches the radius of curvature of the first surface of the light guide.

In some implementations, the second surface of the light guide is arcuate shaped, and the housing further comprises an arcuate shaped ceiling. The second surface of the light guide is received by the arcuate shaped ceiling of the housing.

In some implementations, the radius of curvature of the second surface and the radius of curvature of the first surface are the same.

In some implementations, the radius of curvature of the second surface is the same as a radius of curvature of the arcuate shaped ceiling.

In some implementations, the housing is integrally formed with a back cover for coupling to a hub portion of a frame of the steering assembly.

In some implementations, the housing is separately formed and coupled to a hub portion of a frame of the steering assembly.

In some implementations, the housing comprises one or more tabs that extend from an inner surface of the housing, and the base comprises a coupling plate that extends from the second sidewall. The coupling plate defines one or more openings for receiving the one or more tabs and coupling the housing with the base.

In some implementations, the housing and the base are opaque.

In some implementations, the at least one light source is coupled to a printed circuit board, and the printed circuit board is coupled to one end of the base such that the at least one light source is adjacent the channel.

In some implementations, the light guide comprises two or more light guide segments. The two or more light guide segments are separately formed, and the at least one light source comprises two or more light sources. Each light source is disposed adjacent an end of the respective light guide segment. The light sources are separately controllable for illuminating separately or simultaneously.

In some implementations, adjacent surfaces of the light guide segments abut each other at an interface, and the interface comprises a light blocking material for preventing light from the segments from being emitted into the adjacent segments.

In some implementations, the base defines at least one opening for receiving a fastener.

Various other implementations include an illumination system for an occupant monitoring system of an occupant within a vehicle. The illumination system comprises a light guide and at least one infrared light source. The light guide has an outer surface and an inner surface that extends between a first end and a second end of the light guide. The at least one infrared light source is disposed adjacent the first end of the light guide, and the light source emits infrared light into the first end of the light guide. The light guide transmits infrared light from the infrared light source through at least a portion of the outer surface of the light guide.

In some implementations, the outer and inner surfaces of the light guide are arcuate-shaped between the ends and are spaced apart and opposite each other relative to a plane that extends through the first and second ends of the light guide and is parallel to the outer and inner surfaces of the light guide.

In some implementations, the system further includes an outer lens having an outer surface and an inner surface that extend between a first end and a second end of the outer lens. The outer and inner surfaces of the outer lens are arcuate-shaped between the ends of the outer lens and are spaced apart and opposite each other relative to a plane that extends through the first and second ends of the outer lens and is parallel to the outer and inner surfaces of the outer lens, wherein the inner surface of the outer lens is disposed adjacent the outer surface of the light guide.

In some implementations, the system further includes one or more light directing films disposed between the outer surface of the light guide and the inner surface of the outer lens. The one or more light directing films change a characteristic of the light passing through the one or more light directing films.

In some implementations, the inner and outer surfaces of the lens and the light guide have a radius of curvature that is similar to the radius of curvature of an arcuate shaped portion of a frame of the steering wheel, and the lens and light guide are coupled to the arcuate shaped portion of the frame such that the inner and outer surfaces of the lens and light guide follow the arcuate-shaped portion of the frame.

In some implementations, the arcuate shaped portion of the frame comprises a thermally conductive material, and the light source is thermally coupled to the arcuate shaped portion of the frame such that the frame transfers heat from the light source toward the frame.

In some implementations, the light guide transmits light through the entire outer surface of the light guide.

In some implementations, the arcuate shaped portion of the frame is a portion of the rim of the steering wheel frame.

In some implementations, the system further includes a visible light source disposed adjacent the second end of the light guide. The visible light source emits visible light into the second end of the light guide, and the light guide transmits the visible light through at least a portion of the outer surface of the light guide with the infrared light.

In some implementations, the visible light source comprises a visible light emitting diode (LED) and the infrared light source comprises an infrared LED.

In some implementations, the light guide is coupled to an upper portion of a hub of a steering assembly.

In some implementations, a back cover is coupled to the hub, and the light guide is coupled adjacent an upper portion of the back cover.

In some implementations, the light source is thermally coupled to the frame such that the frame transfers heat from the light source toward the frame.

In some implementations, the infrared light source is coupled to a printed circuit board (PCB), and the PCB is thermally coupled to a frame of a steering assembly.

Various other implementations include an illumination system within a vehicle. The illumination system includes a light guide, a first light source, and a second light source. The light guide has an outer surface and an inner surface that extend between a first end and a second end of the light guide. The first light source is disposed adjacent the first end of the light guide for emitting light into the first end of the light guide. The second light source is disposed adjacent the inner surface of the light guide for transmitting light through at least a portion of the inner surface of the light guide and through at least a portion of the outer surface of the light guide. The first light source is one of a visible light source or an infrared light source, and the second light source is the other of the infrared light source or the visible light source.

In some implementations, the inner surface of the light guide has a first end portion adjacent the first end of the light guide and a second end portion adjacent the second end of the light guide, and the second light source is disposed adjacent at least one of the first end portion or the second end portion.

In some implementations, at least a portion of the inner surface of the light guide comprises a plurality of micro-lenses configured for guiding light exiting the outer surface of the light guide to exit at an angle of about 90° from the outer surface of the light guide.

In some implementations, a density of the micro-lenses increases as a distance from the light source increases.

In some implementations, the end portion adjacent the light source is void of any micro-lenses.

In some implementations, the inner surface of the light guide has a first end portion adjacent the first end of the light guide and a second end portion adjacent the second end of the light guide. The second light source is an infrared light source disposed adjacent at least one of the first end portion or the second end portion.

In some implementations, the infrared light source comprises at least one infrared light emitting diode (LED).

In some implementations, the visible light source comprises at least one visible light LED.

In some implementations, the system further includes a third light source disposed adjacent the second end of the light guide and a fourth light source disposed adjacent the inner surface of the light guide and spaced apart from the second light source. The first and third light sources each comprise at least one visible light LED, and the second and fourth light sources each comprise at least one infrared LED.

In some implementations, the inner surface of the light guide has a first end portion adjacent the first end of the light guide and a second end portion adjacent the second end of the light guide, and the infrared LEDs are disposed adjacent the first end portion and the second end portion.

In some implementations, the outer and inner surfaces of the light guide are arcuate-shaped between the ends and spaced apart and opposite each other relative to a plane that extends through the first and second ends of the light guide and is parallel to the outer and inner surfaces of the light guide.

In some implementations, the system further includes an arcuate-shaped, transparent outer lens. The outer lens is disposed adjacent the outer surface of the light guide.

In some implementations, the inner and outer surfaces of the light guide have a radius of curvature that is similar to a radius of curvature of an arcuate shaped portion of a frame of a steering assembly, and the light guide is coupled to the arcuate shaped portion of the frame such that the inner and outer surfaces of the light guide follow the arcuate-shaped portion of the frame.

Various other implementations include an illumination system for a steering assembly of a vehicle. The illumination system comprises a segmented display, a light guide, an outer lens, and at least one light source. The segmented display has an outer surface and an inner surface that extend between a first end and a second end of the segmented display. The light guide has an outer surface and an inner surface that extend between a first end and a second end of the light guide. The outer surface of the light guide is disposed adjacent the inner surface of the segmented display. The outer lens is disposed adjacent the outer surface of the segmented display, and the outer lens comprises at least two graphic patterns on a surface thereof. And, the at least one light source is disposed adjacent the first end of the light guide. The light source emits visible light into the first end of the light guide. The light guide transmits light from the light source through at least a portion of the outer surface of the light guide toward the inner surface of the segmented display. The segmented display comprises two or more segments. Each segment is separately activatable for allowing passage of light from the inner surface of the segmented display through any activated segments of the segmented display and preventing passage of light through any non-activated segments of the segmented display. Each segment is adjacent a respective graphic pattern to be illuminated.

In some implementations, the segmented display is a liquid crystal display (LCD).

In some implementations, the LCD is an improved black nematic (IBN) display.

In some implementations, the light source is a light emitting diode (LED).

In some implementations, the at least one light source comprises a first LED emitting white light and a second LED emitting white light. The first LED is disposed adjacent the first end and the second LED is disposed adjacent the second end. The segments comprise a first filter segment that filters transmission of light wavelengths except for a first color and a second filter segment that filters transmission of light wavelengths except for a second color.

In some implementations, the system further comprises a computer processor for electrically communicating with a driver of the LCD. The computer processor is disposed on a rotatable portion of the steering wheel.

In some implementations, the computer processor is disposed adjacent the LCD.

In some implementations, the driver of the LCD is disposed on the LCD in a chip-on-glass configuration.

In some implementations, the steering wheel comprises a frame comprising a thermally conductive material, and the light source is thermally coupled to the frame such that heat is transferred away from the light source toward the frame.

In some implementations, the inner surface of the light guide comprises a plurality of micro-lenses configured for guiding light to exit from the outer surface of the light guide.

In some implementations, the lens comprises an inner surface and an outer surface. The inner surface is disposed adjacent the outer surface of the LCD, and the one or more graphic patterns are disposed on the outer surface of the lens.

In some implementations, the outer and inner surfaces of the LCD are arcuate-shaped between the ends and spaced apart from and opposite each other relative to a plane that extends through the first and second ends of the LCD and is parallel to the outer and inner surfaces. The outer and inner surfaces of the light guide are arcuate-shaped between the ends of the light guide and spaced apart and opposite each other relative to a plane that extends through the first and second ends of the light guide and is parallel to the outer and inner surfaces of the light guide. And, the lens comprises outer and inner surfaces and first and second ends. The outer and inner surfaces of the lens are arcuate-shaped between the ends of the lens and spaced apart and opposite each other relative to a plane that extends through the first and second ends of the lens and is parallel to the outer and inner surfaces of the lens.

In some implementations, the inner and outer surfaces of the LCD and light guide have a radius of curvature that is similar to a radius of curvature of an arcuate shaped portion of a frame of the steering wheel, and the LCD and light guide are coupled to the arcuate shaped portion of the frame such that the inner and outer surfaces of the LCD and light guide follow the arcuate-shaped portion of the frame.

In some implementations, the LCD and light guide are disposed within an arcuate shaped tray, and the arcuate shaped tray is coupled to the arcuate shaped portion of the frame.

In some implementations, the light source comprises a visible light multi-color LED.

In some implementations, the light source comprises a visible light single color LED.

In some implementations, graphic patterns are defined by at least one film disposed on the lens.

In some implementations, the film is disposed on the outer surface of the lens.

In some implementations, graphic patterns are defined by etching on the outer surface of the lens.

In some implementations, the graphic patterns are transparent or translucent and the lens adjacent the graphic patterns is opaque.

Various other implementations include an illumination system within a vehicle. The illumination system includes a light guide, at least one visible light source, and a lens. The light guide has an outer surface and an inner surface that extend between a first end and a second end of the light guide. The at least one visible light source is disposed adjacent the first end of the light guide. The light source emits visible light into the first end of the light guide. The lens has an inner surface and an outer surface. The inner surface of the lens is disposed adjacent the outer surface of the light guide, and the outer surface of the lens is covered by an opaque cover. The opaque cover defines transparent and/or translucent portions. The light guide transmits visible light from the visible light source through at least a portion of the outer surface of the light guide, and the light from the outer surface of the light guide passes through the lens and the transparent and/or translucent portions of the opaque cover.

In some implementations, the illumination system is coupled to a rim of a steering assembly, and the opaque cover matches an outer cover around the rim.

In some implementations, the opaque cover is leather, and the transparent and/or translucent portions are perforations defined in the opaque cover.

In some implementations, the light source is a visible light emitting diode (LED).

In some implementations, the light source comprises a first visible LED adjacent the first end of the light guide and a second visible LED adjacent the second end of the light guide.

In some implementations, the first visible LED emits a first color of light, and the second visible LED emits a second color of light.

In some implementations, the first and second color are the same.

In some implementations, the first and second color are different.

In some implementations, the outer and inner surfaces of the light guide are arcuate-shaped between the ends of the light guide and spaced apart and opposite each other relative to a plane that extends through the first and second ends of the light guide and is parallel to the outer and inner surfaces of the light guide.

In some implementations, the lens has a first end and a second end, and the outer and inner surfaces of the lens are arcuate-shaped between the ends of the lens as viewed from a first plane that extends through each end and as viewed from a second plane that extends perpendicular to the outer and inner surfaces of the lens.

In some implementations, the opaque cover is an opaque coating on the lens, and the transparent and/or translucent portions are etched from the opaque coating.

BRIEF DESCRIPTION OF DRAWINGS

Various implementations are explained in even greater detail in the following example drawings. The drawings are merely examples to illustrate the structure of various devices and certain features that may be used singularly or in combination with other features. The invention should not be limited to the implementations shown.

FIG. 3A is a schematic cross-section view of an example steering grip;
FIG. 3B is a partial view of a top section of an example steering grip;
FIG. 3C is a schematic partial cross-section view of an example steering grip and light element;
FIG. 6A is a plan view of an example steering grip;
FIG. 6B is a plan view of an example steering grip;
FIG. 6C is a plan view of an example steering grip;
FIG. 6D is a plan view of an example steering grip;
FIG. 7 is a partial plan view of an example steering grip and light element;
FIG. 8 is a partial plan view of an example steering grip and light element;
FIG. 9 is a partial plan view of an example steering grip and light element;
FIG. 10 is a partial plan view of an example steering grip and light element;
FIG. 11 is a partial plan view of an example steering grip and light element;
FIG. 16 is a left perspective view of the shaped light bar warning system shown in FIG. 15;
FIG. 17 is a partial right perspective view of the shaped light bar warning system of FIG. 15 cut along section line A-A of FIG. 2;
FIG. 18 is a partial left perspective view of the shaped light bar warning system of FIG. 15;
FIG. 21 is a perspective view of an outer lens that may be disposed over the shaped light bar warning system of FIG. 15, according to one implementation;
FIG. 22 is a perspective view of a frame coupling member according to an alternative implementation;
FIG. 23 is a side view of the frame coupling member shown in FIG. 22;
FIG. 24 is a side view of the outer lens and light guide having a light altering film disposed there between according to one implementation;
FIG. 25 is a side view of a portion of the light guide according to one implementation;
FIG. 28 is a side view of an illumination system according to another implementation.

DETAILED DESCRIPTION

Figure 1:
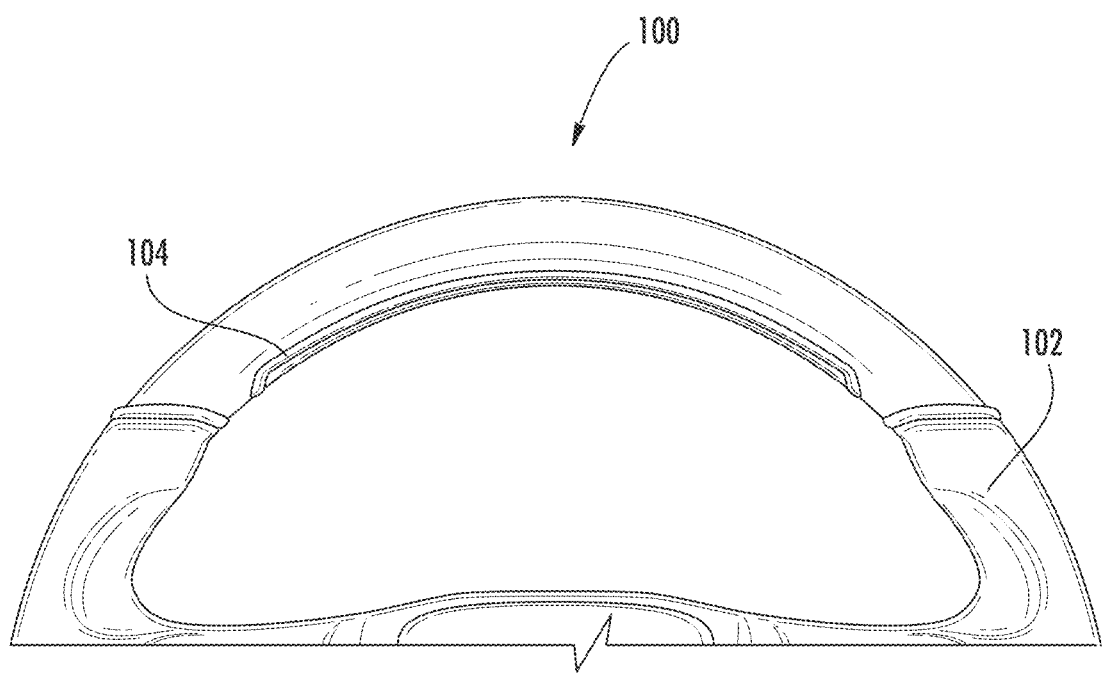
FIG. 1 is a partial plan view of an example steering grip.

Certain examples of implementations of the invention will now be described with reference to the drawings. In general, such implementations relate to a steering apparatus for a vehicle. FIG. 1 is a partial plan view of an example steering apparatus 100 having a steering grip 102. The steering grip 102 can be configured for gripping to facilitate control of the vehicle. For example, the steering grip 102 may be mounted on a fixed component (not shown) such that it is rotationally movable about a steering axis. An example fixed component can include, for example, a steering column, which receives a steering spindle that extends along the steering axis and serves to transmit the rotational movement of the steering grip 102 to the wheels of the motor vehicle. Rotational movement of the steering grip 102 may be transmitted to the wheels by mechanical and/or electrical means. In an example implementation, the steering grip 102 can include a single continuous grip portion or any number of unique grip sections. For example, the steering grip 102 can include an annular ring shape with an outer contour that is essentially circular in shape. In an alternate implementation, the steering grip 102 can define any suitable shape including, for example, circular, elliptical, square, rectangular, or any other regular or irregular shape.

In an example implementation, the steering apparatus 100 also includes a light element 104 for providing indication and/or warning light signals to the driver of the vehicle. The light element 104 can include, for example, a liquid crystal display (LCD), thin-film-transistor display, active-matrix display, a segmented display (e.g., improved black nematic (IBN), super twisted nematic (STN), etc.), a light-emitting diode (LED), laser, halogen, fluorescent, an infra-red (IR) LED illuminator, organic light emitting diode (OLED) display, or any other suitable light emitting element. In an alternate implementation, the light element can include a light pipe (not shown) having a start and end LEDs located at opposite ends of a (solid or hollow) molded plastic rod. The steering apparatus 100 can also include a reflective material or surface for recycling light emitted from the light element 104 and can be used to direct light to the driver. In an example implementation, when the light element 104 comprises an IR LED illuminator, illumination of the IR LED may also provide a desirable heat effect to the steering grip 102 and may direct heat towards the driver's hands. For example, a steering grip 102 may include a heat element, usually a heater mesh, used to provide a heat effect on the steering grip 102. The heat mesh may be wrapped around the steering grip 102 and/or incorporated into the grip cover material. In an example steering apparatus 100, the heat mesh does not cover over the portion of the steering grip 102 including the light element 104 thereby resulting in a gap in the heat effect. IR LEDs may be used as the light element 104 to provide the heat effect in the area of the light element 104, thereby providing a full heat effect at the surface of the steering grip 102. In another example steering apparatus 100, the heat mesh covers, partially or entirely, the portion of the steering grip 102 including the light element 104, thereby reducing and/or eliminating any gap in the heat effect.

Figure 2:
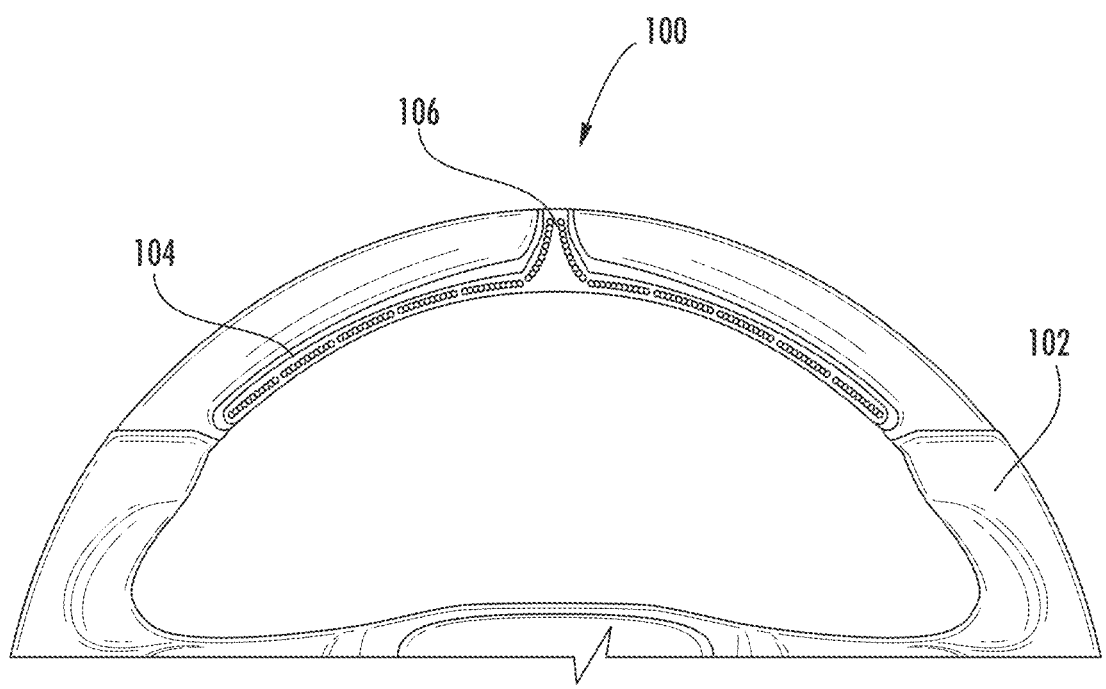
FIG. 2 is a partial plan view of an example steering grip.

In an example implementation, the light element 104 can display a single color or multiple colors. For example, the LED can include a single color LED, a bi-color LED, and a tri-color LED. The steering apparatus 100 can include a single light element 104 or any number of light elements 104. Moreover, different types of light elements 104 may be implemented on the same steering apparatus 100. For example, a steering grip 102 may include both standard LEDs and IR LEDs. The light element 104 can be located at any portion of the steering grip 102. For example, as illustrated in FIG. 1, the light element 104 can be located on an interior edge of the steering grip 102. In an alternate implementation, not shown, the light element 104 can be located on an exterior edge of the steering grip 102. In an alternate implementation (not shown), the light element 104 can be located on a front or back face of the steering grip 102. The light element 104 can be provided in a direction defined by the perimeter/diameter of the steering grip 102. For example, as illustrated in FIG. 1, the light element 104 can extend along the direction of the upper half of the steering grip 102 on the inner diameter of the steering grip 102. The light element can define any suitable shape including, for example, circular, elliptical, square, rectangular, or any other regular or irregular shape. For example, as illustrated in FIG. 1, the light element 104 is provided with an elongated shape having curvilinear sides. In an alternate implementation provided in FIG. 2, the light element 104 can include a vertical element 106 extending in a radial direction of the steering grip 102.

FIG. 3A provides a schematic side cross-section view of an example steering grip 102. As illustrated in FIG. 3A, the steering grip 102 includes a light element 104 positioned on the inner diameter of the steering grip 102. In particular, FIG. 3A illustrates that the body of the steering grip 102 and the light element 104 can be sized and configured such that the body of the steering grip 102 shields the light element from ambient light 108. For example, as provided in FIGS. 3B and 3C, the light element 104 is shielded from ambient light 108 directed at the upper portion/top side of the steering grip 102. Because the light element 104 is shielded from ambient light 108, a lower intensity light signal may be used. In an example implementation, a daylight warning intensity of the light element 104 may be about 150 to about 800 nit. In a particular implementation, the daylight intensity of the light element 104 may be about 150 to about 500 nit. In another implementation, the daylight intensity of the light element 104 may be about 150 to about 250 nit. In another example, the daylight intensity of the light element 104 may be at least about 250 nit. In another example, the daylight intensity of the light element 104 may be at least about 150 nit. In a further example implementation, because there is less ambient light at nighttime and because the light element 104 is shielding from the existing ambient light 108, the nighttime warning intensity of the light element 104 may be at least about 5 to about 50 nit. In another example, the nighttime warning intensity of the light element 104 may be at least about 5 to about 25 nit. In another example, the nighttime warning intensity of the light element 104 may be at least about 5 to about 15 nit. In another example, the nighttime warning intensity of the light element 104 may be at least about 5 to about 10 nit. In another example, the nighttime warning intensity of the light element 104 may be at least about 5 nit.

Figure 4:
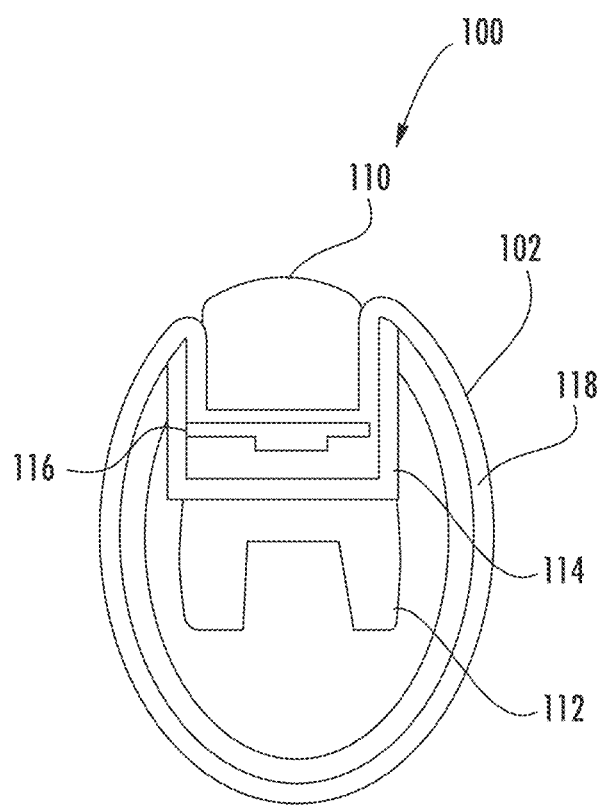
FIG. 4 is a schematic partial cross-section view of an example steering grip and light element.

In an example implementation, a lens 110 is configured to cover the light element 104. The lens 110 may be sized and shaped to correspond to the size and shape of the light element 104. As illustrated in FIG. 4, the outer surface of the lens 110 may be adjacent to the exterior surface of the steering grip 102. For example, the lens 110 may provide a surface that is congruent with the exterior surface of the steering grip 102. In an alternate implementation (not shown), the lens 110 may provide an outer surface that has a different general shape than the profile defined by the steering grip 102. The outer lens 110 may comprise a fully or partially transparent, translucent, or opaque body. The outer lens 110 can be constructed from a hard or soft material. The outer lens 110 can include a surface feature or texture to provide a grip or "feel" to the driver. The outer lens 110 can be constructed from a single layer of material or multiple layers of material. The outer lens 110 may filter, direct, or otherwise modify the properties of the light signals emitted from the light element 104. In an example implementation, the lens 110 is configured to shield the light element 104 from ambient light.

As illustrated in FIG. 4, the steering grip 102 also includes a frame 112 providing the support structure for the steering grip 102 and a carrier 114 mounted to the frame 112 and configured to engage a PCB 116 and/or control circuitry for supporting and controlling operation of the light element 104. The carrier 114 may be sized and shaped to facilitate attachment to various frame 112, PCB 116, and outer lens 110 structures. The carrier 114 can be mounted to the frame 112 using screws, hooks, clips, or any other form of mechanical fastener known in the art. A carrier 114 may be joined with the frame 112 using a thermally conductive "gap pad" or other thermally conductive adhesive. The frame 112 may also define the support structure for central hub and spokes of the steering grip 102. In an alternate implementation (not shown), the carrier 114 is not required and the PCB 116 and/or control circuitry is coupled to the frame 112 of the steering grip 102. As illustrated in FIG. 4, a steering grip 102 includes a covering 118 configured to cover the exterior of the steering grip 102 body and provide a surface for the driver to handle during operation of the vehicle. In an example implementation, the covering 118 may also, partially or fully, cover the lens 110 without severely impacting light transmission to the driver. It is contemplated, that, when covering the lens 110, the covering 118 conceals the lens 110 and light element 104 when not illuminated. Example covering 118 materials include, for example, leather, cloth, polyurethane foam, and various other synthetic materials.

Figure 5C:
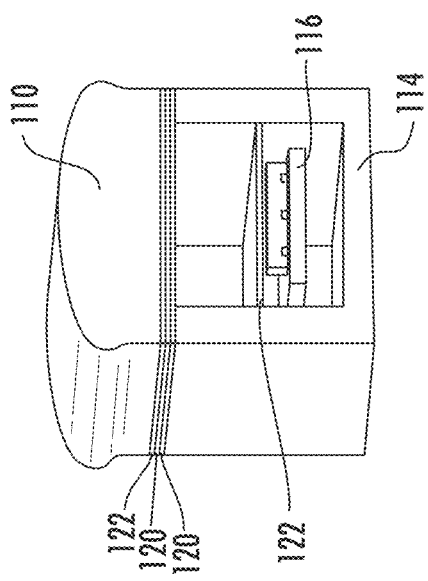
FIG. 5C is a partial cross-section view of an example light element.
Figure 5B:
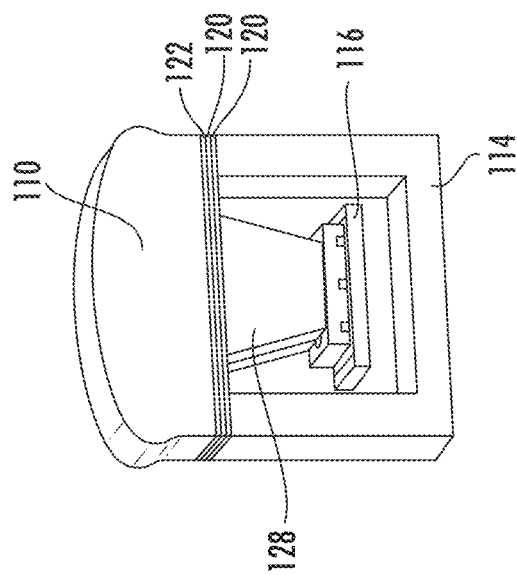
FIG. 5B is a partial cross-section view of an example light element.
Figure 5A:
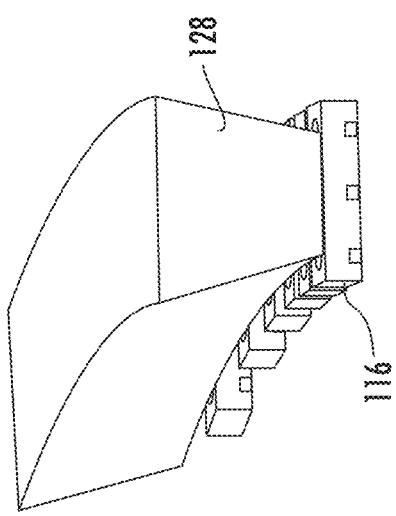
FIG. 5A is a partial cross-section view of an example light element.

In an example implementation, to reduce energy consumption and heat generation, the light emitted from the light element 104 is filtered and guided to maximize the light signal directed through the outer lens 110. In an example implementation, light emitted from the light element 104 is recycled using a solid acrylic lens 128. The lens 128 may be trapezoidal in shape such that light is reflected in the desired direction (i.e., at the driver). In an example implementation, reflective surfaces of the carrier 114 are painted white to ensure that light is reflected in the desired direction and not refracted internal to the system. Fillers and fibers can be added to the outer lens 110 and/or the lens 128 to direct light toward the driver and to increase the brightness of the light output by the outer lens 110. In a further implementation, brightness enhancing films 120 can be used to direct light to the driver. The brightness enhancing films 120 may be used individually or multiple films may be stacked together. As illustrated in FIG. 5B, multiple brightness enhancing films 120 may be stacked adjacent to the lens 128. In a further implementation, diffusing films 122 and/or textured lens surfaces may be used where high light intensity is not needed. As illustrated in FIG. 5B, diffusing films may be located adjacent to the brightness enhancing films 120. In an alternate implementation, a diffusing film 122 may be located adjacent to the LED 116. Light passes through the diffusing films 122 and into the brightness enhancing films 120. Another diffusing film 122 may be located adjacent to the brightness enhancing films 120 and the lens 110. By securing a tight coupling between the light element 104 to the outer lens 110, the brightness of the output light is increased. Any order or combination of brightness enhancing films 120, diffusing films 122, and lenses 118/110 are contemplated. In an example implementation, the brightness enhancing films 120 and diffusing films 122 may be stacked and oriented in such a way that the ambient light entering the lens 110 cannot pass through the lens 110. Blocking the ambient light allows the lens 110 to have a higher transmission rate while preventing internal components of the light assembly and steering grip 102 from being seen by the driver on from the outside.

The light element 104 can be associated with circuitry for controlling operation of the light signal provided by the light element 104. In an example implementation, the light element 104 may be wired directly to control circuitry of the steering apparatus 100. For example, the light element 104 may include a T-type LED that can be wired through an inline resistor to a steering apparatus 100 power source. In an alternate implementation, the light element 104 can be associated with a PCB (not shown) or processor mounted to or associated with the electronic control unit of the vehicle. The PCB/processor can be configured to provide operation instructions from the vehicle to the light element 104. In a further implementation, the light element 104 may be associated with a PCB 116 configured to provide operation instructions to the light element 104. For example, as illustrated in FIG. 4, the light element 104 can by physically mounted to the surface of the PCB 116. The PCB 116 can include, for example, rigid, semi-rigid, and flexible-type PCBs 116. An example PCB 116 can include a flex circuit wherein the LEDs 116 are mounted to backing material that acts as a heat sink. The backing material can include, for example, an aluminum flex backing. Other types and combinations of PCBs are contemplates.

In an example implementation, the PCB 116 can be mounted to the steering grip 102. For example, as illustrated in FIG. 4, the PCB 116 and/or control circuitry is mounted to the frame 112 of the steering grip 102 via carrier 114. In an alternate implementation (not shown), the PCB 116 and/control circuitry is mounted directly to the frame 112 of the steering grip 102. The board material of a PCB 116 may be constructed of FR-4 (G-10) glass reinforced epoxy laminate. Because FR-4 has a poor thermal conductivity (approximately 0.003 W/cm·C°), and because the frame 112 may be constructed of materials having high thermal conductivity including, for example, magnesium alloy (diecast) (1.575 W/cm·C°), aluminum alloy (diecast) (2.165 W/cm·C°), and steel (low carbon) (0.669 W/cm·C°), it is desirable to thermally couple the PCB 116 to the frame 112 in order to dissipate heat way from the light elements 104. In an example implementation, the PCB 116 can be thermally coupled to a heat exchange component associated with the steering grip 102. The heat exchange component can be configured to transfer heat from the PCB 116 to the steering grip 102. The heat exchange component may comprise, for example, a thermally conductive resin, an epoxy, a polymer, a silicone, an adhesive, a thermal pad, and/or a metal. In an example implementation, the steering grip 102 may be coupled to the central hub and spokes such that heat from the light element 104 can be transferred from the steering grip 102 to the spokes and central hub of the steering grip 102.

In a high intensity environment (e.g., 5 nit or greater), in order to ensure driver comfort in handling the steering grip 102 and to prolong life of the light element 104 (in hours of illumination), the heat exchange component dissipates heat from the light elements 104 at a rate sufficient to ensure that the surface temperature of the steering grip 102 does not exceed, approximately, 45° C. In an alternate implementation where only low intensity light elements 104 are used, the steering apparatus 100 may not include a heat exchange component. For example, in a system where the light element 104 generate a light at an intensity up to only 5 nit, the heat output by the light elements 104 will be not necessitate the use of a heat exchange component for dissipating heat from the light source 104.

In an example implementation, the steering apparatus 100 can include a single PCB 116 or multiple PCBs 116 located along the steering grip 102. For example, as illustrated in FIG. 6A, the steering grip 102 may include a single PCB 116 spanning the entire perimeter of the steering grip 102 thereby providing a 360° illumination system. In an alternate implementation illustrated in FIG. 6B, the steering grip 102 may include a single PCB 116 along the upper half of the perimeter defined by the steering grip 102. In a further implementations illustrated in FIGS. 6C-D, the steering grip 102 may include multiple PCBs 116. Because the steering apparatus 100, and in particular, the steering grip 102, is constructed to withstand substantial loading in the event of a crash, a steering grip 102 including multiple PCBs can provide for less likelihood that a PCB 116 will break upon impact and/or airbag deployment. Moreover, by locating multiple PCBs 116 along the diameter of the steering grip 102, and in particular along the upper half of the steering grip rim 102, helps to reduce the probability that a PCB 116 will break under a load at the 12 o'clock position on the rim of the steering wheel grip 102. As illustrated in FIG. 6C, the steering grip 102 may include multiple PCBs 116, including, for example, PCB 116A may be located on a right portion of the steering grip 102 diameter and PCB 116B may be located on a left portion of the steering grip diameter. In another implementation illustrated in FIG. 6D, the steering grip 102 may include three PCBs 116. PCB 116A may be located on a right portion of the steering grip 102, PCB 116B on a left portion of the steering grip, and PCB 116C on a top center portion of the steering grip 102, between PCBs 116A and 116B. In a further implementation, not shown, the steering grip 102 may include a PCB 116 located on a lower portion of the steering grip 102. Any number of locations and quantities of PCB 116 are considered within the disclosed implementation.

In an example implementation, the PCB 116 includes a single zone or multiple zones for directing operation of the light element 104. For example, in an example implementation, the PCB 116 may include one zone for controlling operation of the light element 104. The PCB 116 may control the light element 104 based on instructions provided to the corresponding zone of the PCB 116. The light element 104 may include a single light source, such as one LED, or it may include multiple light sources, i.e., multiple LEDs. In an example implementation, the PCB 116 can provide separate instructions to each of the individual LEDs within the same zone.

In an alternate implementation, the PCB 116 can include multiple zones, for example, two or more zones, each associated with a different light element 104 or group of light elements 104. Each zone can be configured to provide separate operating instructions to their respective light elements 104. In an example implementation, the LEDs may be arranged into groups and each group of LEDs assigned a zone on the PCB 116. For example, the PCB 116 may include 36 LED-style light elements 104. The PCB 116 may be divided into four zones, each zone associated with 9 LEDs. The PCB 116 can control operation of the LEDs in each of the four zones separately based on the instructions provided by the respective zones.

In an alternate implementation, the PCB 116 can include a number of zones corresponding to the number of light elements 104 present on the PCB 116, where each zone provides operation instructions to its corresponding light individual element 104. For example, a PCB 116 may include 36 LED-style light elements 104 and 36 zones corresponding to each of the 36 LEDs. The PCB can individually control operation of each of the 36 LEDs based on instructions provided to each of the corresponding 36 zones.

In an example implementation, the steering apparatus 100 may include a processor connected in communication with the PCB 116. The processor may be configured to direct operation of the light element 104. The processor can be associated with the steering apparatus 100. In an example implementation, the processor may be located on or proximate the PCB 116 of the steering grip 102. In an alternative implementation, the processor may be located on or otherwise associated with the electronic control unit of the vehicle. In a further implementation, the processor may be located on or otherwise associated with another vehicle system. Where the processor is associated with a system other than the steering apparatus 100 and/or the steering grip 102, communication lines (i.e., data and/or power wires) may be provided from the alternate system to the light element 104. For example, the light element 104 and/or the PCB 116 may be connected to the vehicle's electronic control unit (ECU) by a wire run from the ECU unit to the light element 104/PCB 116. In a further example, particular zones on the PCB 116 may communicate with a processor associated with a system other than the steering apparatus 100 and/or the steering grip 102, and communication lines (i.e., data and/or power wires) may be provided from the alternate system to the zoned PCB 116.

In an example implementation, the light element 104, PCB 116, and the processor are connected in communication with the vehicle by two wires where the first wire may provide a power source to the light element 104, PCB 116, and the processor and the second wire provides a data connection between the steering apparatus 100 and the vehicle. In a further example, the light element 104, PCB 116, and the processor may be connected in communication with the vehicle by two wires, one including multiple communication lines and the second wire including power source. For example, where the PCB 116 includes 6 zones, the first wire may include 6 communication lines for directing the operation of the corresponding zones, and the second wire may be a power source for providing power to the PCB 116. The light element 104, PCB 116, and the processor may, alternatively, be in communication with the vehicle at only a power source.

In an example implementation, the processor may be configured to receive information from the vehicle. Information received from the vehicle may include, for example, GPS (global positioning system) information, navigation information, foreign object proximity information, vehicle performance information, general warning information, course information, positioning information available from on-board sensor, such as cameras, radar, LIDAR (light detection and ranging) systems, vehicle communication system information, and any other information relevant to the operation of the vehicle, the status of the user, and/or the functioning of the steering apparatus 100.

Navigation information may include, for example, a preparation for course change (e.g., lane recommendation in anticipation of pending course change), a navigation course change (e.g., instructions for following determined route and/or notification that the determined route has been recalculated), and a distance to course change (e.g., distance to turn). Foreign object proximity information may include, for example, the distance and direction to an identified foreign object, the size of a foreign object, and the relative speed and direction of the foreign object. Vehicle performance information may include, for example, on/off operation of the vehicle, battery life/status, fuel level, fuel efficiency, engine RPM, vehicle oversteer, vehicle understeer, turbocharger/supercharger boost pressure, an electrical vehicle (eV) status, stop and go vehicle mode, steering grip 102 straight-ahead position, vehicle lateral acceleration, autonomous vehicle driving state information, and adaptive cruise control state information. General vehicle warning information may include, for example, occupant restraint information, airbag status information, door or window open/ajar, low tire pressure, vehicle entertainment and communication system status (e.g., incoming call, Bluetooth activated, audio volume, etc.). Course information may include, for example, a measure of a course remaining (e.g., a racing lap time countdown as a binary clock, lap segments, time segments, etc.) and a measure of the course remaining/completed (e.g., quantity of racing laps).

Operation of the light element 104 may be directed in response to information received from the steering apparatus 100 and/or information received from the vehicle. The light element 104 may be used to provide information and warning signals to the driver of the vehicle. In a further implementation, the light element 104 may be used to provide an aesthetically pleasing/decorative effect. For example, the light element 104 may be used at vehicle start up to provide a decorative effect in addition to providing an indication to the driver of the vehicle's operation status.

Directing illumination of the light element 104 may include, for example, the on/off state of the light element 104, intensity, design/pattern, on/off illumination cycle, color, or any other feature of the light element that can be controlled or otherwise manipulated. In an example implementation, the on/off status of the light element 104 can be controlled. For example, in an implementation including multiple light elements 104, the quantity of light elements 104 illuminated at a given time can be used to indicate the magnitude and/or scale of the warning or event, the greater the number illuminated the greater the threat and/or importance of the warning/event. Similar to quantity, the intensity of the light elements 104 can be used to indicate the magnitude and/or scale of the warning or event, the greater the light intensity the greater the threat and/or importance of the warning/event. The on/off illumination cycle or frequency of illumination of the light element 104 can also be controlled to create a flashing or strobe-like effect. For example, a high frequency on/off illumination cycle may be used to indicate an important and/or time sensitive event to the driver such as an impact or collision warning. In a further example, when the light element 104 comprises an IR illuminator, a strobed/flashing light signal may be used to illuminate the driver's eyes for use in camera-based driver monitoring systems. The operation of the IR illuminator-type light element 104 may be timed in communication with a camera, or other sensing device, and a processor to capture an image of the driver's eyes. Moreover, the use of IR LEDs can be used to mitigate light reflection when the driver is wearing eye glasses.

The selection of a light element 104 for illumination at a certain position can also be used to indicate the relative position of the warning or event. For example, if an impact or collision warning is anticipated at the front driver's side section of the car, the light element 104 at a corresponding position on the steering grip 102 (i.e., upper left quadrant) may be illuminated. Similarly, the on/off illumination cycle may be used to create a motion effect. The perceived direction of the light pattern can be used to indicate the relative direction of warning. For example, an on/off illumination pattern starting from the center of the steering grip 102 and progressing toward the left side of the grip 102 may create an illuminated wave-like effect toward the left that can be used to indicate a warning/event associated with the left side of the vehicle or an indication to the driver of a pending course change in a navigational setting.

In a steering apparatus 100, a pattern of illumination of the light element 104 can also be controlled. For example, in an implementation including multiple light elements 104, the light elements 104 may be sized and located such that a shape or pattern may be created by illuminating particular light elements 104. In an example implementation, the color of the light element 104 can also be controlled. The color of the light element may be used to indicate the severity or a threat level associated with a particular event. For example, colors such as red, yellow, and green can be used to indicate the escalating severity/threat associated with a particular event, red indicating severe, yellow a moderately severe/warning, and green little or no threat. For example, if the vehicle senses an impact or collision warning or if the vehicle is traveling faster than allowable speed limit, the color of the light elements 104 may progress from green to yellow to red as the severity of the warning/event escalates. In an alternate implementation, controlling the color of the light element 104 may be used to indicate a vehicle status or provide general driver indications. For example, colors such as blue or white may be used to indicate general vehicle status and driver indication.

The following illumination combinations are provided as examples and should not be considered limiting on the disclosed invention. Additional and alternative light element 104 locations and configurations are contemplated. Various combinations of light element 104 operation may be utilized to indicate the relative position and/or threat levels associated with a particular warning/event, as well as provide general status information to the driver.

In an example implementation, operation of the light element 104 may be directed in response to information received from the vehicle and/or information received from the steering apparatus 100. Information received from the vehicle can include, for example, GPS information, on-board sensor information, camera information, communication system information, and lane position information. The operation of the light element 104 may be directed to provide the driver with a lane departure warning. A lane departure warning indication wherein the light position indicates the direction of the threat event is illustrated in FIG. 7. When the vehicle is in a straight ahead orientation, the illuminated light element 104 may be centered on the steering grip 102 (Position 1). In response to the received information, as the vehicle moves to the left side of the lane of travel, the light elements 104 on the left side of the steering grip 102 are illuminated (Position 2). As the vehicle moves progressively further toward the left side of the lane of travel, light elements 104 further along the left side of the steering grip 102 are illuminated (Position 3 and Position 4). Alternatively, as the vehicle moves to the right side of the lane of travel, the light elements 104 on right side of the steering grip are illuminated (Position 2). As the vehicle moves progressively further toward the right side of the lane of travel, the light elements 104 further along the right side of the steering grip are illuminated (Position 3 and Position 4). In an example implementation, the time to lane cross may be used to determine the threat level associated with the vehicles direction of travel.

As outlined above, both the quantity and position of lights may be used to indicate the relative position and/or threat level associated with the warning/event. A lane departure warning indication wherein the quantity and position of illuminated light elements 104 are used to indicate the relative position and/or threat level of the warning or event is provided in FIG. 8. When the vehicle is in a straight ahead orientation, the illuminated light element 104 may be centered on the steering grip 102 (Position 1). In response to information received from the vehicle (e.g., GPS information, on-board sensor information, camera information, communication system information, and lane position information), as the vehicle moves to the left side of the lane of travel, additional light elements 104 on the left side of the steering grip 102 are illuminated (Position 2). As the vehicle moves progressively further toward the left side of the lane of travel, additional light elements 104 further along the left side of the steering grip 102 are illuminated (Position 3 and Position 4). Alternatively, as the vehicle moves to the right side of the lane of travel, additional light elements 104 on right side of the steering grip are illuminated (Position 2). As the vehicle moves progressively further toward the right side of the lane of travel, additional light elements 104 further along the right side of the steering grip are illuminated (Position 3 and Position 4). In an example implementation, the time to lane cross may be used to determine the threat level associated with the vehicles direction of travel and the rate and quantity of the illumination of the additional light elements 104 are illuminated.

As outlined above, the color of the illuminated light elements may be used to indicate the relative position and threat level associated with the warning/event. A lane departure warning indication wherein the color and position of the illuminated light elements 104 are used to indicate the relative position and/or threat level of the warning or event is provided in FIG. 9. When the vehicle is in a straight ahead orientation, the illuminated light element 104 may be centered on the steering grip 102. The illuminated light element may be provided in a color that indicates no threat/warning associated with the given lane position. As illustrated in FIG. 9, the illuminated light element may be green when the steering grip 102 is a centered/straight ahead position (Position 1). In response to information received from the vehicle (e.g., GPS information, on-board sensor information, camera information, communication system information, and lane position information), as the vehicle moves to the left or right side of the lane of travel, the light elements 104 on the left side of the steering grip 102 or the light elements 104 on the right side of the steering grip 102 are illuminated. An initial indication of lane departure may be provided by green illuminated light elements 104 (Position 2). As the vehicle moves progressively further toward the left or right side of the lane of travel, light elements 104 further along the left/right side of the steering grip 102 are illuminated. These light elements may indicate a moderate threat/warning and may be provided, for example, by yellow illuminated light elements 104 (Position 3). As the vehicle moves progressively further toward the left or right side of the lane of travel, the light elements 104 further along the left/right side of the steering grip 102 are illuminated. These light elements may indicate a severe and/or immediate threat and may be provided, for example, by red illuminated light elements 104 (Position 4). In an example implementation, the time to lane cross may be used to determine the threat level associated with the vehicles direction of travel.

In a further implementation, the vertical element 106 can include be used to indicate the relative position and threat level associated with a particular warning/event. As illustrated in FIG. 10, the vertical element 106 may include a plurality of light elements 104. When the vehicle is in a straight ahead orientation, the light elements 104 centered in the vertical element 106 may be illuminated (Position 1). Because the relative threat/warning level in the straight ahead position is minimal, the illuminated light element 104 in Position 1 may be green. In response to information received from the vehicle (e.g., GPS information, on-board sensor information, camera information, communication system information, and lane position information), as the vehicle moves to the left or right side of the lane of travel, the light elements 104 on the left or right side, respectively, of the vertical element 106 are illuminated. For example, an initial indication that the vehicle is tending toward the left side of the lane of travel may be provided by illumination of the light elements 104 on the left side of the vertical element (Position 2). These light elements 104 may indicate a moderate threat/warning and may be provided, for example, by yellow illuminated light elements 104. As the vehicle moves progressively further toward the left or right side of the lane of travel, the light elements 104 may change colors from yellow to red, indicating that the threat level associated with the lane departure has escalated from moderate to severe and/or immediate.

In an example implementation, the vertical element 106 can be used to indicate the relative position and/or threat level associated an impact/collision warning. As illustrated in FIG. 11, the vertical element 106 may include a plurality of light elements 104. The operation of the light elements 104 may be directed in response to foreign object proximity information received from the vehicle. Illumination of the light elements 104 may indicate the presence of a foreign object within a predetermined distance of the vehicle and/or a distance to the foreign object. In response to the object data, the light elements 104 located on the steering grip 102 illuminate. For example, as the object is approaching the light elements 104 may illuminate in a wave pattern suggesting the direction of the object and/or the proximity of the object to the vehicle. As a further example, the light elements 104 may illuminate in an illumination pattern, at a greater on/off frequency, at a particular quantity of light elements 104, with greater intensity, and/or varying colors as the direction and/or the proximity of the object to the vehicle change.

Figure 12:
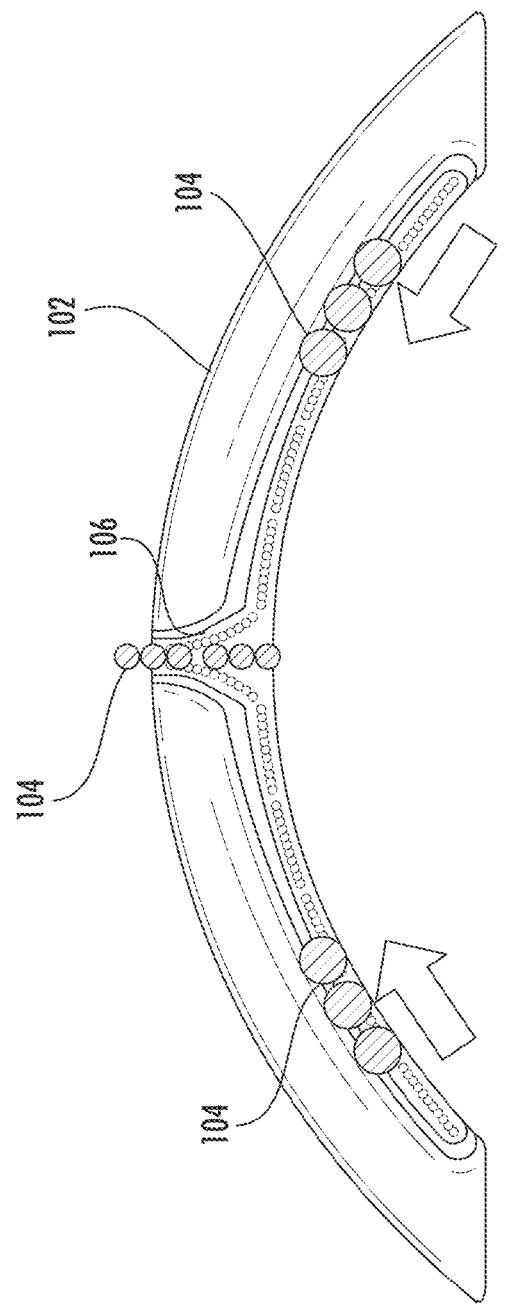
FIG. 12 is a partial plan view of an example steering grip and light element.

In an example implementation, the vertical light element 106 can be used in conjunction with the light elements 104 position on the side of the steering grip 102. For example, as illustrated in FIG. 12, the light elements 104 can be used to guide the driver in operation of the vehicle. A steering apparatus 100 can be used guide a driver into a parking space. In the example implementation, the light elements 104 can be used to direct the driver to aim the vehicle in a particular manner. Operation of the light elements 104 can include, for example, on/off illumination, illumination pattern, on/off cycling, intensity, and color. It is contemplated that operation of the light elements 104 of the vertical element 106 may be independent from the operation of the light elements 104 included along the diameter of the steering grip 102. For example, the light elements 104 of the vertical element 106 may be used to indicate proximity to a foreign object (e.g., parked car) while the light elements 104 included along the diameter of the steering grip 102 as used to provide directional and navigation information to the user. As illustrated in FIG. 12, the light elements 104 included along the diameter of the steering grip 102 can illuminate at a location and frequency to suggest the direction of travel of the vehicle. In an alternate implementation, the operation of the light elements 104 of the vertical element 106 may be in cooperation with the light elements 104 included along the diameter of the steering grip 102. For example, both the vertical and radial light elements 104 may be used to provide navigation information to suggest the direction of travel of the vehicle.

In a further implementation, the vertical and/or radial light elements 104 may be used to indicate a difference between the posted speed limit and the actual speed of the vehicle. For example, the steering apparatus 100 may receive information including GPS information and vehicle performance information. The GPS information may include information associated with a posted speed limit at the vehicle's current location. The vehicle performance information may include information associated with the actual speed of the vehicle. The vehicle and/or the steering apparatus 100 can determine that the vehicle is exceeding the posted speed limit and the operation of the light elements 104 may be directed to indicate a threat/warning associated with speed of the vehicle.

In an example implementation, the steering apparatus may include a sensor (not shown) located on the steering grip 102. The sensor may detect the driver input and/or touch on the steering grip. Examples of sensors include, for example, capacitive sensors, pressure sensors, and conductivity/resistivity sensors. The sensor may be in communication with the PCB 116 and/or the processor. In an further implementation, the driver's input may be transmitted to the electronic control unit of the vehicle. In an example implementation, the steering apparatus 100 may be configured to receive autonomous driving state information and/or adaptive cruise control information from the vehicle. The autonomous driving state information may indicate that the vehicle is operating autonomously and not under human control. The adaptive cruise control information may include whether the adaptive cruise control feature is engaged. Adaptive cruise control maintains a set distance between the car immediately in front of the driver's vehicle and/or stops the vehicle completely when an emergency situation is identified. In some autonomous driving state and the adaptive cruise control settings, some vehicles direct acceleration/braking of the vehicle in addition to controlling steering (e.g., to keep the vehicle within the lane when braking). For the lane keeping feature of the adaptive cruise control it is essential that the driver be holding the steering grip 103 or the braking feature will not engage. Similarly, in some situations the autonomous driving state of the vehicle may disengage (e.g., stop and go traffic), in these situations it is also essential that the driver holding the steering grip 103. Therefore, using on the received information about the state of the vehicle and/or sensor information confirming the driver's input/contact with the steering apparatus 100, operation of the light element 104 may be directed to indicate that the vehicle is not operating under human control or that human operation of the vehicle is necessary and the driver is required to engage the steering grip 102.

In an alternative implementation (not shown), the steering apparatus 100 also includes an acoustic display and/or a haptic display devices that work exclusively from or in conjunction with the light element 104. The haptic displays can include, for example, vibrators arranged on the steering grip 102/steering apparatus 100 such that vibration of the steering grip 102 is felt by the driver in every grip position. The steering apparatus 100 may be configured to direct operation of the vibrator in response to information received from the vehicle, information received from the steering grip 102, and/or input information received from the driver at the steering grip 102. Operation of the vibrator can include, for example manipulating the frequency and intensity the produced vibration.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 13:
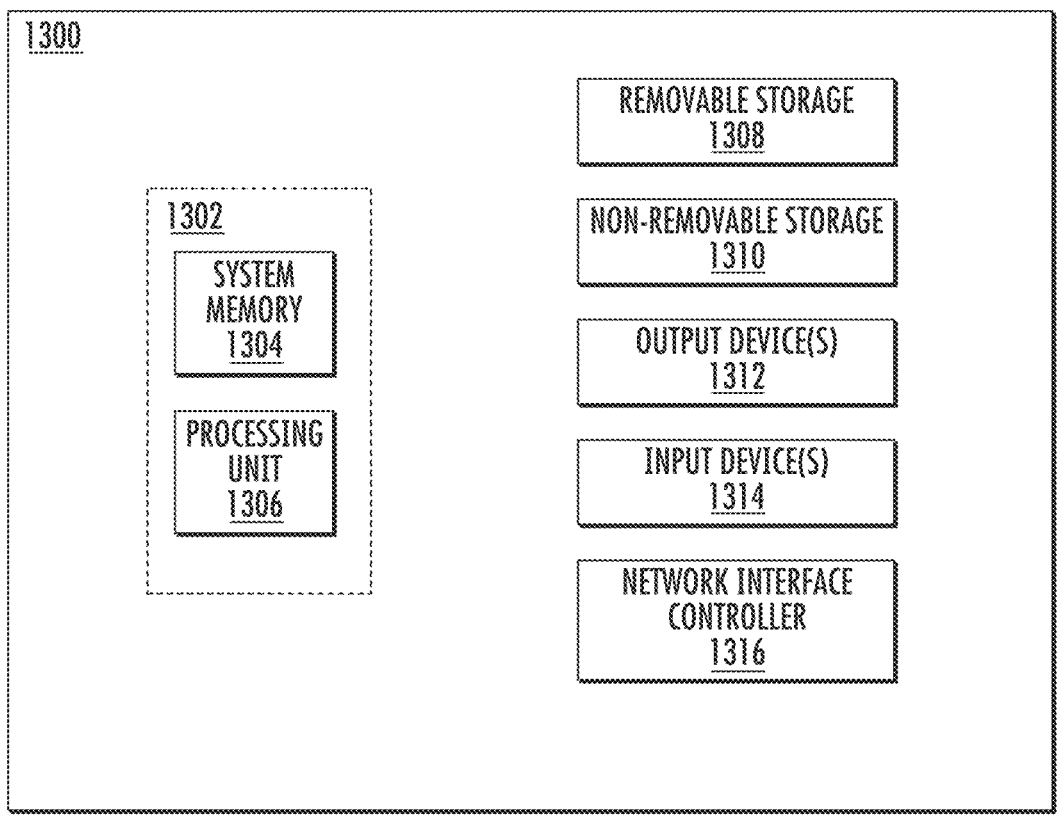
FIG. 13 is a schematic computer system architecture of an example steering apparatus.

When the logical operations described herein are implemented in software, the process may execute on any type of computing architecture or platform. For example, the functions of the PCB, processor, control circuitry, and vehicle electronics control unit, as described above, may be implemented on any type of computing architecture or platform. An example implementation illustrated in FIG. 13 provides an example computing device upon which embodiments of the invention may be implemented. The computing device 1300 may include a bus or other communication mechanism for communicating information among various components of the computing device 1300. In its most basic configuration, computing device 1300 typically includes at least one processing unit 1306 and system memory 1304. Depending on the exact configuration and type of computing device, system memory 1304 may be volatile (such as random access memory (RAM)), non-volatile (such as read-only memory (ROM), flash memory, etc.), or some combination of the two. This most basic configuration is illustrated in FIG. 13 by dashed line 1302. The processing unit 1306 may be a standard programmable processor that performs arithmetic and logic operations necessary for operation of the computing device 1300.

Computing device 1300 may have additional features/functionality. For example, computing device 1300 may include additional storage such as removable storage 1308 and non-removable storage 1310 including, but not limited to, magnetic or optical disks or tapes. Computing device 1300 may also contain network connection(s) 1316 that allow the device to communicate with other devices. Computing device 1300 may also have input device(s) 1314 such as a keyboard, mouse, touch screen, etc. Output device(s) 1312 such as a display, speakers, printer, etc. may also be included. The additional devices may be connected to the bus in order to facilitate communication of data among the components of the computing device 1300. All these devices are well known in the art and need not be discussed at length here.

The processing unit 1306 may be configured to execute program code encoded in tangible, computer-readable media. Computer-readable media refers to any media that is capable of providing data that causes the computing device 1300 (i.e., a machine) to operate in a particular fashion. Various computer-readable media may be utilized to provide instructions to the processing unit 1306 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1306 may execute program code stored in the system memory 1304. For example, the bus may carry data to the system memory 1304, from which the processing unit 1306 receives and executes instructions. The data received by the system memory 1304 may optionally be stored on the removable storage 1308 or the non-removable storage 1310 before or after execution by the processing unit 1306.

Computing device 1300 typically includes a variety of computer-readable media. Computer-readable media can be any available media that can be accessed by device 1300 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1304, removable storage 1308, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 14:
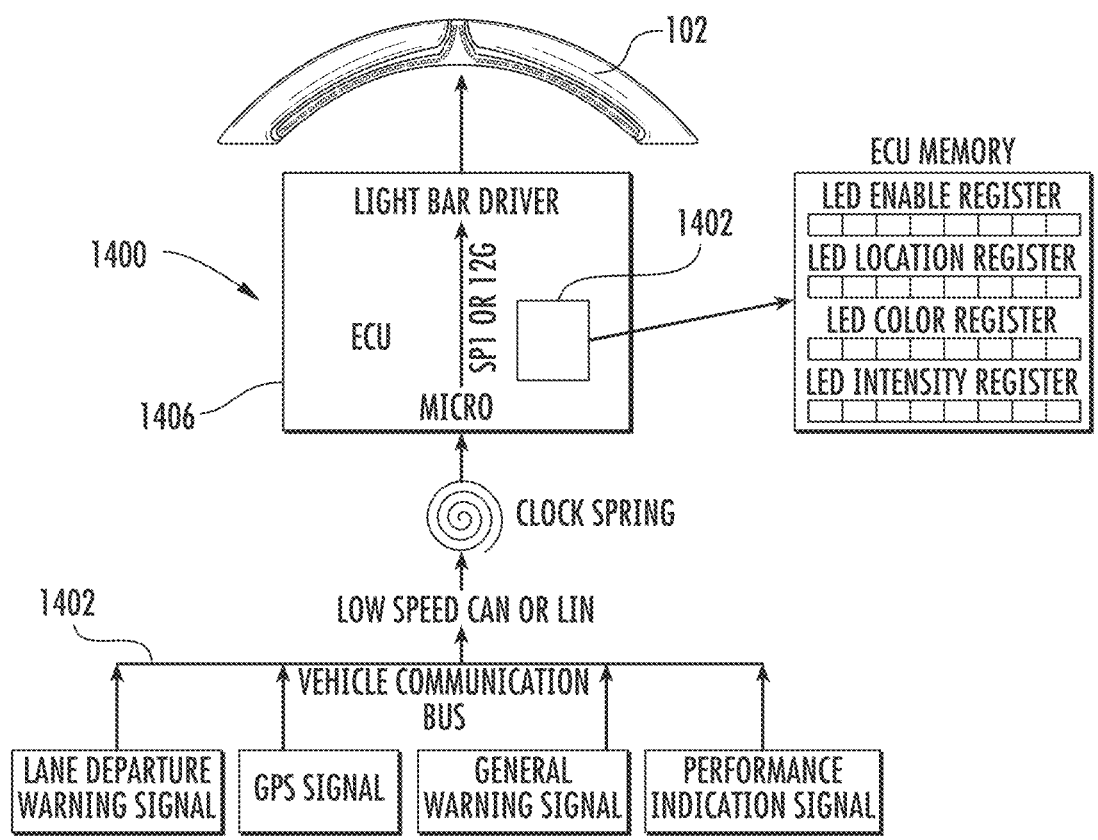
FIG. 14 is a schematic computer system architecture of an example steering apparatus.

FIG. 14 provides schematic illustration of a computer architecture upon which the invention may be implemented. The computing device 1400 may include a processing unit 1406 and a memory 1404. The memory 1404 may include various registers. Registers may include an LED enable register, an LED location register, and LED color register, and an LED intensity register. The computing device 1400 may include a light element driver for providing illumination instructions to the light element 104.

The computing device 1400 may include a bus 1402 or other communication mechanism for communicating information among various components of the computing device 1400. In an example implementation, the bus 1402 may provide a communication link between the computing device 1400 and the vehicle. In an alternate implementation, the bus 1402 may provide a communication link between the computing device 1400 and various vehicle components. Information transmitted by the bus 1402 may include, for example, lane departure warning signal information, GPS signal information, general warning signal information, and vehicle performance indication signal information.

An example implementation may include a clock spring 1408 associated with the processing unit 1406 and the communication bus 1402. The clock spring 1408 may provide an electrical connection/communication link between the processing unit 1406 and other vehicular systems via the bus 1402 when the processing unit 1406 is disposed on the rotatable portion of the steering grip 102/steering apparatus 100. A clock spring 1408 includes a rotary-type electrical connection that permits rotation of the steering grip 102 while maintaining an electrical connection with the bus 1402. For example, the clock spring 1408 may include a static element, generally mounted to the steering column, and a rotating element, generally mounted to the steering grip 102.

The implementations shown in FIGS. 15-27 include a shaped light bar warning system 204 as the light element.

Figure 15:
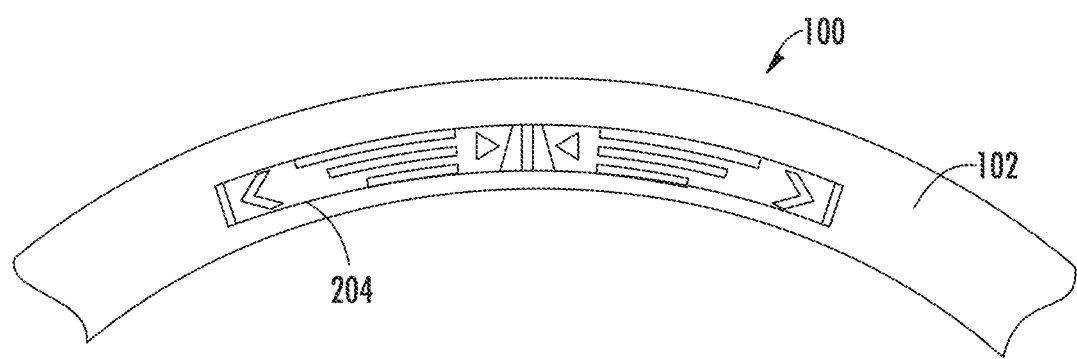
FIG. 15 is a partial plan view of an example steering grip and shaped light bar warning system.

The shaped light bar warning system 204 is disposed on the arcuate shaped rim portion of a steering grip 102 of steering apparatus 100 in a vehicle. For example, FIG. 15 illustrates the shaped light bar warning system 204 disposed in the upper, central portion of the rim portion of the steering grip 102 of the vehicle. The warning system 204 is configured to communicate to the operator of the vehicle one or more of the following conditions: whether there is an object in a blind spot area adjacent the vehicle, whether the vehicle is approaching an object in front of the vehicle too quickly, whether the operator should turn the vehicle toward the right or left, and/or whether the vehicle is drifting outside of its lane. In other implementations, the warning system 204 may be configured for communicating other information to the vehicle operator, such as is described above in relation to FIGS. 1 through 14.

FIG. 16 illustrates a perspective view of the shaped light bar warning system 204 according to one implementation. The warning system 204 includes a liquid crystal display (LCD) 206, a light guide 208, and at least one light emitting diodes (LED) 210. The LCD 206 includes an outer surface 212, an inner surface 214, a first end 216, and a second end 218. The outer surface 212 and inner surface 214 extend between the ends 216, 218, are arcuate-shaped, and are spaced apart from and opposite each other relative to a plane that extends through the ends 216, 218 and is parallel to the outer 214 and inner surfaces 216.

In one implementation, the LCD 206 is an improved black nematic (IBN) display that includes a plurality of electrical traces that define the portions (or segments) of the display that may be selectively illuminated to communicate to the vehicle operator. For the IBN display shown in FIG. 16, the glass is normally black, but when the traces are turned on (receive a current), the portion of the glass adjacent the traces becomes transparent allowing light to pass through the portion and out of the outer surface 214. In other implementations (not shown), the LCD 206 can be any type of LCD suitable for communicating to the operator.

Figure 20:
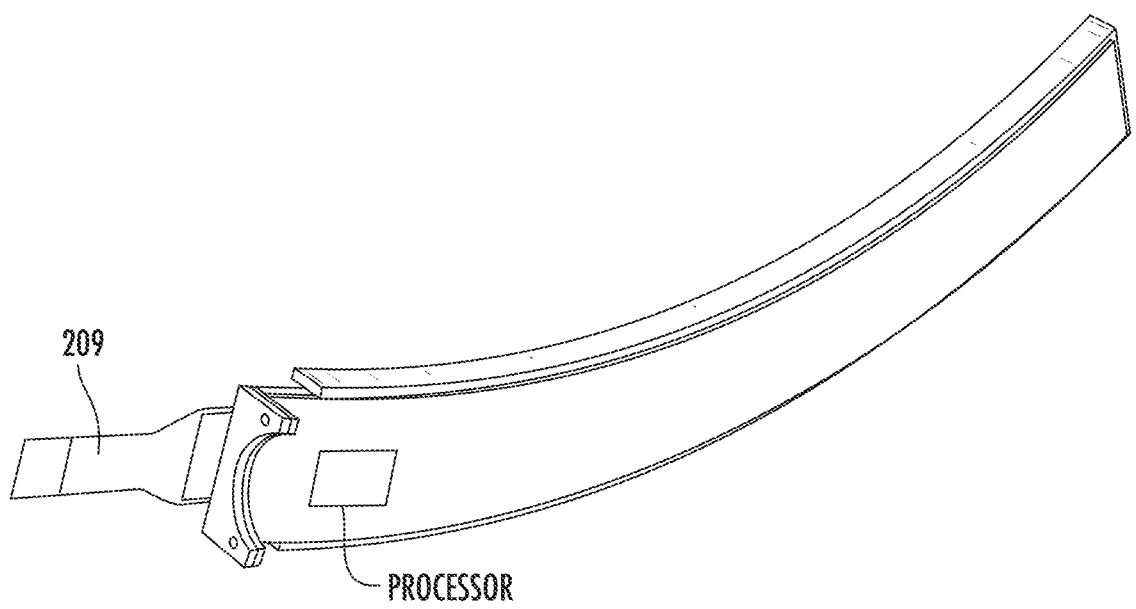
FIG. 20 is a rear perspective view of the shaped light bar warning system of FIG. 15.

In addition, the IBN display 206 shown in FIG. 16 includes a chip-on-glass configuration, wherein an LCD driver that provides current to the traces is disposed on the LCD glass. Processor 1406 communicates to the LCD driver is disposed adjacent the LCD glass and is in electrical communication with the LCD driver via a flexible, wire tape 209 that is coupled between the LCD driver and the processor, such as processor 1406 described above in relation to FIGS. 13 and 14. In other implementations, the processor may be a separate processor from processor 1406. In addition, the processor may be disposed on the warning system 204, such as shown in FIG. 20 and described below, or on another part of the rotatable portion of the steering wheel 102. The processor that controls the LCD driver may also control operation of the LEDs 210, or a separate processor may be provided to control the LCD driver and the LEDs 210, according to various implementations. In addition, in some implementations, the LEDs 210 are turned off when the LCD 206 is turned off.

The LCD 206 shown in FIGS. 15-20 includes three warning areas. The three warning areas include blind spot warning areas 219*a*, 219*b* adjacent each end 216, 218 of the LCD 206, a lane departure warning area 221 adjacent a central portion of the LCD 206, and forward collision/proximity warning areas 223*a*, 223*b* between the lane departure warning area 221 and the blind spot warning areas 219*a*, 219*b*. However, in alternative implementations, the LCD may be configured to provide other types of warnings to the vehicle operator or other passengers in the vehicle.

Each blind spot warning area 219a, 219b includes a vertically oriented bar adjacent each end 216, 218 and an arrow inward of the vertically oriented bar that points toward the bar. The blind spot warning area 219a is illuminated in response to receiving information that there are one or more objects within a certain distance range on the left side of the vehicle, and the blind spot warning area 219b is illuminated in response to receiving information that there are one or more objects within a certain distance range on the right side of the vehicle. The warning areas 219a, 219b may be illuminated anytime there is an object within the distance range on the respective side of the vehicle, or only when the vehicle is moving toward the objects without the respective blinker on, according to certain implementations. Furthermore, the blind spot warning areas 219a, 219b may be illuminated in one or more colors, such as white, green, yellow, and/or red. And, in certain implementations, the blind spot warning areas 219a, 219b may appear to flash on and off to further attract the operator's attention.

The lane departure warning area 221 includes two trapezoidal shaped areas that narrow in width toward a top of the area 221. Two arrows are disposed on either side of the trapezoidal shaped areas and point inwardly toward the trapezoidal shaped areas and each other. In response to receiving information that the vehicle is drifting out of its lane toward the left, the trapezoidal shaped areas and the left arrow are illuminated. Similarly, in response to receiving information that the vehicle is drifting out of its lane toward the right, the trapezoidal shaped areas and the right arrow are illuminated. The processor controlling the illumination may illuminate the lane departure warning area 221 when the vehicle is drifting out of its lane but the blinker is not on, according to one implementation.

The forward collision warning/proximity warning areas 223a, 223b each include a set of three, arcuate shaped bars that are vertically arranged relative to each other. The lengths of the bars are staggered such that the bar closest to the hub of the steering wheel 102 is shortest, and the length of the bar furthest from the hub is longest. As the vehicle approaches an object in front of the vehicle, for example, both sets of bars begin to illuminate in order from the shortest bar to the longest bar. As another example, the processor controlling the illumination of the bars may illuminate one of the sets of bars as the vehicle approaches a turn that corresponds to the side of the set of bars, illuminating the bars in order from the shortest to the longest as the vehicle gets closer to the turn. For example, the right set of bars may be illuminated as the vehicle approaches a right turn. As another example, the bars may flash when the vehicle gets within a certain distance of a turn or an object in front of the vehicle that poses a collision risk. Furthermore, the bars may be illuminated in one or more colors to communicate with the operator. For example, the bars may be illuminated white or green to communicate an upcoming turn. Alternatively, the lowest bars may be illuminated yellow when a forward collision risk is initially detected, and the uppermost bars may be illuminated red when the forward collision risk is within a certain distance range of the vehicle.

In other implementations (not shown), the warning areas described above may be displayed on another type of arcuate shaped display, such as an arcuate shaped OLED display.

Figure 19:
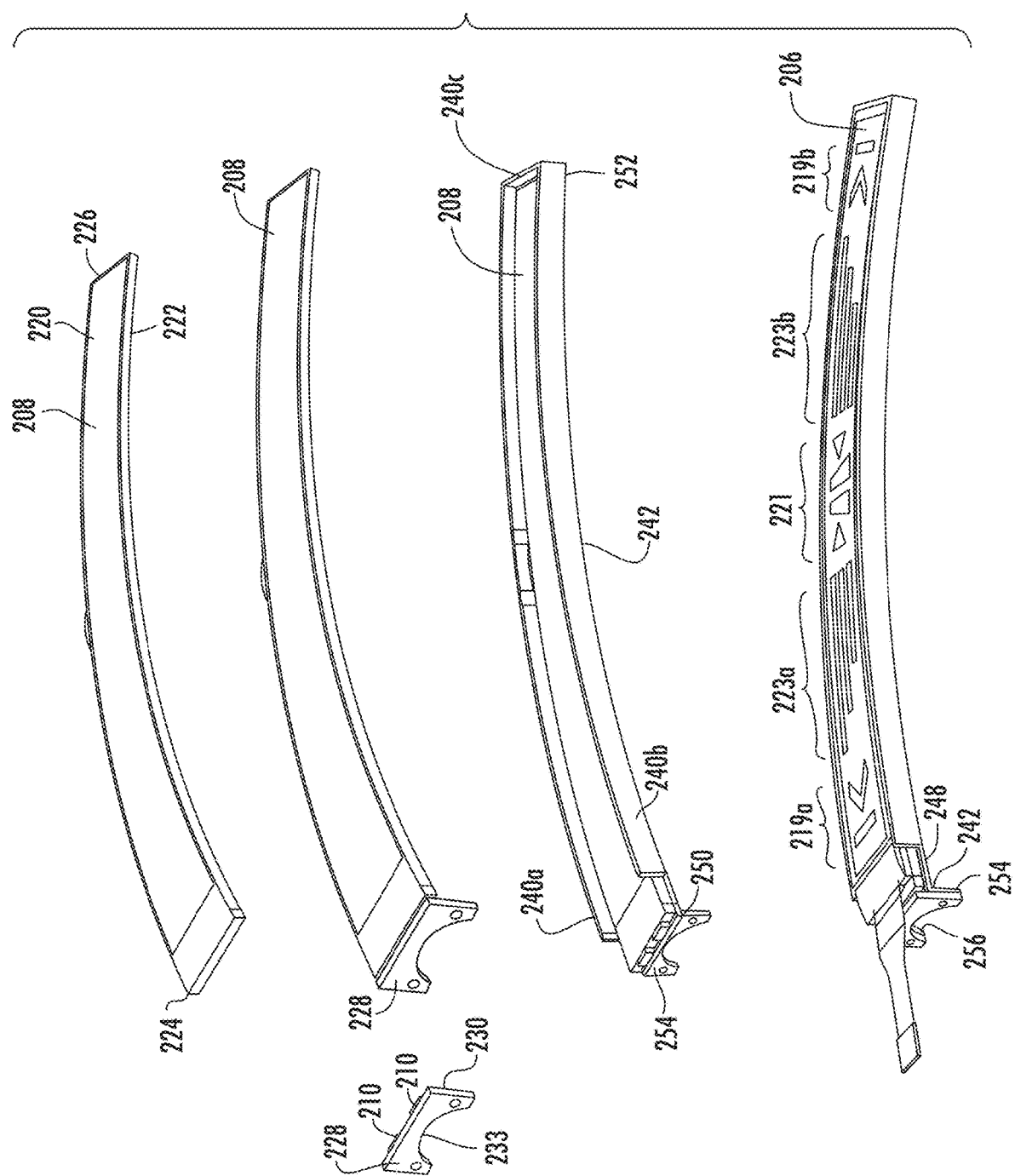
FIG. 19 is an exploded view of the shaped light bar warning system of FIG. 15 illustrating its assembly, according to one implementation.

The light guide 208, which is shown more clearly in FIG. 19, includes an outer surface 220, an inner surface 222, a first end 224, and a second end 226. The outer surface 220 and inner surface 222 extend between the ends 224, 226, are arcuate-shaped, and are spaced apart from and opposite each other relative to a plane that extends through the ends 224, 226 and is parallel to the outer 220 and inner surfaces 222. The outer surface 220 of the light guide 208 is disposed adjacent the inner surface 214 of the LCD 206, as shown in FIGS. 17 and 18. The light guide 208 is configured for transmitting light through at least a portion of its outer surface 220 toward the inner surface 214 of the LCD 206 to illuminate the selected portions of the LCD 206. In the implementation shown in FIGS. 16-20, the light guide 208 is configured for transmitting light through the entire outer surface 220 of the light guide 208. Example materials that may be used for the light guide 208 include polycarbonate, polycarbonate blends, acrylic, nylon, or other suitable materials.

The outer surface 220 of the light guide 208 may define a plurality of micro-lenses configured for guiding light exiting the outer surface 220 of the light guide 208 to exit at an angle of about 90° from the outer surface 220. For example, the micro-lenses may include a plurality of V-shaped notches defined in the outer surface 220, a plurality of embossed or debossed radial notches defined in the outer surface 220, or a combination thereof. A portion of the outer surface 220 of light guide 208 with V-shaped notches 232 defined thereon is shown in FIG. 25. In other implementations, such as shown in FIGS. 31A and 31C, the inner surface of the light guide may define the micro-lenses. These micro-lenses may be in addition to or as an alternative to the micro-lenses on the outer surface 220. In addition, in some implementations, a light diffusing film may be disposed on the outer surface 220 of the light guide 208 to prevent the micro-lenses from being visible to a vehicle operator.

The LEDs 210 are disposed adjacent the first end 224 of the light guide 208 and emit light into the first end 224 of the light guide 208. For example, the LEDs 210 may be top-firing LEDs that are disposed on a surface 230 of PCB 228, such as is shown in FIG. 19. The surface 230 of the PCB 228 on which the LEDs 210 are disposed is arranged at an angle of about 90° to the inner 222 and outer surfaces 220 of the light guide 208. However in other implementations, the LEDs may be side firing and may be arranged at an alternative, suitable angle relative to the inner 222 and outer surfaces 220 of the light guide 208.

The PCB 228 shown in FIG. 19 defines a recessed portion 233. The recessed portion 233 may be configured to fit adjacent the frame 112 of the steering wheel 102. For example, as shown in FIG. 19, the recessed portion 233 is arcuate shaped to fit around a portion of the frame 112. In other implementations (not shown), the recessed portion 233 may be configured to follow the profile of the frame 112. In other implementations (not shown), the PCB 228 may be configured to couple to the frame 112 or an intermediate structure using other suitable fastening mechanisms.

The warning system 204 may also include a tray 234 that defines a channel. At least a portion of the channel may have a reflective surface. In particular, the channel defined by the tray 234 may include a floor 238 and side walls 240a, 240b. The floor 238 is arcuate shaped, and the side walls 240a, 240b extend perpendicularly from each arcuate shaped side of the floor 238. The inner surface 222 of the light guide 208 is disposed on the floor 238 between the side walls 240a, 240b, and the inner surface 214 of the LCD 206 is disposed on the outer surface 220 of the light guide 208 between the side walls 240a, 240b. The reflective surface is configured for reflecting light into the light guide 208. For example, the reflective surface may reflect light that has escaped the light guide 208 back into the light guide 208. The reflective surface can be a film, coating, paint, or other suitable material applied to the channel of the tray 234, or the reflective surface may be integrally formed with the tray 234. In addition, the reflective surface may have a metallic color, a glossy finish, a textured finish, or some other suitable color or finish that is cosmetically appealing when the light source is turned off. In some implementations, the tray 234 may also include a third side wall at a distal end 240c of the tray 234 that extends from the floor 238 at an angle of about 90°, such as is shown in FIG. 19. Example materials that may be used for the tray 234 include polycarbonate-acrylonitrile butadiene styrene (PC-ABS), nylon, polycarbonate, acrylic-styrene-acrylonitrile-polycarbonate (ASA-PC), polypropylene (PP), or other suitable materials.

The warning system 204 may also include a frame coupling member 242 that is configured for coupling the tray 234 to the frame 112 of the steering wheel 102. The frame coupling member 242 includes inner 246 and outer surface 248 that extend between a first end 250 and a second end 252 of the frame coupling member 242. The inner 246 and outer surfaces 248 are arcuate shaped and are opposite and spaced apart from each other relative to a plane that extends between the first 250 and second ends 252 and is parallel to the inner 246 and outer surfaces 248. The tray 234 is disposed on the outer surface 248 of the frame coupling member 242 such that the channel faces away from the frame 112 of the steering wheel 102, and the inner surface 246 of the frame coupling member 242 is disposed adjacent and facing the frame 112. The first end 250 includes an attachment leg 254 that extends from the inner surface 246 at an angle of about 90°. The attachment leg 254 defines a recessed portion 256 that is configured to receive at least a portion of frame 112. For example, the recessed portion 256 may be arcuate shaped, such as is shown in FIG. 19, or the recessed portion 256 may trace the profile of the frame 112. In addition, the attachment leg 254 may define one or more bosses 258 that are configured for receiving fasteners for joining the attachment leg 254 of the tray 242 to the PCB 228. Furthermore, the inner surface 246 of the frame coupling member 242 may include fastening mechanisms for securing the frame coupling member 242 to the frame 112. Fastening mechanisms may include, but are not limited to, one or more clips, one or more bosses for receiving fasteners such as screws, bolts, or ties, for example, or grooves/extended portions for engaging a mating portion on the steering wheel frame 112. Other methods of fastening the frame coupling member 242 to the frame 112 may include adhesives, welding, or other suitable fastening methods.

The frame coupling member 242 may include a thermally conductive material such that the frame coupling member 242 can transfer heat from the PCB 228 and/or other components of the system 204 to the frame 112.

In other implementations (not shown), the system 204 may not include the frame coupling member 242, and the tray 234 and/or light guide 208 may be coupled to the frame 112 directly or indirectly via another structure.

Figure 27:
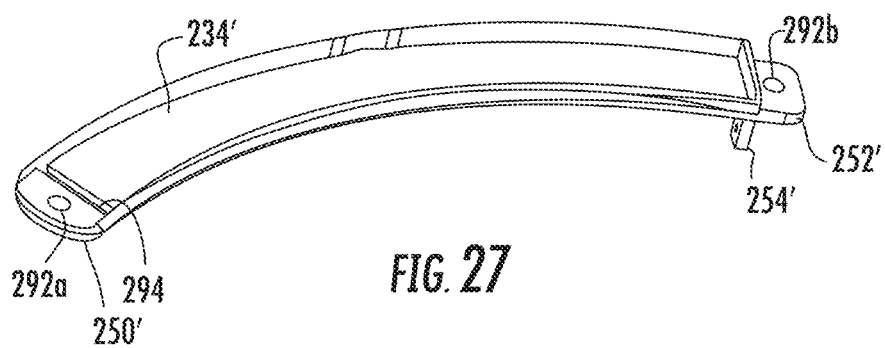
FIG. 27 is a perspective view of a tray according to another implementation.

FIG. 27 illustrates another implementation of the tray 234'. In this implementation, tray 234' is directly coupled to the frame 112, without the need for separate frame coupling member as described above. The second end 252' of the tray 234' includes an attachment leg 254'. In addition, the first end 250' of the tray 234' and the second end 252' each define an opening 292a, 292b, respectively. A fastening mechanism, such as those described above, may be engaged through each of the openings 292a, 292b to couple the tray 234' to the steering wheel frame 112. In addition, in the implementation shown in FIG. 27, the tray 234' defines a slot 294 through which the PCB, such as PCB 228 shown in FIG. 19, may be inserted.

The warning system 204 may also include an outer lens that is coupled adjacent the outer surface 212 of the LCD 206 to improve the robustness of the LCD 206. FIG. 21 illustrates one implementation of outer lens 260. The outer lens 260 defines a channel having a ceiling 262 and at least two walls 264a, 264b that extend away from the ceiling 262 adjacent each side of the ceiling 262. The ceiling 262 includes an inner surface 266 and an outer surface 268 that are arcuate shaped and are opposite and spaced apart from each other relative a plane that extends through each end of the outer lens 260. The side walls 264a, 264b extend from the inner surface 266 along each arcuate shaped side of the inner surface 266 at an angle of about 90°. The side walls 264a, 264b are disposed adjacent the tray side walls 240a, 240b, and the inner surface 266 is disposed adjacent the outer surface 212 of the LCD 206. The outer lens 260 is transparent such that light from the LCD 206 may pass through it and be visible to the vehicle operator. Example materials that may be used for the outer lens 260 include polycarbonate, polycarbonate blends, acrylic, nylon, or other suitable materials.

Furthermore, various fastening mechanisms may be used to secure the outer lens 260 relative to the light guide 208, including a friction fit, one or more clips, snaps, clamps, screws, or bolts, welding, heat staking, or a combination thereof FIG. 24 shows an alternative implementation of the warning system 204 that includes one or more light altering films 280, such as films 120, 122 described above, disposed between the outer lens 260 and the light guide 208. The light altering films 280 may be configured for diffusing, focusing, blocking, partially blocking, enhancing, or redirecting light passing between the outer surface 220 of the light guide 208 and the inner surface 266 of the outer lens 260. The films 280 may be applied to the inner surface 266 of the outer lens 260, the outer surface 264 of the outer lens 260, the outer surface 220 of the light guide 208, or a combination thereof, for example.

For example, in one alternative implementation, the warning system 204 may be configured to not include the LCD 206. In such an implementation, the warning system 204 communicates with the vehicle operator via the light emitted from the light guide 208. This implementation provides a simple, low cost method of communicating with the operator.

Figure 26A:
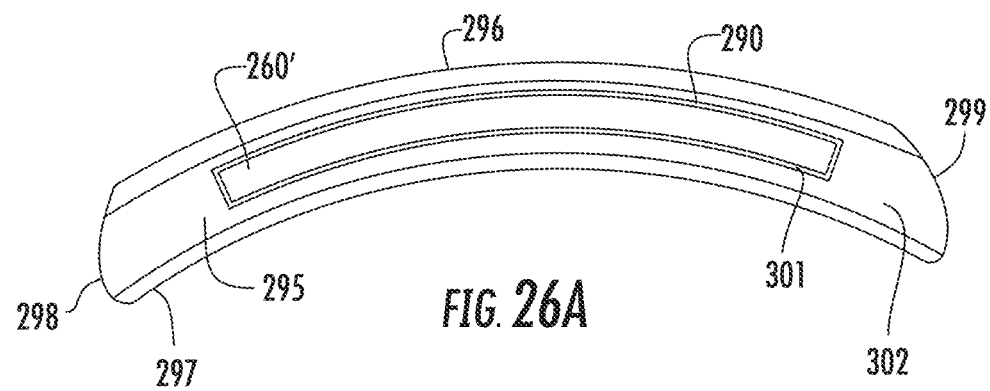
FIG. 26A is a perspective view of an inner surface of an outer cap according to one implementation.
Figure 26B:
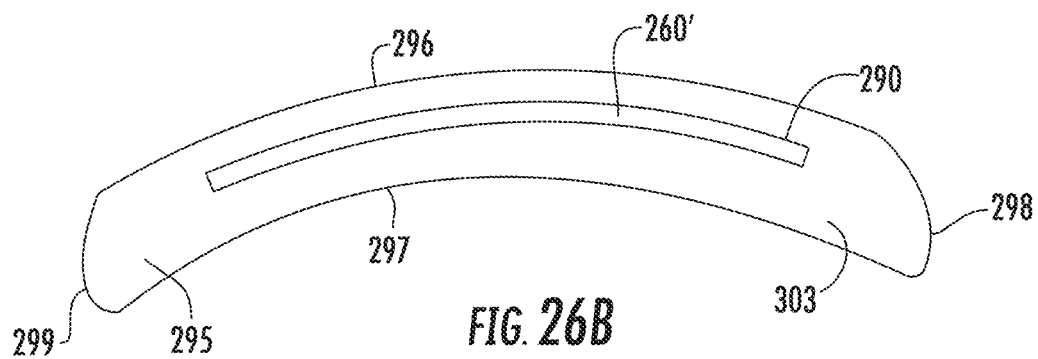
FIG. 26B is a perspective view of an outer surface of the outer cap shown in FIG. 26A.

In one such implementation, an outer cap 295, such as is shown in FIGS. 26A and 26B, is disposed over the tray 234 and the light guide 208 and is coupled to the tray 234 and/or frame 112. FIG. 26A illustrates an inner surface 302 of the outer cap 295. As shown, the outer cap 295 has an upper edge 296 and a lower edge 297 that are arcuate shaped between a first end 298 of the cap 295 and a second end 299 of the cap 295 to follow the curvature of the steering wheel. The outer cap 295 defines an arcuate shaped opening 290 in a central portion of the cap 295. Outer lens 260' is disposed adjacent the opening 290. The lens 260' may be coupled to the inner surface 302 of the cap 295 via an adhesive 301 or other suitable fastening mechanism. As shown in FIG. 26B, when the cap 295 is disposed over the tray 234 and light guide 208 and its outer surface 303 is facing the cabin of the vehicle, light from the light guide 208 is emitted through the lens 260', creating a narrow, arcuate shaped light bar. In implementations in which the cap 295 is opaque, light is only emitted from the lens 260'. However, in other implementations, at least a portion of the cap 295 may be translucent.

The cap 295 may have a curved or partially curved inner surface 302 and outer surface 303 to correspond with an annular shaped surface/contour of some steering wheels. In addition, the outer surface 303 of the cap 295 may be colored or covered with a material to match or correspond with the skin of the steering wheel.

When the LEDs are not on, ambient light may enter the lens 260' and illuminate the reflective surface of the tray 234. To avoid this creating a distraction or being aesthetically unpleasing, the tray 234 may be coated with a material, such a darker reflective material (e.g., metallic colored), or subjected to a surface treatment, such as to provide a glossy or textured finish. Alternatively or in addition, the outer lens 260' may be tinted to reduce the transmissivity of the lens 260, which can reduce the amount of ambient light that enters the lens 260' and light guide 208. In addition, in some implementations, the outer lens 260' and the cap 295 are integrally formed, and areas having different transmissivity may be formed using one or more light altering films disposed on the cap 295 (e.g., using in mold decoration (IMD) labeling or other suitable process). FIGS. 22 and 23 show an alternative implementation of the warning system 204 that includes a first set of LEDs 110 adjacent the first end 224 of the light guide 208 and a second set of LEDs 111 adjacent the second end 226 of the light guide 208. The LEDs 110, 111 emit light into respective ends 224, 226 of the light guide 208.

In the implementations described above with respect to FIGS. 15-25, the outer surfaces of various components of the light bar warning system 204 are arcuate-shaped such that the radius of curvature of these components is similar to the radius of curvature of the rim portion of the steering wheel 102 on which the warning system 204 is disposed and the arcuate shaped portions follow the arcuate shaped rim portion of the steering wheel frame 112. This may provide a more aesthetic appearance to the vehicle operator. In addition, by including the warning system 204 adjacent an upper central portion of the steering wheel 102, the warning system 204 is within the field of view of the vehicle operator while the vehicle operator is looking towards the front of the vehicle, thus providing a more effective and less disruptive method of communicating to the vehicle operator.

Figure 29:
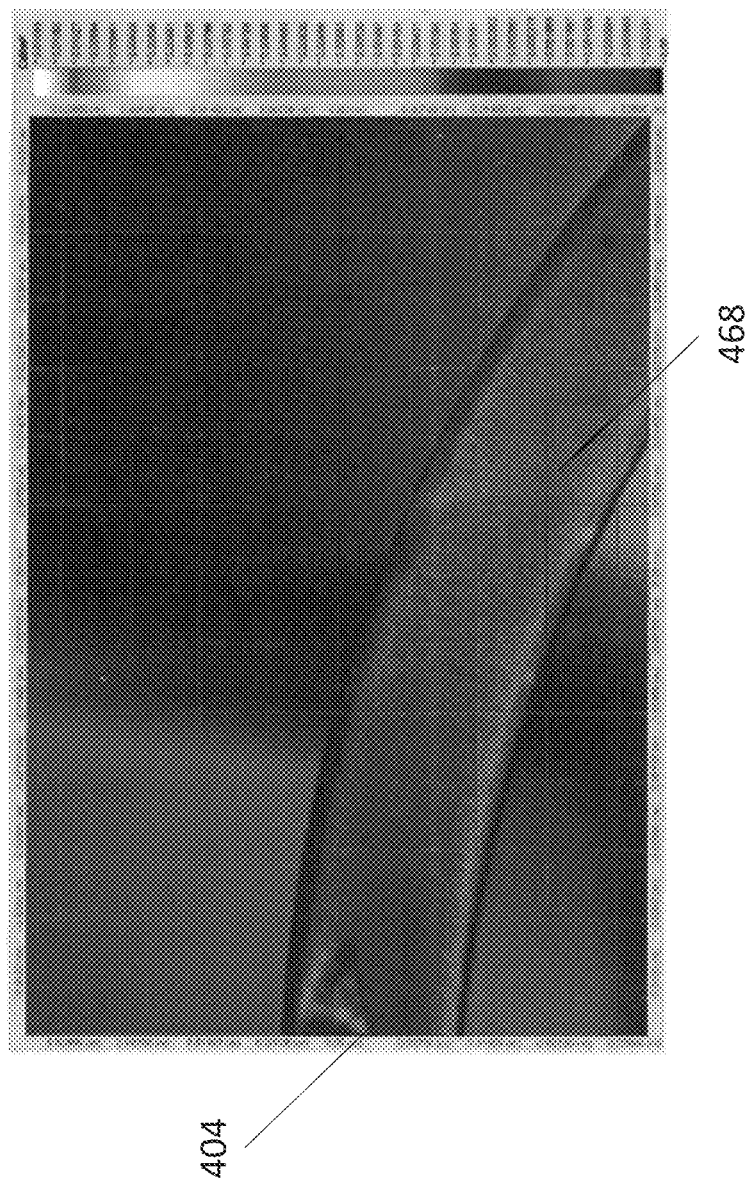
FIG. 29 is an infrared image of the illumination system of FIG. 28.

FIGS. 28-29 illustrate an illumination system 404 that may be coupled anywhere on the steering grip 102 or in the vehicle for illuminating the interior of the vehicle. A use of the illumination system 404 is for providing illumination for an occupant monitoring system. As shown in FIG. 28, the illumination system 404 includes a light guide 408, a lens 460, a carrier 434, and a light source 410 coupled to a PCB 428.

The light guide 408 is similar to the light guides described above in relation to FIGS. 15-20 and 24-25. The light guide 408 has an arcuate shape, similar to light guide 208. However, in other implementations, the shape of the light guide 408 may be selected based on the area of the vehicle where the light guide is to be mounted. For example, the light guide 408 may have a rectangular, trapezoidal, circular, or other suitable shape as viewed from an outer surface thereof.

In the implementation shown in FIGS. 28 and 29, the light guide 408 can be coupled to a rim portion of the steering grip 102. The radius of curvature of the inner 422 and outer surface 420 of the light guide 408 is similar to (e.g., matches, coordinates with) the radius of curvature of the rim portion.

The lens 460 may be similar to the lens 260 and/or lens 260' and cap 295 described above in relation to FIGS. 15-21 and 24. And, the tray 434 is similar to the trays 234, 234' described above in relation to FIGS. 15-20 and 27. The light guide 408 is disposed within the tray 434 such that an inner surface 422 of the light guide 408 faces a floor 438 of the tray 434. However, in other implementations in which the light guide 408 is to be coupled to other portions of the steering grip 102 or elsewhere in the vehicle, another base structure may be used in lieu of the tray 434. For example, in implementations in which the light guide 408 is coupled to the hub portion of the frame 112, such as the upper portion of the hub portion, a base that engages first or second surfaces of the light guide 408 to secure the orientation of the light guide may be used, such as base 320 described below in relation to FIGS. 35-39.

The light source 410 includes at least one IR light source, such as an IR LED, and is disposed adjacent a first end 424 of the light guide 408. The IR LED 410 is coupled to a PCB 428, such as is described above. In some implementations, the PCB 428 is thermally coupled to the frame of the steering grip 102.

An inner surface 466 of the lens 460 faces an outer surface 420 of the light guide 408. IR light emitted by the IR LED 410 travels through the light guide 408 from the first end 424 to a second end 426 of the light guide 408 and through the outer surface 420. The light emitted from the outer surface 420 of the light guide 408 enters the inner surface 466 of the lens 460 and passes through and is emitted out of an outer surface 468 of the lens 460, which is shown by the arrows in FIG. 28.

Light reflecting features, such as micro-lenses and/or films, such as those described above and below in relation to FIGS. 31A and 31C, may be disposed on the inner surface 422 or the outer surface 420 of the light guide 408 to direct the light traveling through the light guide 408 out of the outer surface 420 of the light guide 408 at a certain angle or range of angles.

FIG. 29 illustrates an infrared image of the illumination system 404, showing the IR light being emitted from the outer surface 468 of the lens 460.

In some implementations, one or more light directing films may be disposed between the outer surface 420 of the light guide 408 and the inner surface 466 of the lens 460. The light directing films may be any of those described above. The light directing films change a characteristic of the light passing through the film. In some implementations, a film or material that is opaque to visible light but allows for the transmission of IR light may be provided on the outer surface 420 and/or the inner surface 466 or one or more portions thereof to control how IR and visible light are transmitted through the lens 460 and light guide 408.

Figure 30:
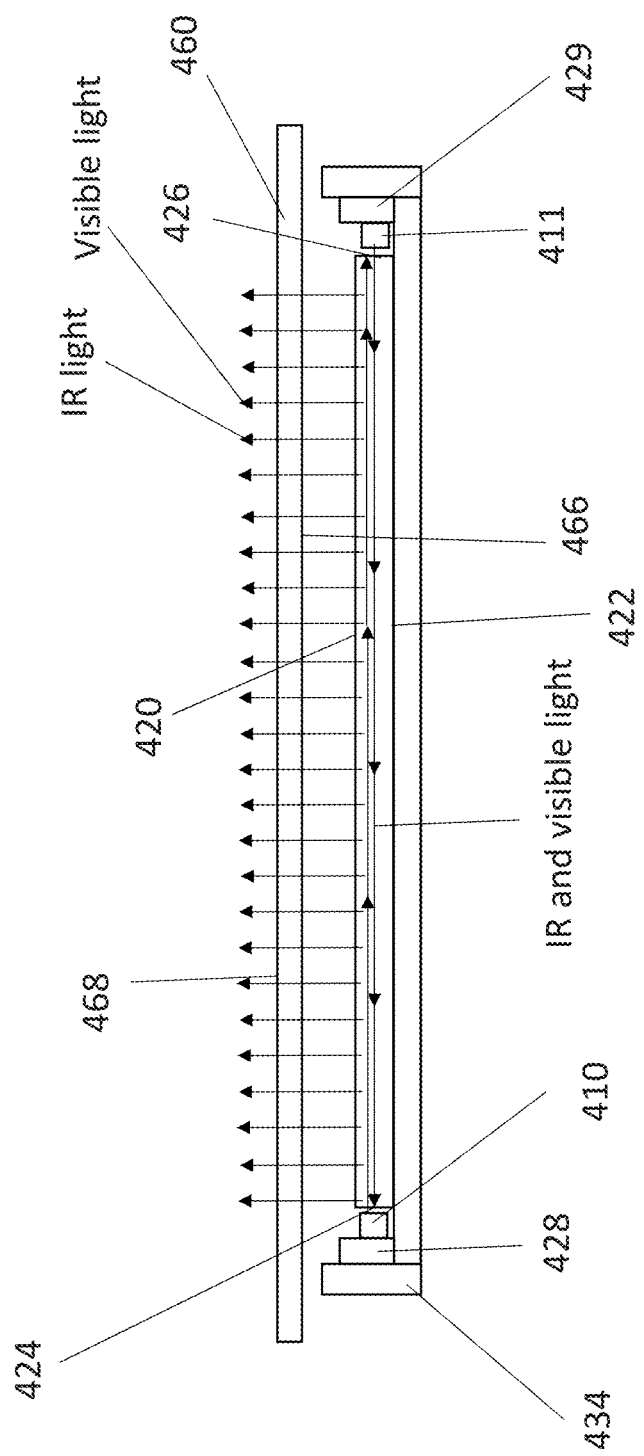
FIG. 30 is a side view of an illumination system according to another implementation.

FIG. 30 illustrates a variation of the implementation shown in FIG. 28 that also includes at least one visible light LED 411. The IR LED 410 is coupled to PCB 428 and is disposed adjacent the first end 424 of the light guide 408, and the visible light LED 411 is coupled to PCB 429 and is disposed adjacent the second end 426 of the light guide 408. The IR light from the IR LED 410 and the visible light from the visible light LED 411 travel through the light guide 408 and through the outer surface 420 of the light guide 408. The light then travels through the lens 460 as described above. Thus, the illumination system shown in FIG. 30 can be used to illuminate the inside of a vehicle for an IR-based imaging system and for communicating with occupants using visible light, such as is described above.

Figure 31:
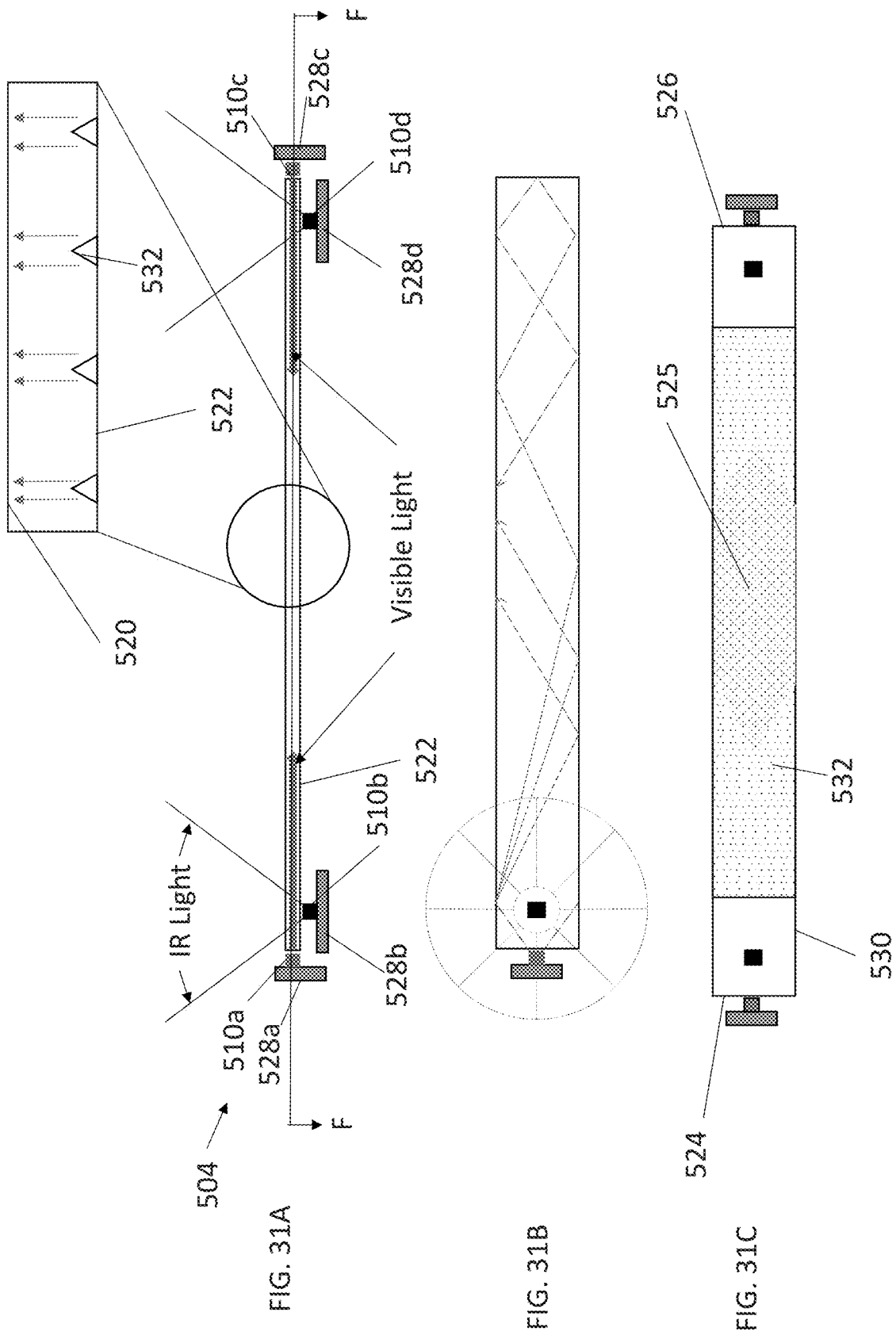
FIG. 31A is a side view of an illumination system according to another implementation.
FIG. 31B is a front view of the illumination system of FIG. 31A.
FIG. 31C is a cross sectional view of the illumination system in FIG. 31A taken along section line F-F.
Figure 32:
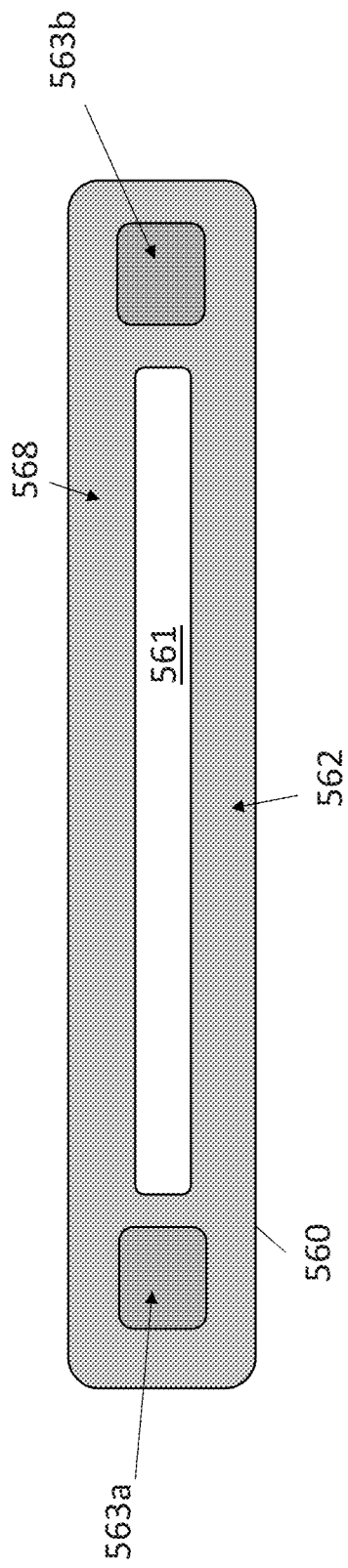
FIG. 32 is a front view of the illumination system of FIG. 31A with a lens disposed adjacent an outer surface of the light guide.

FIGS. 31A-32 illustrate another implementation of an illumination system 504 that is similar to the implementations shown in FIG. 30 in that it provides both IR and visible light illumination through the same light guide. In particular, as shown in FIGS. 31A-C, the illumination system 504 includes a light guide 508, a first light source 510a, a second light source 510b, a third light source 510c, and a fourth light source 510d. The first light source 510a is coupled to PCB 528a and is disposed adjacent the first end 524 of the light guide 508. The second light source 510b is coupled to PCB 528b and is disposed adjacent the inner surface 522 of the light guide 508 adjacent the first end 524. The third light source 510c is coupled to PCB 528c and is disposed adjacent the second end 526 of the light guide 508, and the fourth light source 510d is coupled to PCB 528c and is disposed adjacent the inner surface 522 of the light guide 508 adjacent the second end 526.

In the implementation shown, the first light source 510a and third light source 510c are a visible light source (e.g., visible light LED) and the second light source 510b and fourth light source 510d are infrared light sources (e.g., IR LED). However, in other implementations, the first light source 510a and/or third light source 510c may be an infrared light source, and the second light source 510b and/or the fourth light source 510d may be a visible light source.

The second light source 510b is disposed adjacent an end portion 530a of the inner surface 522, and third light source 510d is disposed adjacent end portion 530b of the inner surface 522. The end portion 530a is a portion of the inner surface 522 that is adjacent the first end 524 of the light guide 508, and the end portion 530b is a portion of the inner surface 522 that is adjacent the second end 526. However, in other implementations, the second and/or fourth light source 510b, 510d may be disposed adjacent other portions of the inner surface 522.

In the implementation shown in FIGS. 31A and 31C, a portion of the inner surface 522 of the light guide 508 includes micro-lenses 532 that guide light traveling through the light guide 508 toward the outer surface 520 of the light guide 508. For example, the micro-lenses 532 shown in FIGS. 31A and 31C cause the light to exit the outer surface 520 at an angle of 90° relative to the outer surface 520. However, in other implementations, the micro-lenses 532 may be configured to cause the light to exit the outer surface 520 at any suitable angle relative to the outer surface 520. The density of the micro-lenses gradually increases as a distance from the light source 510 increases. Thus, in the implementation shown in FIGS. 31A-C, which includes two light sources on each end 524, 526 of the light guide 508, the micro-lenses 522 are most dense adjacent the central portion 525 of the light guide 508, and the density decreases toward the end portions of the light guide 508, such as end portion 530a, 530b. In the implementation shown in FIG. 31C, the end portions 530a, 520b are void of micro-lenses. In other implementations, other types of light reflecting features may be used, such as one or more films, such as those described above.

Although not shown in FIGS. 31A-C, the illumination system 504 may just include the first and second light sources and not the third and fourth light sources disposed adjacent the second end 526 of the light guide 508, according to other implementations. In some of these implementations, the density of the micro-lenses 522 may be greatest adjacent the second end 526 of the light guide 508, depending on the intended use and/or operation of the light guide 508 and/or illumination system 504.

As shown in FIG. 32, the illumination system 504 may also include a lens 560 that has at least one opaque portion 562 and at least one transparent or translucent portion 561. For example, the lens 560 may be configured similarly to the lens 260' and cap 295 described above in relation to FIGS. 26A and 26B. Alternatively, the lens 560 may include light blocking material to create the opaque portion 562 (e.g., films, paint, etc.). The opaque portion 562 prevents light from the light guide 508 from passing through the opaque portion 562. Films or other coatings or material treatments may be used to create the opaque portion 562 and transparent or translucent portion 561, such as those described above. In addition, the lens 560 includes two IR transmissive portions 563a, 563b. The IR transmissive portions 563a, 563b allow the passage of IR light through it, but does not allow the passage of visible light. As shown in FIG. 32, the IR transmissive portions 563a, 563b are disposed adjacent (e.g., in front of, when assembled) the end portions 530a, 530b of the light guide 508.

In addition, although the light guide 508 is shown as rectangular shaped in FIG. 32, the shape of the light guide 508 may be selected based on where and/or how the light guide 508 and/or other components of the illumination system 504 are to be provided within the vehicle, according to other implementations. For example, in an implementation in which the illumination system 504 is to be coupled to a rim portion of the frame of a steering grip 102, the light guide 508 may have an arcuate shape as viewed from the outer surface of the light guide 508, as described above in relation to FIGS. 15-20, 242-25, and 28-29. For example, the radius of curvature of the inner 522 and outer surfaces 520 of the light guide 508 are similar to the radius of curvature of the rim portion.

Figure 33A:
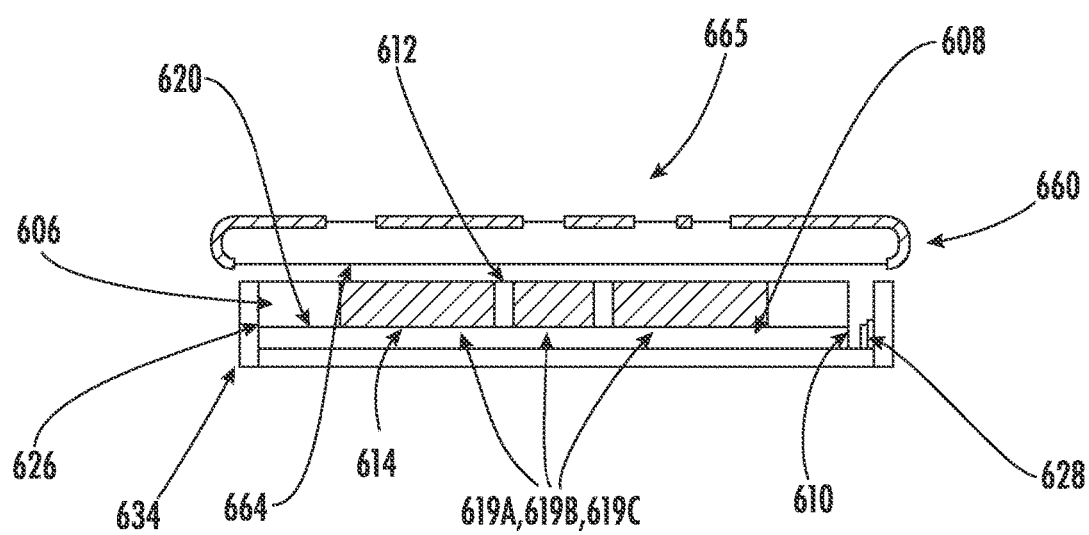
FIG. 33A illustrates is a side view of an illumination system according to another implementation.
Figure 33B:
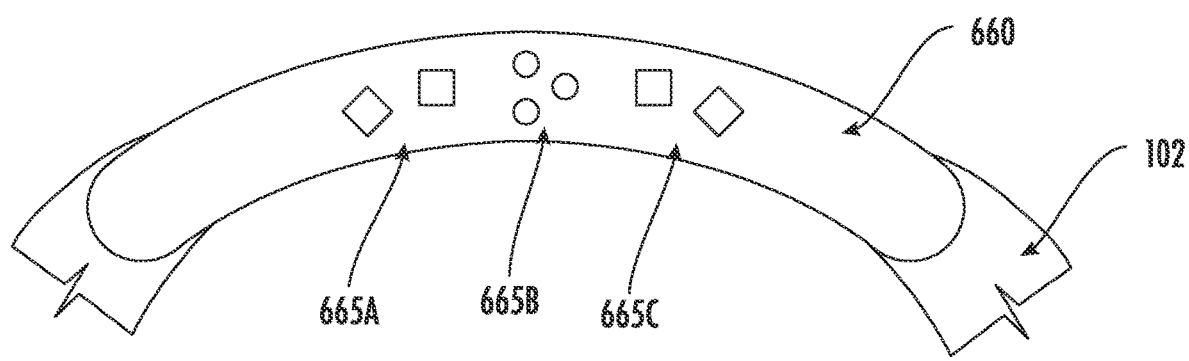
FIG. 33B is a partial front view of an example steering grip and the illumination system of FIG. 33A.
Figure 34A:
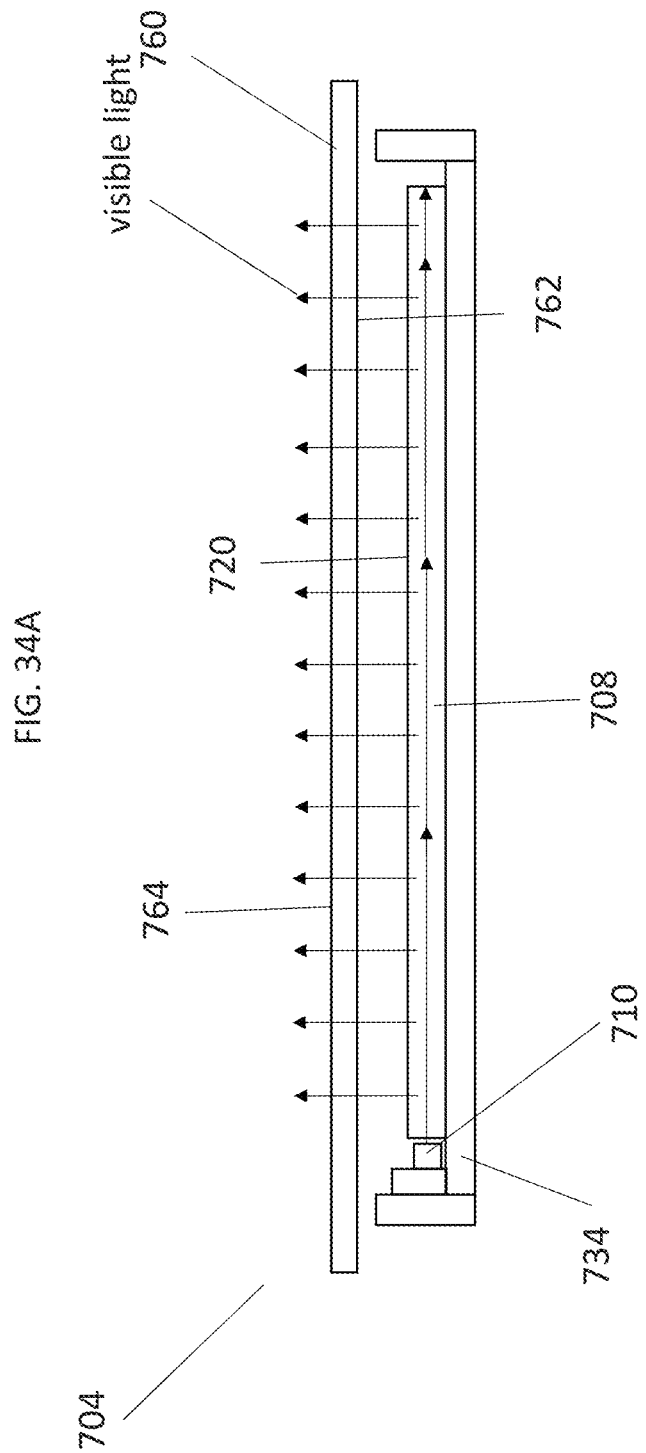
FIG. 34A illustrates is a side view of an illumination system according to another implementation.
Figure 34B:
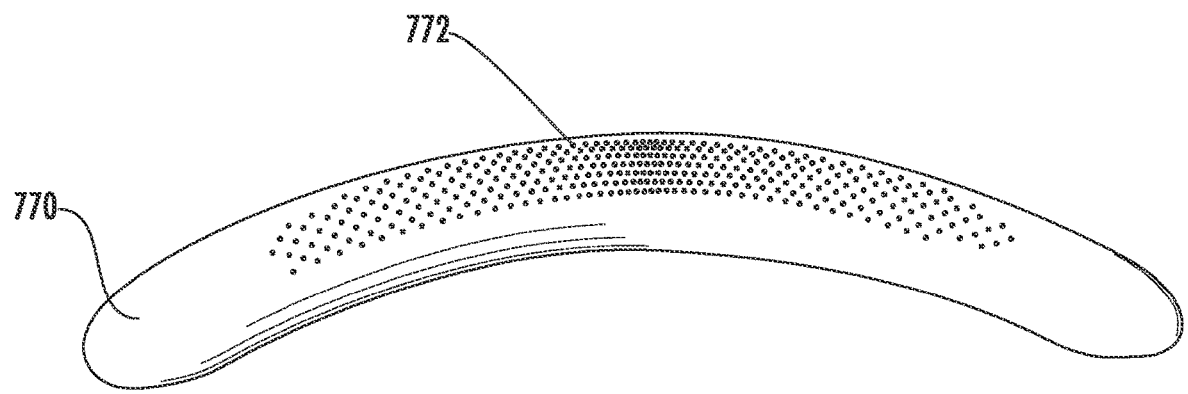
FIG. 34B is a front view of a covering for coupling with the illumination system of FIG. 34A.
Figure 34C:
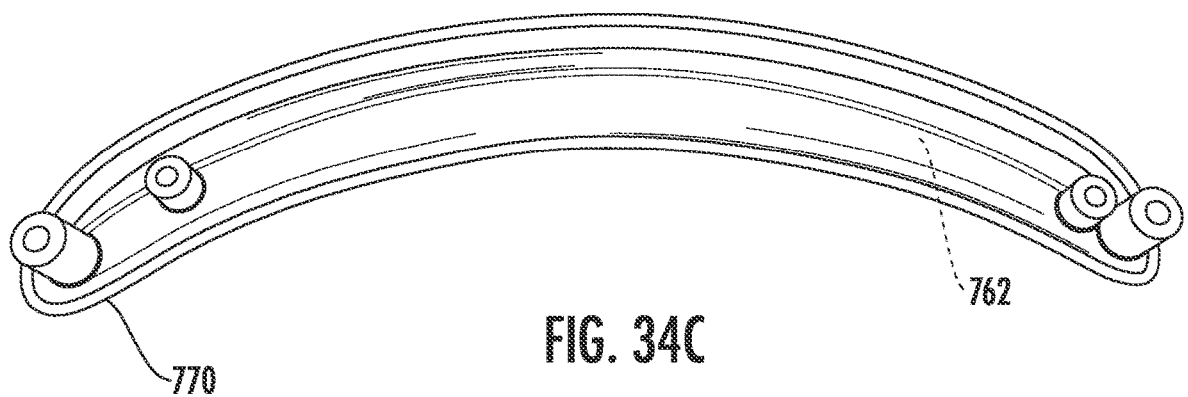
FIG. 34C is an inner surface view of the covering shown in FIG. 34B.
Figure 34D:
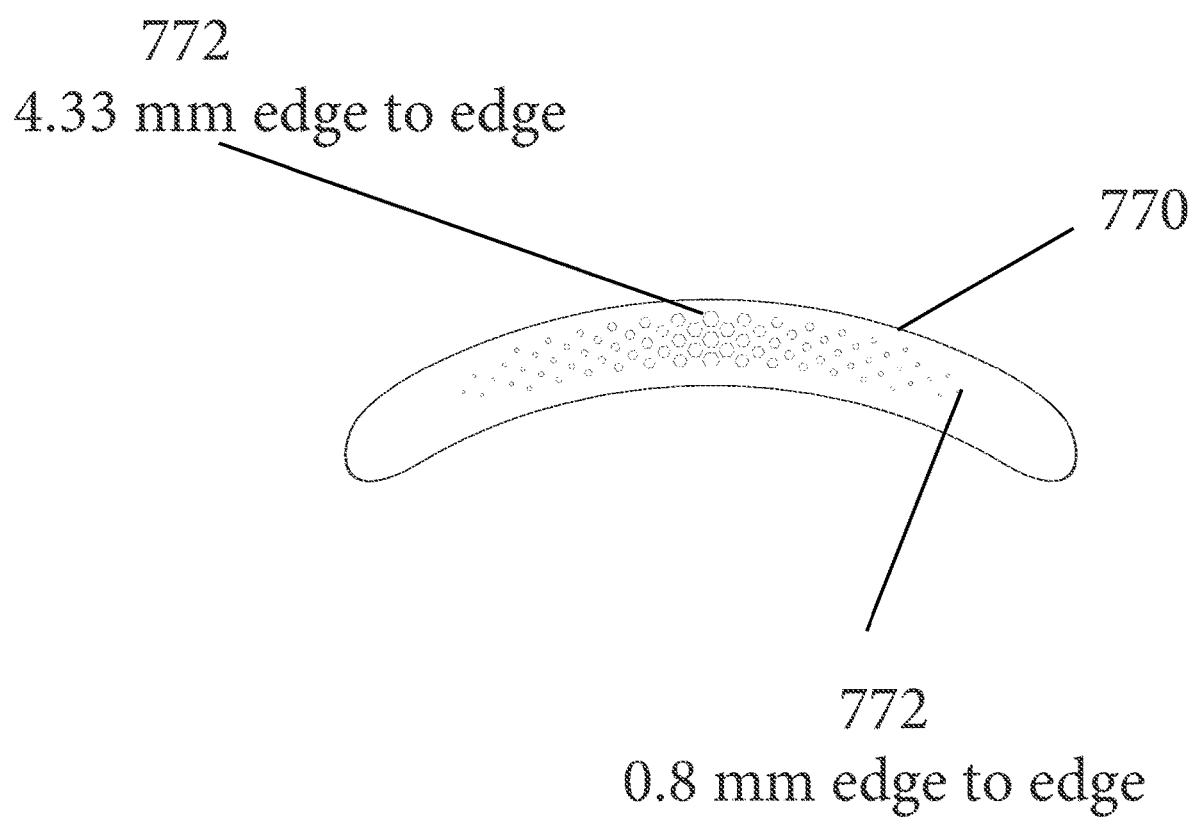
FIGS. 34D-34H illustrate examples of patterns of perforations that may be defined by the covering of FIG. 34B, according to various implementations.
Figure 34E:
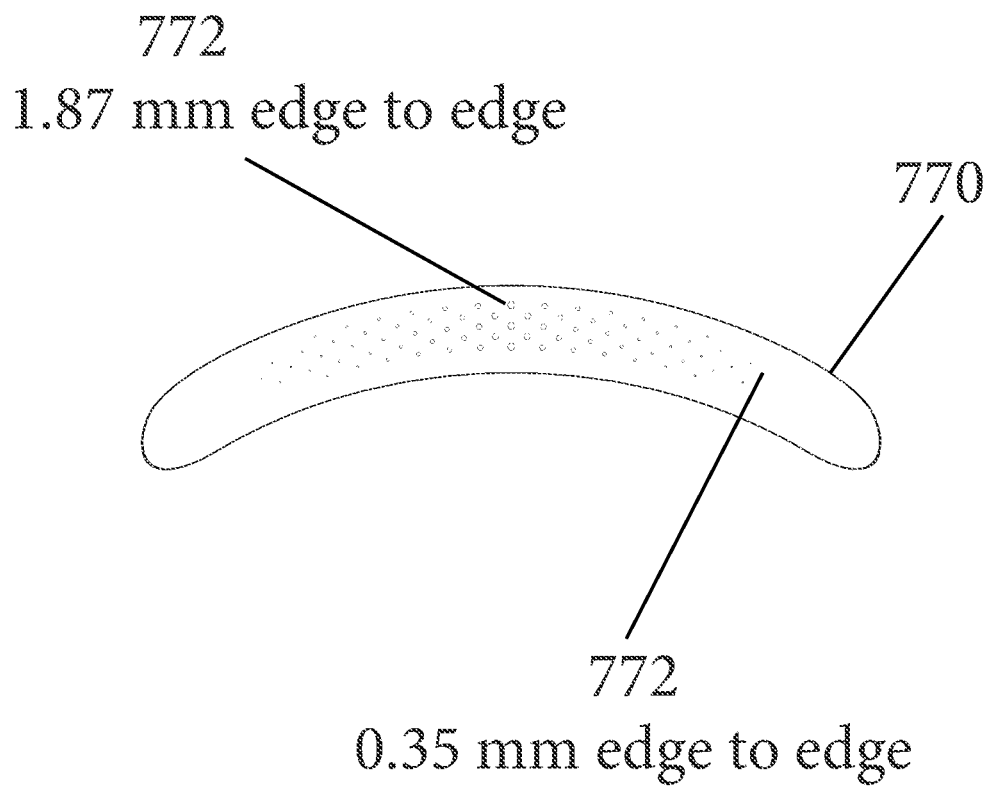
Figure 34F:
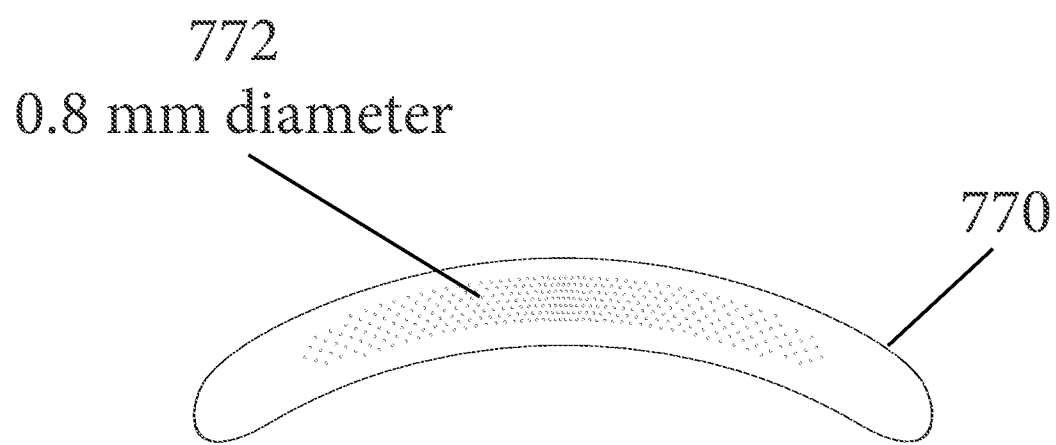
Figure 34G:
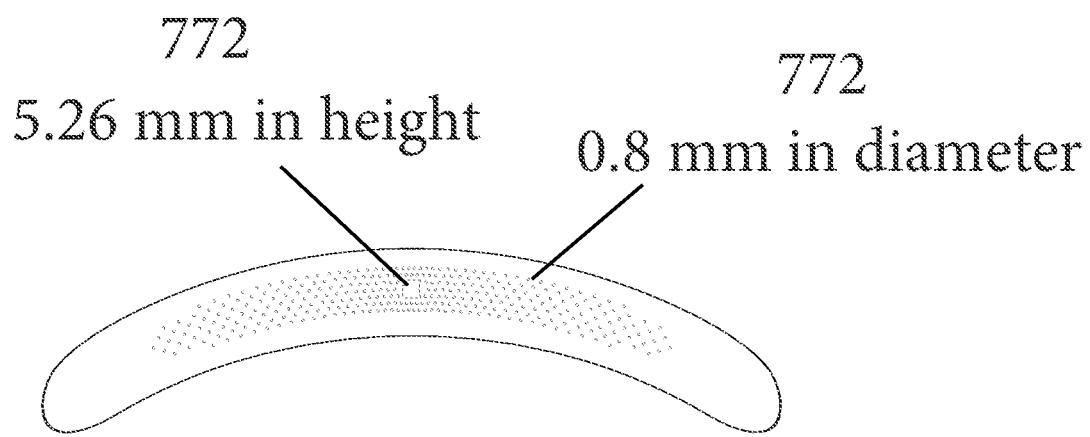
Figure 34H:
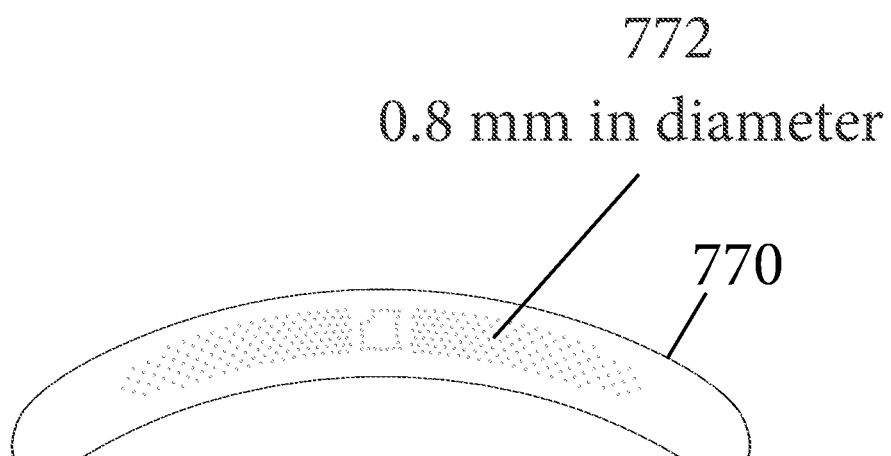
Figure 35:
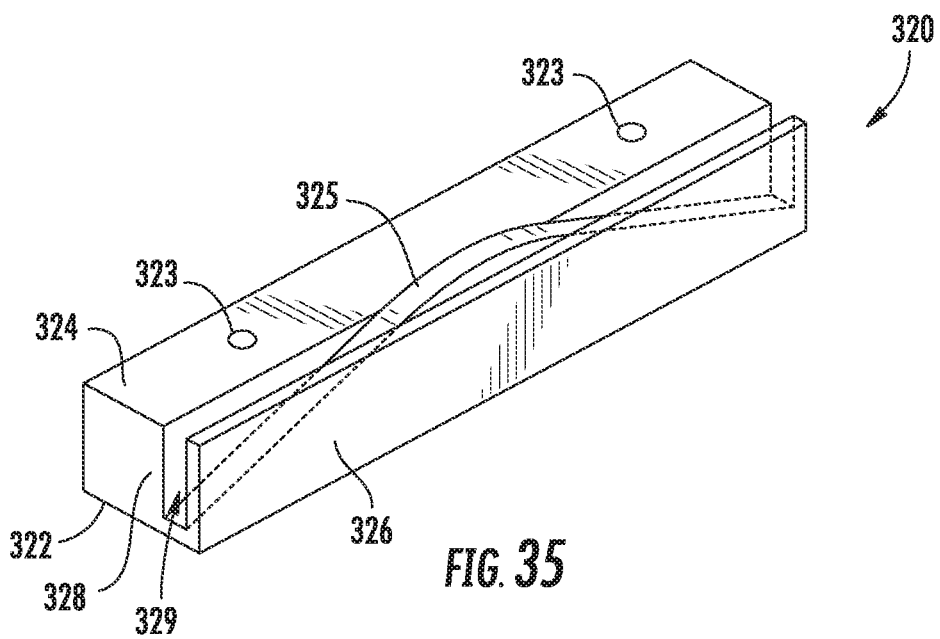
FIG. 35 is an end perspective view of a base of an illumination system according to one implementation.
Figure 36:
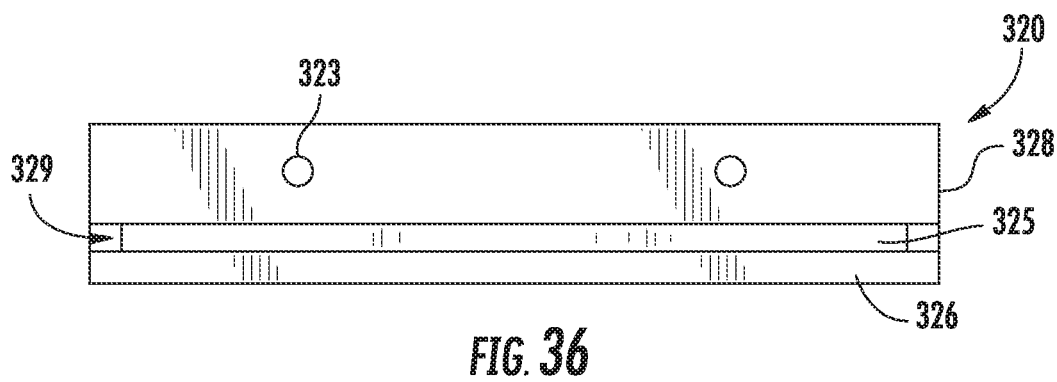
FIG. 36 is a top view of the base in FIG. 35.

FIGS. 33A and 33B illustrate an illumination system 604 according to another implementation. The illumination system 604 includes a light guide 608, one or more LEDs 610 disposed adjacent a first end 624 and/or second end 626 of the light guide 608, a segmented display 606, and a lens 660 having a graphic pattern 665 disposed on the outer surface 668 thereof. The light guide 608 and one or more LEDs 610 are similar to any of those described above in relation to FIGS. 15-20, 24-25, and 28-32. The shape of the light guide 608 may be selected based on where and/or how the light guide 608 and/or other components of the illumination system 608 are to be coupled within the vehicle, according to various implementations. For example, the light guide 608 shown in FIGS. 33A and 33B is arcuate shaped. In some implementations in which the light guide 608 is to be coupled to an arcuate shaped portion of the steering grip 102, the radius of curvature of the inner 622 and outer surfaces 620 of the light guide may be selected to match or coordinate with the radius of curvature of the portion of the steering grip 102 to which the illumination system 604 is coupled.

The segmented display 606 may include any of the segmented displays described above in relation to FIGS. 15-20. And, the graphic pattern 665 on the lens 660 can be defined using films, etching, or other suitable surface treatments to alter the appearance of light exiting the lens 660 through or around the graphic pattern 665. Furthermore, the graphic pattern 665 may be formed on the inner surface 664 of the lens 660 in other implementations. In some implementations, graphic patterns 665 are transparent or translucent and the rest of the lens 660 is opaque.

Similar to the implementations described above in relation to FIGS. 15-20, 24-25, and 28-32, the light guide 608 is disposed in carrier (or tray) 634, and the one or more LEDs 610 are disposed adjacent first 624 and/or second ends 626 of the light guide 608. Light from the one or more LEDs 610 travels through the light guide 608 and through the outer surface 620 of the light guide 608. The one or more LEDs 610 include at least one visible light LED, and each LED 610 is coupled to a PCB, such as PCB 628. The one or more PCBs 628 may be thermally coupled to the frame of the steering grip 102.

The inner surface 614 of the segmented display 606 is disposed adjacent the outer surface 620 of the light guide 608. Light exiting the outer surface 620 of the light guide 608 travels through the inner surface 614 of the segmented display 606. The segmented display 606 comprises two or more segments, such as segments 619a, 619b, 619c, which are separately activatable. A segmented display driver is electrically coupled to each segment of the segmented display 606 via traces, and each segment is selectively activated by sending current to the segment, allowing light to pass through it. When the segment is not activated (not receiving current), the segment does not allow light to pass through it. Thus, the segmented display 606 acts as a filter to allow selected areas to be illuminated.

Furthermore, in some implementations in which the light source 608 emits white light, the segmented display 606 may be configured to filter certain wavelengths of light that pass through it such that light having a certain color is emitted from a particular segment of the outer surface 612 of the segmented display 606. For example, if white light enters the inner surface 614 of the segmented display 606, one segment may filter all wavelengths except light having a certain color (e.g., red, green, yellow, etc.) such that only light having that certain color is emitted from the outer surface 612 of the segmented display 606.

The segmented display driver is similar to the LCD driver described above in relation to FIGS. 15-20 (e.g., includes a chip-on-glass configuration). In addition, similar to the system 204 described above in relation to FIGS. 15-27, a computer processor for electrically communicating with the segmented display driver is disposed on a rotatable portion of the steering wheel (e.g., adjacent the segmented display 606). And, example types of segmented displays 606 and other segmented displays that may be used are described above in relation to FIGS. 15-20.

The inner surface 664 of the lens 660 is disposed adjacent and facing the outer surface 612 of the segmented display 606, and the graphic patterns 665 are aligned with segments of the segmented display 606 that illuminate each pattern 665. For example, as shown in FIGS. 33A and 33B, the graphic patterns indicated as 665a and 665c are illuminated when segments 619a and 619c are activated, and the graphic pattern indicated as 665b is illuminated with segment 619b is activated. The graphic patterns 665a, 665b, 665c shown are examples, and any suitable graphic pattern may be provided depending on the intended use of the illumination system 604.

In the implementation shown, the LED 610 is a single-color LED (e.g., white light). However, in other implementations, the LED may be a multi-color LED. In addition, the system 604 may include an LED having the same or different color at each end 624, 626 of the light guide 608, according to some implementations. And, in other implementations, the system 604 may include at least one IR LED at one end of the light guide and at least one visible light LED at the other end. In such an implementation, the LCD 606 may include one or more activatable segments that allow the IR and/or the visible light to pass through the LCD 606.

FIG. 34A-H illustrates an illumination system 704 according to another implementation. The illumination system 704 includes a light guide 708, a light source 710 that emits visible light into one end of the light guide 708, a lens 760 and a perforated outer cover 770. The light guide 708 and light source 710 are similar to the light guides and visible light sources described above. For example, the light source 710 includes one or more visible light sources. Examples of visible light sources include, for example, one or more LEDs at one or both ends of the light guide 708. The one or more light sources may have the same color, different colors, emit one color, or emit multiple colors.

The lens 760 includes an inner surface 762 and an outer surface 764. The inner surface 762 of the lens 760 faces the outer surface 720 of the light guide 708, and the outer surface 764 of the lens faces in the opposite direction from the inner surface 762.

In the implementation shown in FIGS. 34A-34H, the illumination system 704 is coupled to the rim portion of steering grip 102. The light guide 708, tray 734, and the lens 760 are arcuate shaped and follow the radius of curvature of the rim portion. In addition, the lens 760 may be coupled to the tray 734, which is coupled to the rim portion.

The lens 760 may be similar in shape and in how it is coupled to the illumination system 704 as cap 295 described above in relation to FIGS. 26A-26B. For example, in some implementations, the lens 760 is contoured to coordinate with (e.g., match or aesthetically correspond with) the portions of the rim adjacent to the lens 760. In particular, the inner 762 and outer surfaces 764 of the lens 760 are contoured to form an arcuate shape as viewed from the inner 762 or outer surface 764 and from a cross section of the lens 760 as viewed from a plane that bisects the inner 762 and outer surface 764. The contour is selected to match an outer covering coupled to the rim portion of a steering grip 102, which allows the illumination system 704 to be coupled to the rim portion and blend in with the outer covering of the rim portion.

The lens 760 has at least one transparent or translucent portion through which light from the light guide 708 passes from the inner surface 762 of the lens 760 to the outer surface 764 of the lens 760.

The perforated outer cover 770 includes a material that defines a plurality of perforations 772 through a portion of the material. The material may be any of the materials described above in relation outer coverings around the rim portion of the steering grip 102 or elsewhere in the vehicle. For example, the material may include leather. The perforations 772 allow light from the outer surface 764 of the lens 760 to pass through the outer covering 770 to be viewed by occupants in the vehicle. However, when the light source 710 is not illuminated, the lens 760 and light guide 708 cannot be seen by the occupants, providing an aesthetically pleasing appearance.

The perforations 772 can be elliptical, circular, hexagonal, and/or any polygonal shape. In addition, the perforations may be arranged in a pattern having different shapes and/or sizes or having the same shape and size. Furthermore, a diameter or distance between opposite and spaced apart edges of each opening ranges from 0.2 mm to 4.75 mm. FIGS. 34D-34H illustrate various example patterns of perforations and example sizes of the perforations. In addition, the perforations 772 may have different diameters and/or the density of the perforations 772 may be altered along the covering 770 to provide a particular pattern when illuminated. Furthermore, the perforations may be filled with a transparent or translucent material or left as is.

The implementations of illumination systems described above in relation to FIGS. 28-34H may be coupled anywhere in the vehicle or on any portion of the steering assembly 100.

In addition, instead of a perforated cover 770, in other implementations, the lens 760 is coated with a film or other coating material that defines one or more transparent and/or translucent areas and one or more opaque areas. For example, in one implementation, the lens 760 is covered with an opaque coating (e.g., paint or film) and non-opaque patterns are etched into the opaque coating.

In some implementations, the contour of the outer surface of the cover 770 and/or the lens 760 corresponds with (e.g., matches or coordinates with) a contour of the trim adjacent the cover 770 and/or lens 760.

FIGS. 35-39 illustrate an example implementation of an illumination system 304 that is coupled to an upper portion of the hub portion of the frame 112. As shown in FIGS. 35-39, the illumination system 304 includes a base 320, a housing 330, a light guide 308, and at least one light source 310. The base 320 includes a first sidewall 326 and a second side wall 328 that are spaced apart from each other and define a channel 329 between them. An arcuate shaped support surface 325 extends through the channel 329 and has a radius of curvature. In addition, the second sidewall 328 defines one or more openings 323 that extend between a first surface 322 and a second surface 324 of the second sidewall 328. The first 322 and second surfaces 324 of the second sidewall 328 are spaced apart from and opposite each other relative to a plane that intersects the first 326 and second side walls 328.

Figure 38:
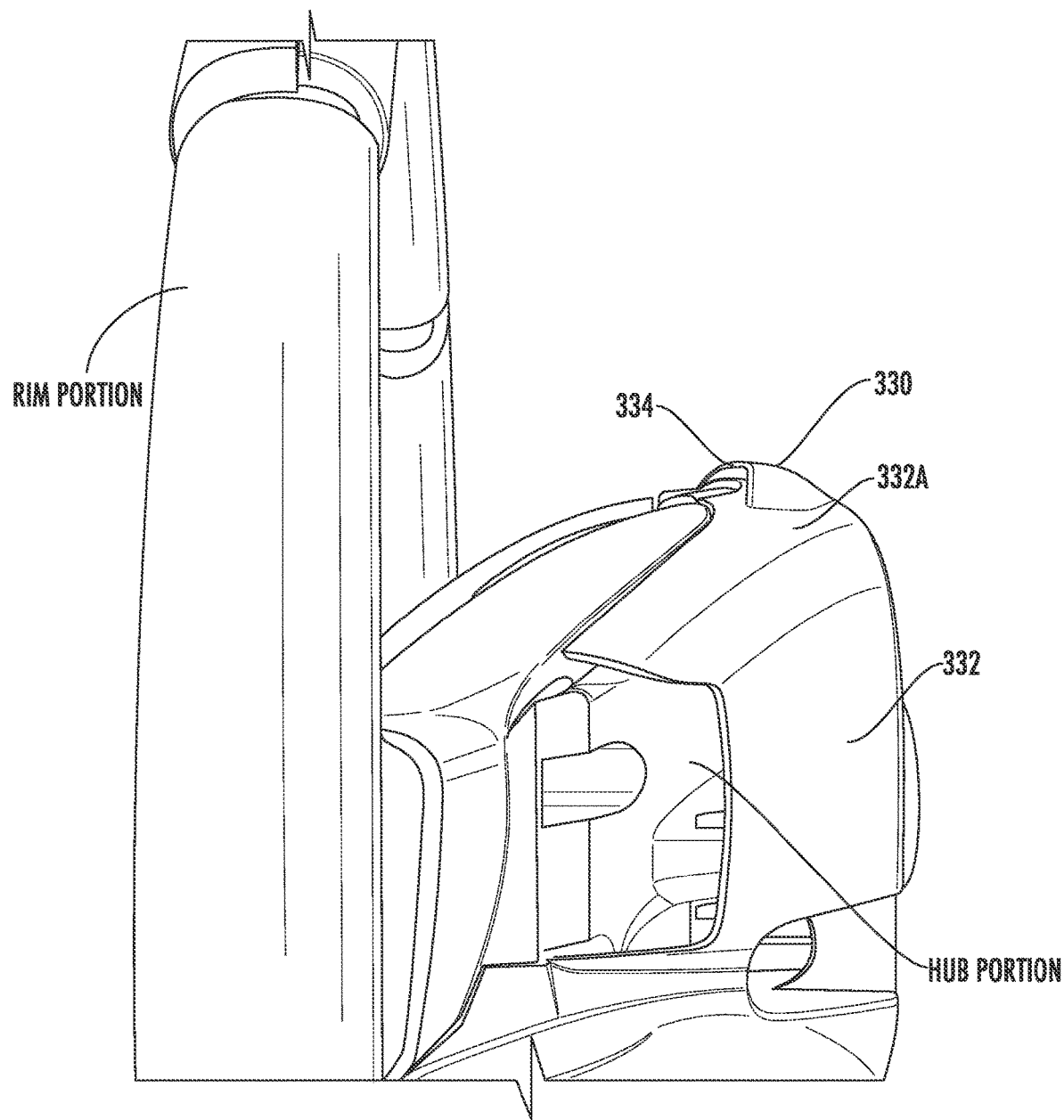
FIG. 38 is a side perspective view of a back cover with a housing, according to one implementation.
Figure 39:
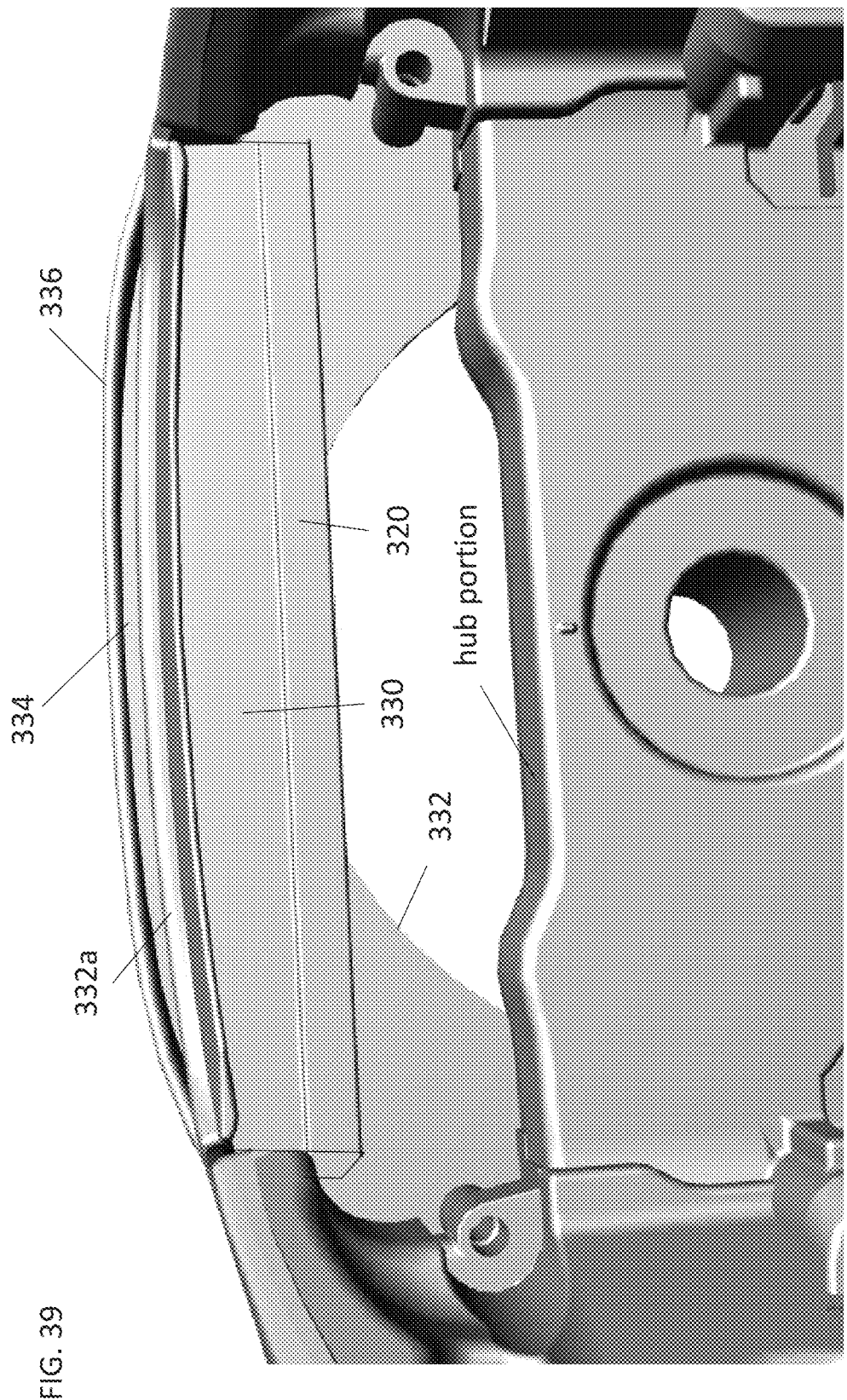
FIG. 39 is a front perspective view of the illumination system components shown in FIGS. 35-38 assembled together.
Figure 40:
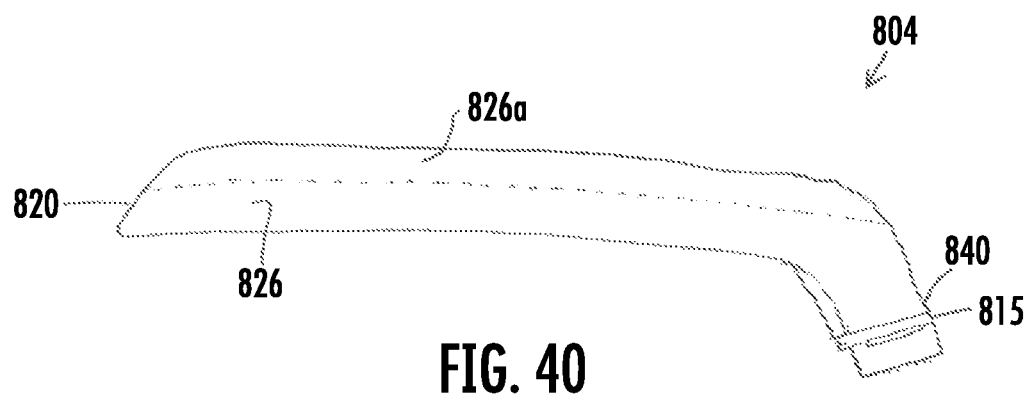
FIG. 40 illustrates a perspective front view of a base of an illumination system according to another implementation.
Figure 41:
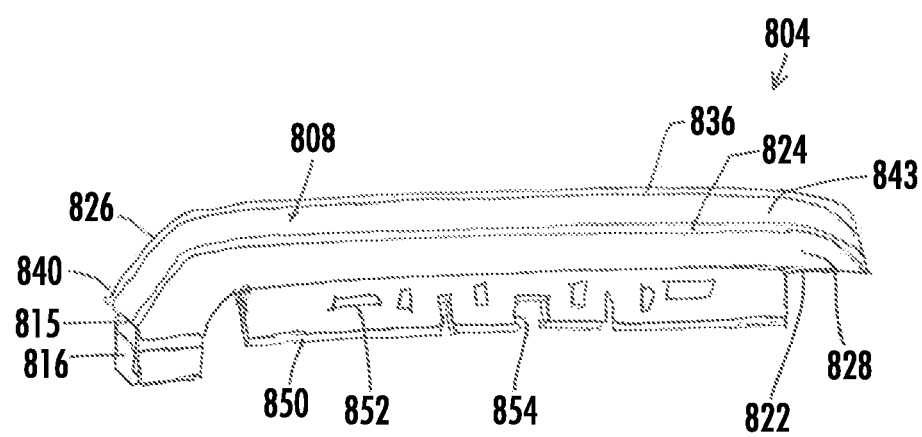
FIG. 41 illustrates a perspective rear view of a base and light guide of the illumination system shown in FIG. 40.
Figure 42:
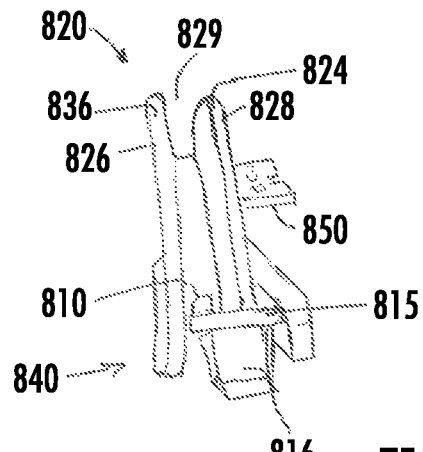
FIG. 42 illustrates a perspective end view of the base shown in FIG. 40.
Figure 43:
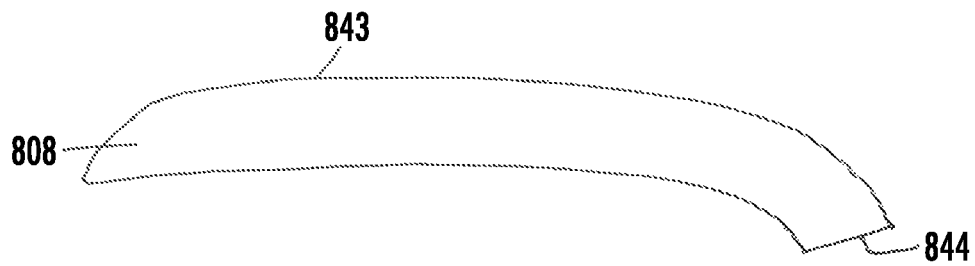
FIG. 43 illustrates a front view of the light guide shown in FIG. 40.
Figure 44:
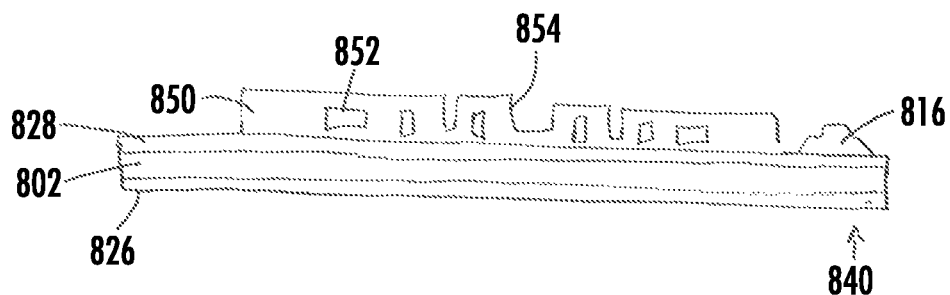
FIG. 44 illustrates a top view of the base shown in FIG. 40.
Figure 45:
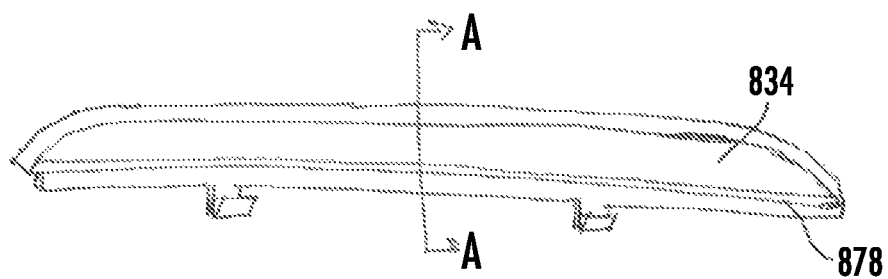
FIG. 45 illustrates a front perspective view of a housing for coupling with the base of the illumination system shown in FIG. 40
Figure 46:
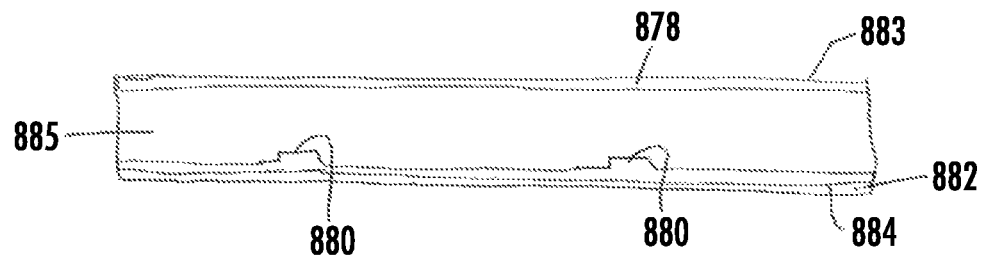
FIG. 46 illustrates a bottom view of the housing shown in FIG. 45.
Figure 47:
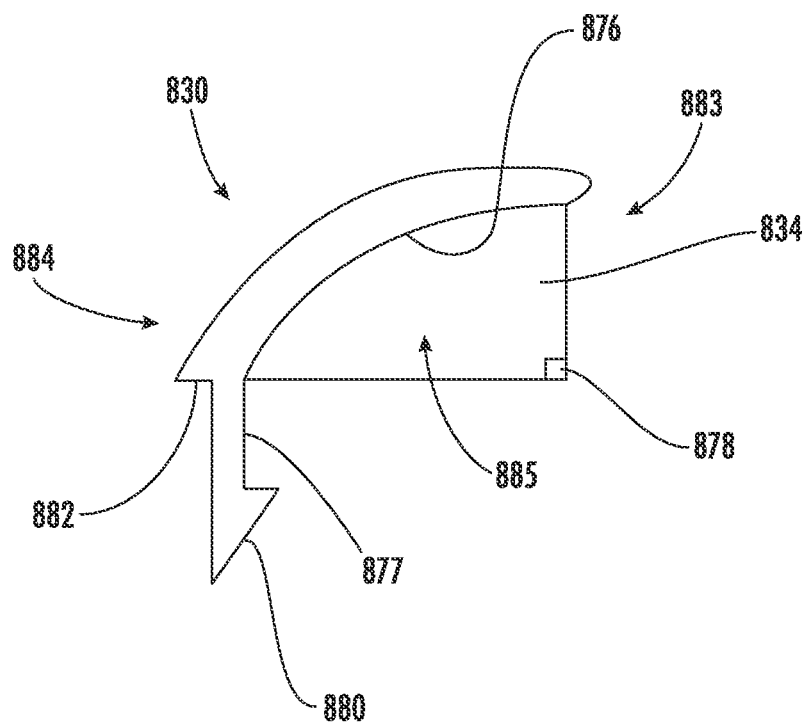
FIG. 47 illustrates a cross sectional view of the housing shown in FIG. 45 as indicated by the A-A line.
Figure 48:
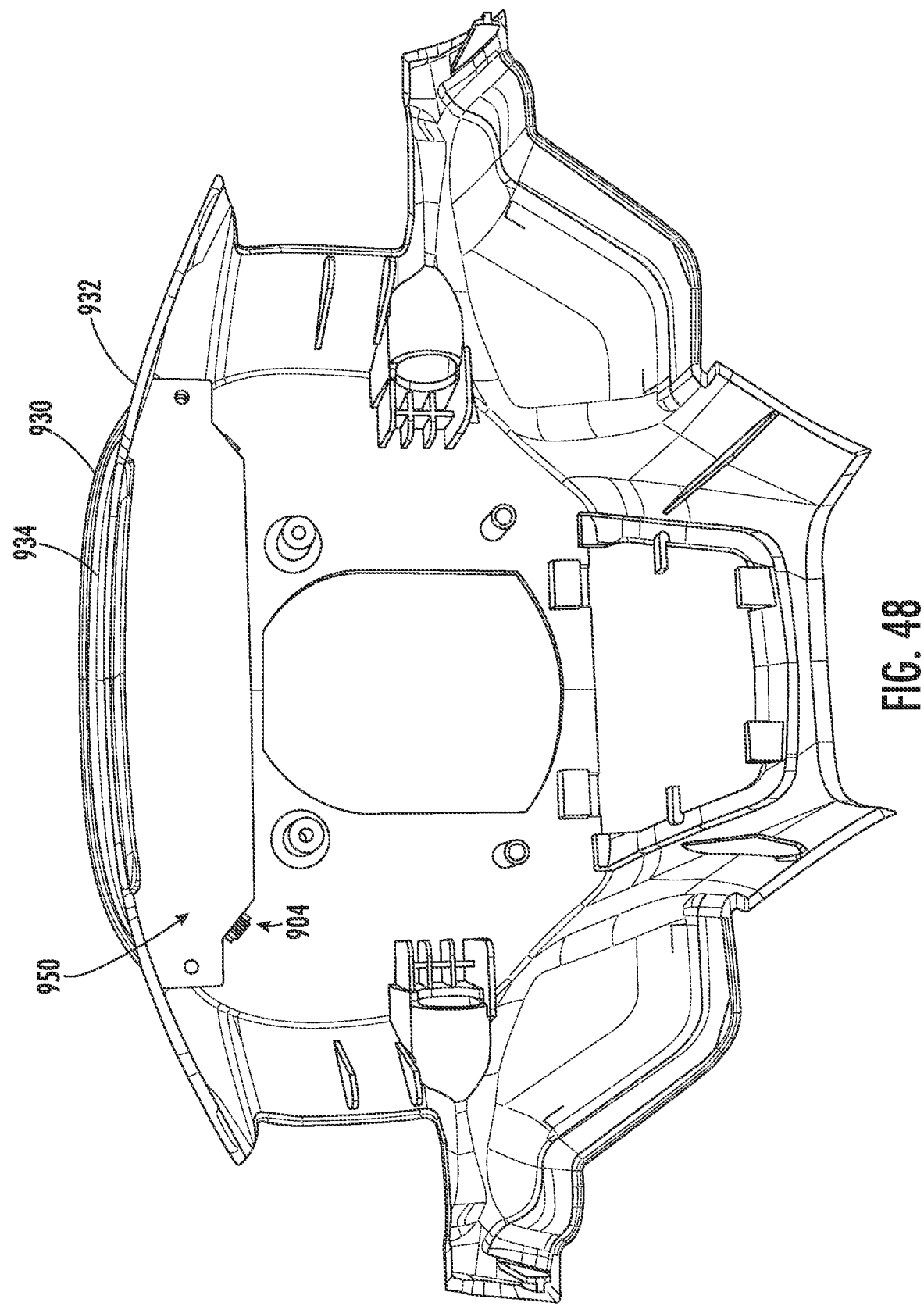
FIG. 48 illustrates a front view of an illumination system coupled with a back cover according to another implementation.
Figure 49:
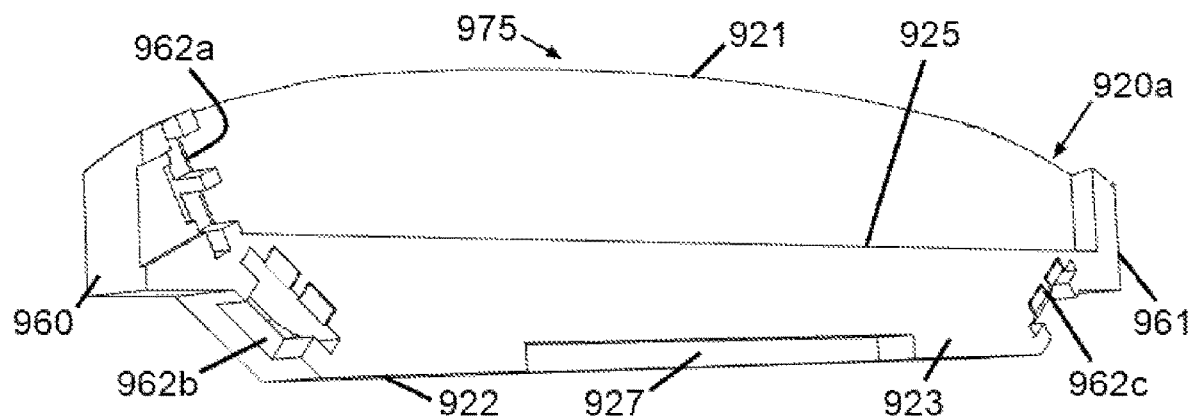
FIG. 49 illustrates a front perspective view of an inner base of the illumination system shown in FIG. 48.
Figure 50:
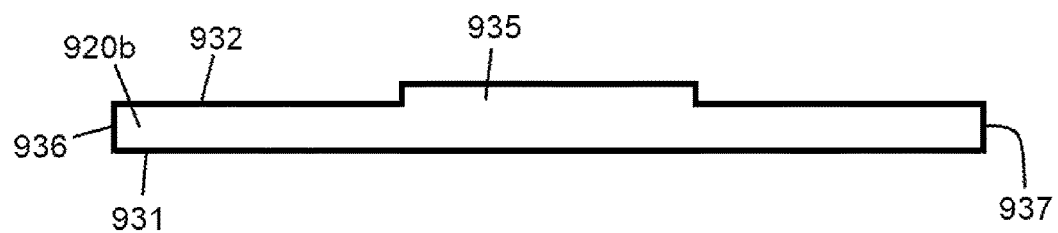
FIG. 50 illustrates a bottom view of an outer base of the illumination system shown in FIG. 48.
Figure 51:
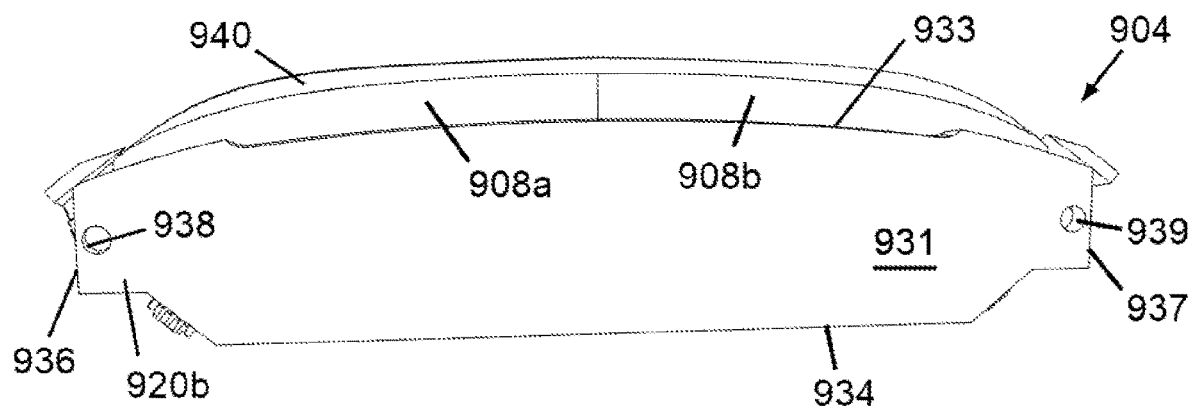
FIG. 51 illustrates a front view of the illumination system shown in FIG. 48.
Figure 52:
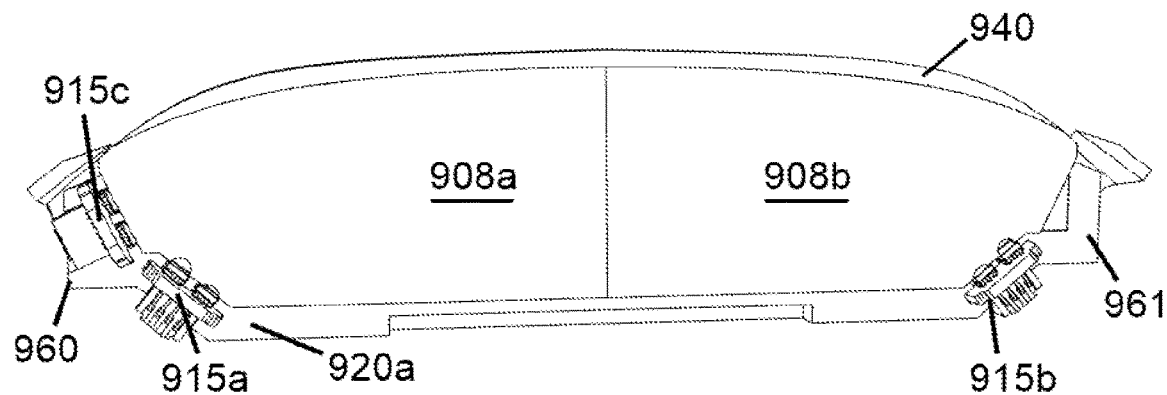
FIG. 52 illustrates a front view of a portion of the illumination system shown in FIG. 48.
Figure 53:
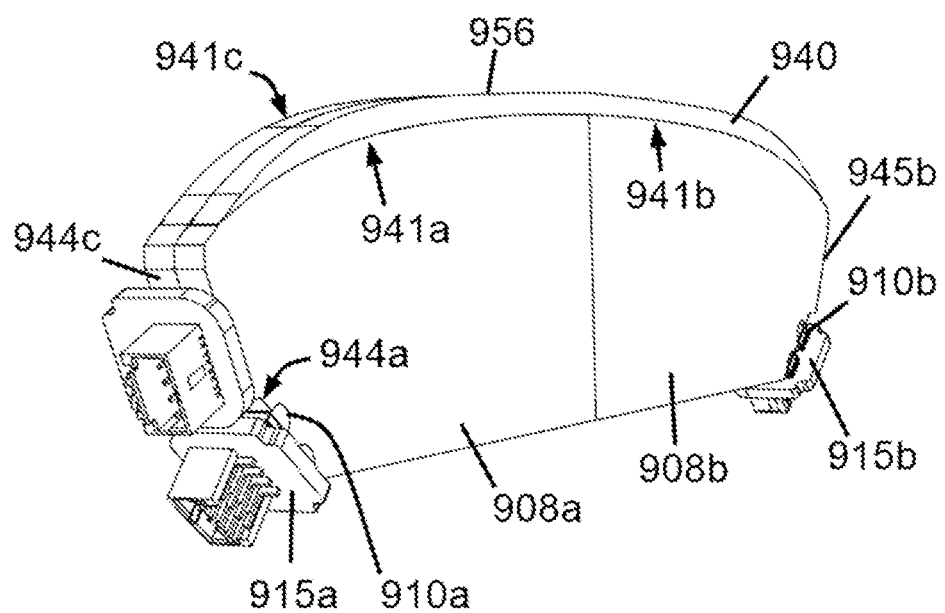
FIG. 53 illustrates a front perspective view of the light guide segments, lens, and PCBs of the illumination system shown in FIG. 48.
Figure 54:
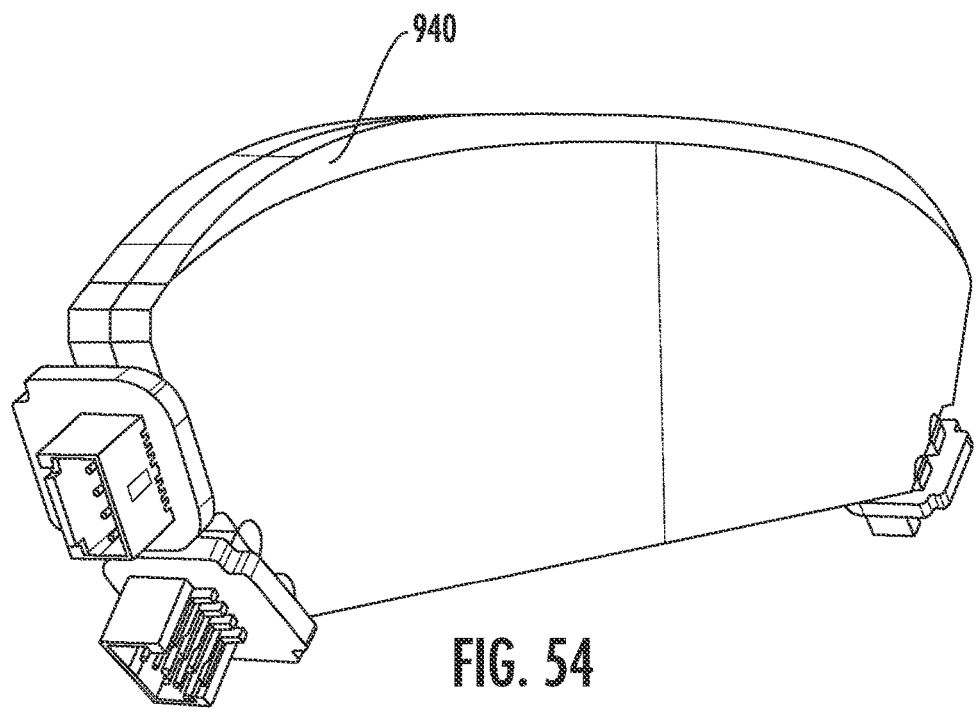
FIG. 54 illustrates the light guide segments, lens, and PCBs of the illumination system shown in FIG. 53 with the third light guide segment illuminated through the lens.
Figure 55:
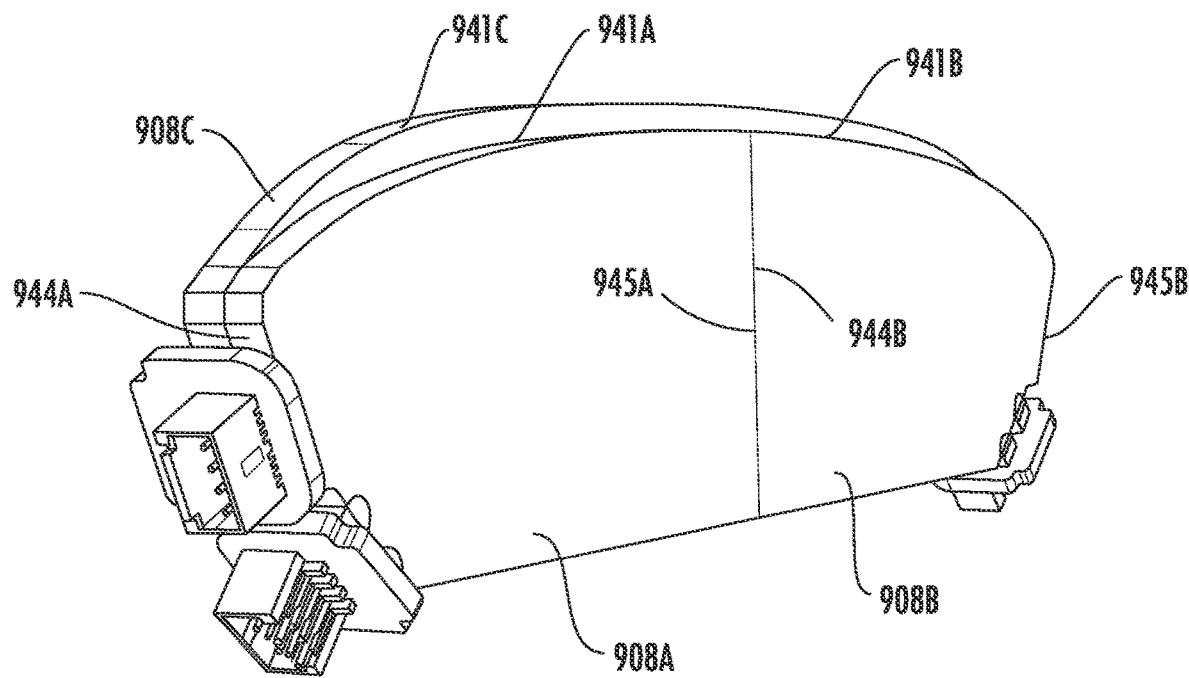
FIG. 55 illustrates a front perspective view of the light guide segments and PCBs shown in FIG. 53, without the lens.
Figure 56:
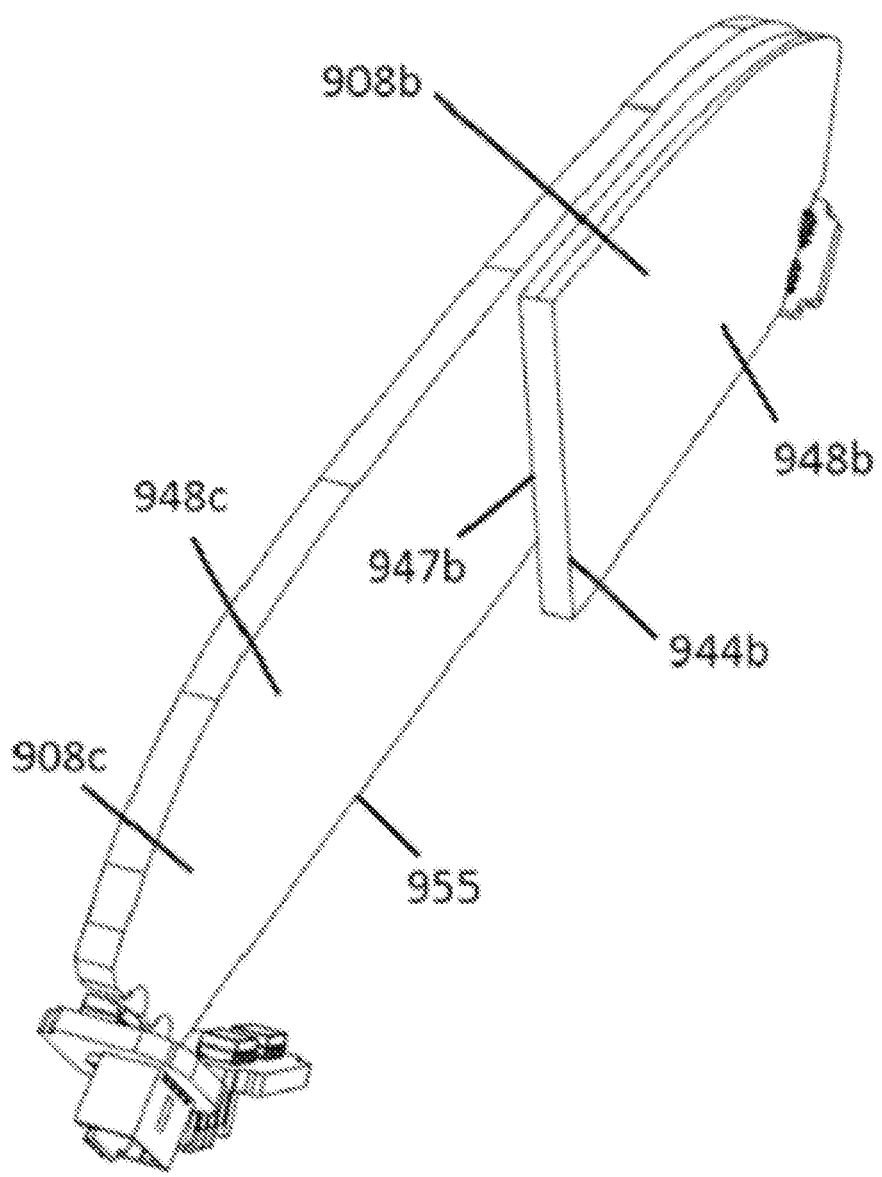
FIG. 56 illustrates a top perspective view of the second and third light guide segments shown in FIG. 53.
Figure 57:
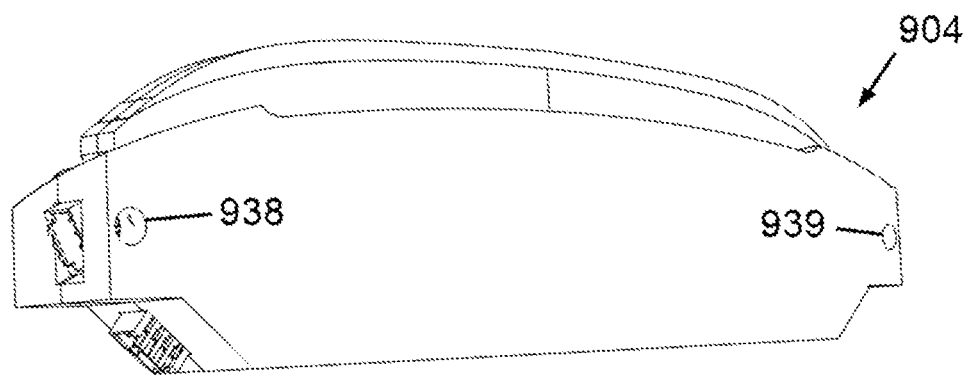
FIG. 57 illustrates a front perspective view of the illumination system shown in FIG. 48.
Figure 58:
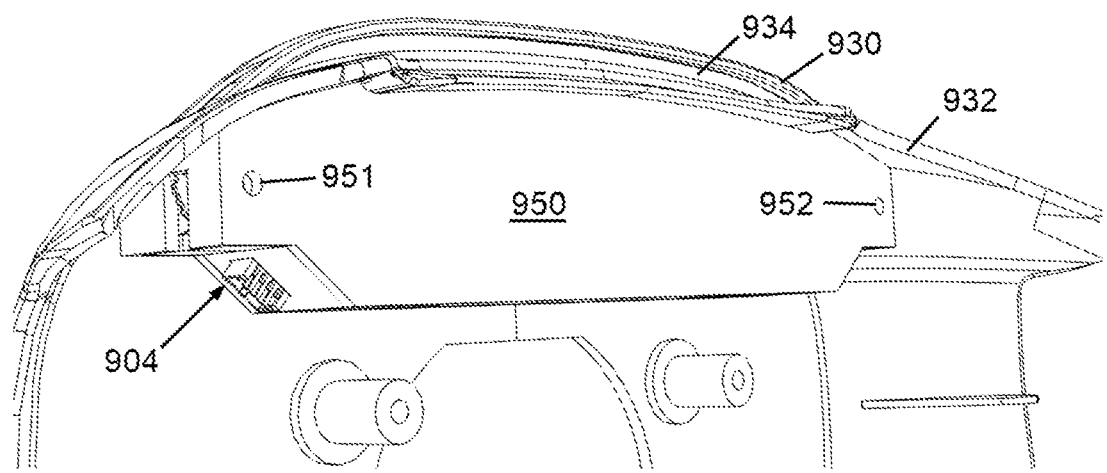
FIG. 58 illustrates a front perspective view of the illumination system shown in FIG. 48 coupled with a back cover of a steering assembly.
Figure 59:
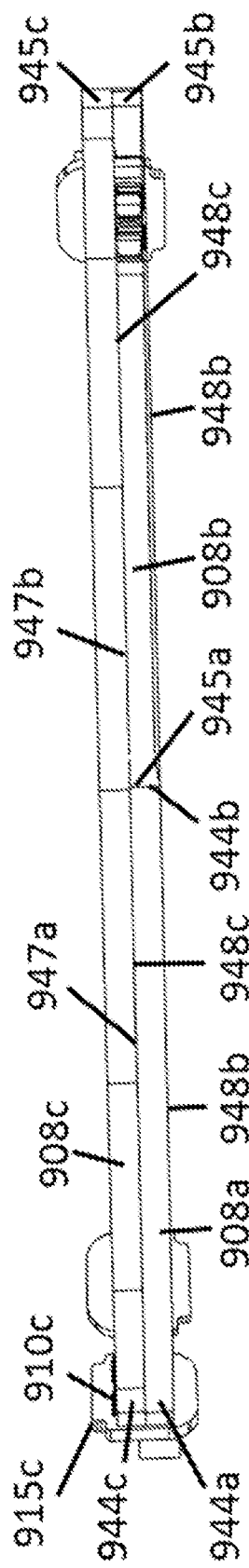
FIG. 59 illustrates a top view of the first, second, and third light guide segments and PCBs shown in FIG. 53.

The housing 330 shown in FIGS. 38 and 39 is formed integrally with an upper portion 332a of a back cover 332. The back cover 332 is coupled to the hub portion of the frame 112 and covers a back side of the hub portion. The housing 330 has an arcuate shaped ceiling 336 that extends above the upper surface 332a of the back cover 332. The ceiling 336 and the upper portion 332a of the back cover 332 define a window 334 therebetween that faces the occupants of the vehicle. The ceiling 336 has an arcuate shaped profile as viewed from the front of the steering assembly 100 (i.e., from the perspective of the operator), which is shown in FIGS. 38-39. The ceiling 336 defines a chamber below. In some implementations, a transparent (or translucent) lens 339 is disposed within the window 336 to seal the window from debris entering the housing 330 through the window 334. However, in other implementations, the lens 339 is not provided, and the light guide 308 is disposed against the window 336 to seal the window from debris entering the housing 330. Furthermore, a light diffusing film may be disposed on the outer surface of the light guide 308.

The light guide 308 is an arcuate shaped light guide similar to light guide 208 described above. At least a portion of the first surface 342 of the light guide 308 is disposed within the channel 329 and abuts the arcuate shaped support surface 325. The radius of curvature of the first surface 342 of the light guide 308 is the same as the radius of curvature of the support surface 325. At least a portion of the first 344 and second ends 346 of the light guide 308 are disposed between the sidewalls 326 and 328 of the base 320. In the implementation shown, a width of the channel 329 $W_C$ is similar to a width $W_L$ of the light guide 308 to hold the light guide 308 within the channel 329 using a friction fit.

Once coupled to the base 320, the second surface 343 of the light guide 308 is urged into the chamber toward the ceiling 336 of the upper portion 332a of the back cover 332. The openings 323 defined in the second sidewall 324 are aligned with openings defined in the housing 330, and a fastener is engaged through each aligned set of openings to couple the base 320 to the housing 330 with the light guide 308 disposed between them. FIG. 39 illustrates the base 320 coupled to the housing 330.

Figure 37:
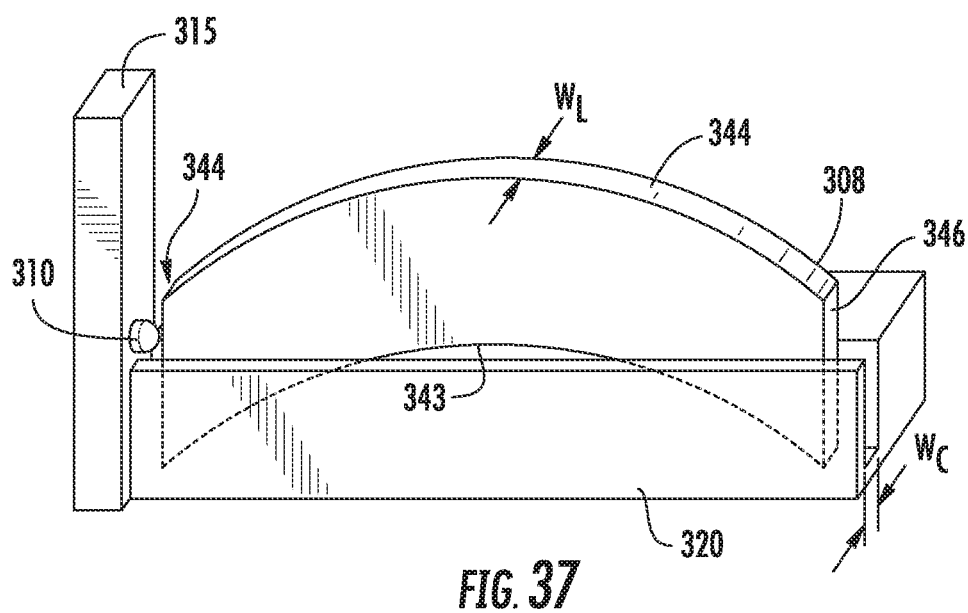
FIG. 37 is a front perspective view of the base of FIG. 35 with a PCB and LED and a light guide, according to one implementation.

In the implementation shown in FIG. 37, the light source 310 is an LED coupled to a PCB 315, such as is described above in relation to FIGS. 15-20, 24-25, and 28-34. The PCB 315 is coupled to the hub portion of the frame 112 such that the LED 310 coupled to the PCB 315 emits light into the first end 344 of the light guide 308. In the implementation shown in FIG. 37, the LED 310 is a top-firing LED, but in other implementations, the LED may be a side-firing LED, and the PCB 315 would be arranged to accommodate the side-firing LED emitting light into the end of the light guide 308. In addition, the PCB 315 may be thermally coupled to the frame 112, as is described above, to transfer heat generated by the LED away from the LED and PCB toward the frame. Furthermore, more than one LED may be coupled to the PCB for emitting light into the first end 344. And, although the implementation shown in FIGS. 35-39, illustrates one PCB 315 and one LED 310 adjacent the first end 344 of the light guide 308, other implementations may include a second LED coupled to a second PCB and disposed adjacent a second end 346 of the light guide 308 to emit light toward the second end 346.

The LED may include an IR LED or a visible light LED (e.g., a single or multi-color LED). For example, if the illumination system 304 is used to illuminate the interior of a vehicle for an occupant monitoring system, the LED 310 includes an IR LED. However, if the illumination system 304 is used to communicate with occupants of the vehicle, the LED 310 includes a visible light LED. In some implementations, which are described in detail below in relation to FIGS. 38-39, visible and IR LEDs may be used to illuminate the light guide 308 together. And, in other implementations, the light source may include other suitable light sources other than LEDs, such as those described above. In addition, although the light guide 308 shown in FIGS. 35-39 is arcuate shaped similar to light guide 208 described in relation to FIGS. 15-34, the shaped of the light guide 308 may be selected based on the housing in which the light guide 308 is to be disposed, according to other implementations. For example, if the housing has a rectangular or trapezoidal shaped ceiling, the second surface of the light guide may have a rectangular or trapezoidal shape. In addition, although the base 320 is described as including an arcuate shaped support surface 325, in other implementations, the arcuate shaped support surface 325 may not be included, and the second surface 342 of the light guide 308 be straight and fit within the channel 329 of the base 320.

Furthermore, light directing films, such as any of those described above may be disposed between the outer surface of the light guide and the inner surface of the outer lens.

FIGS. 40-47 illustrate another implementation of an illumination system 804. In this implementation, the first base sidewall 826 of the base 820 is transparent or translucent and extends between the light guide 808 and the window 834, instead of ending at or below a lower edge of the window as in the implementation shown in FIGS. 35-39. In addition, in this implementation of the illumination system 804, the PCB 815 is coupled to the base 820, the housing 830 is separately formed from the back cover 332, and the housing 830 and base 820 are coupled together by clips or other fastening mechanisms.

In some implementations, at least one area 826a of the first base sidewall 826 that extends between the light guide 808 and the window 834 may include one or more light altering films to change the properties of or mask the light emitted from the light guide 808. For example, the first base sidewall 826 may include a light masking film in one or more areas 826*a* to prevent light from the light guide 808 from being emitted from those areas. In other examples, the first base sidewall 826 may include a light diffusing film in one or more areas 826*a* to diffuse the light being emitted from the light guide 808 in those areas 826*a*.

The second base sidewall 828 may be transparent, translucent, or opaque. In addition, the second base sidewall 828 may also include a light reflecting film disposed on at least a portion of the second sidewall 828 facing the channel 829 defined between the first 826 and second sidewalls 828 to reflect light emitted from the light guide 808 toward the first base sidewall 826 and the window 834. A second edge 824 (e.g., upper edge) of the second base sidewall 828 has a similar profile shape as a second edge 836 (e.g., upper edge) of the first base sidewall 826. In addition, second edges 824, 836 have a similar profile shape as a second edge 843 of the light guide 808. However, in other implementations, the second edges 824 and 836 may be different than the second edge 843 of the light guide 808 and/or each other. For example, the second edges 824 and 836 may be shaped to correspond to a ceiling 876 of the housing 830 such that the second edges 824, 836 abut the ceiling 876.

A coupling plate 850 extends from the second base sidewall 828 in a plane that is transverse to a plane in which the second base sidewall 828 extends and in a direction away from the first 826 and second base sidewalls 828. In the implementation shown, the coupling plate 850 extends from a first edge 822 (e.g., a lower edge) of the second base sidewall 828. The coupling plate 850 defines a plurality of openings 852 and/or recesses 854. One or more of the openings 852 and/or recesses 854 receive clips and/or protrusions that extend from an interior surface 877 of the housing 830 to couple the base 820 with the housing 830. In addition, in some implementations, one or more of the openings 852 and/or recesses 854 may engage clips and/or protrusions that extend from an interior surface of the back cover 332 for coupling the base 820 and housing 830 with the back cover 332. In other implementations, the coupling plate 850 may extend between the first edge 822 and the second edge 824 of the second base sidewall 828.

The PCB 815 is coupled to one end 840 of the base 820, and one or more LEDs 810 coupled to the PCB 815 emit light into the first end 844 of the light guide 808. An electrical connector 816 may be coupled to the PCB 815 for electrically coupling the PCB 815 with one or more other vehicle systems.

The housing 830 includes ceiling 876 that extends from an outer side 883 of the housing 830 to an inner side 884 of the housing 830, a window bar 878 that extends between each end of the housing 830 across the outer side 883 of the housing 830, an inner surface 877 that extends from the inner side 884 of the housing 830, and tabs 880 that extend from the inner surface 877 in a direction toward the window bar 878. The ceiling 876 is arcuate shaped as viewed from the side to blend into the outer surface of the back cover 332. The housing 830 also includes a stop surface 882 along the inner side 884. The window bar 878 and the edge of the ceiling 876 adjacent the outer side 883 of the housing 830 define the window 834 through which light from the illumination system 804 is emitted. In addition, an opening 885 is defined between the window bar 878 and the inner surface 877.

To assemble the illumination system base 820, light guide 808, and housing 830 with the back cover 332 of the steering assembly, the light guide 808 is received in the channel 829 of the base 820 such that end 844 of the light guide 808 is adjacent the one or more LEDs 810 on the PCB 815. The base 820 is then inserted into an opening defined in the back cover 332 such that a peripheral edge of the coupling plate 850 abuts an inner surface of the back cover 332 and the portion 826*a* of the first base sidewall extends through the opening. To align the base 820 with the inner surface of the back cover 332, the recesses 854 are aligned with protrusions extending from the back cover. The housing 830 is then urged over the base 820 such that the portion 826*a* of the base 820 extends through the opening 885 and the ceiling 876 of the housing 830 and the window 834 defined by the housing 830 extend above the opening in the back cover 332. Tabs 880 of the housing are engaged with the openings 852 in the coupling plate 850 to couple the housing 830 with the base 820. And, the window bar 878 and the stop surface 882 abut edges of the opening defined in the back cover 332. However, in other implementations, one or more tabs extend from the second sidewall of the base, and the inner surface of the housing defines openings that receive the tabs.

In other implementations, the housing may be integrally formed with the back cover, and the base 820 may be coupled with the housing using tabs that extend from an inner surface of the back cover, such as is described above with respect to FIGS. 40-47. In other implementations, the housing, whether separately or integrally formed with the back cover, may be coupled to the base using other suitable fastening mechanisms, such as screws, rivets, adhesive, clips, etc.

In addition, in some implementations, the light guide includes two or more separate light guide segments that can be separately or simultaneously illuminated. For example, as shown in FIGS. 48-62, the illumination system 904 includes an inner base 920*a*, an outer base 920*b*, a first light guide segment 908*a*, a second light guide segment 908*b*, and a third light guide segment 908*c*.

The inner base 920*a* includes a first surface 922, a second surface 921, a first end 960, a second end 961, and an outer surface 923. The second surface 921 is arcuate shaped and extends between each end 960, 961, but the second surface 921 can be any shape that can be received within housing 930, which is similar to the housing 330 described above in relation to FIGS. 38 and 39. The first surface 922 extends between the ends 960, 961 and is spaced apart from the second surface 921. The first surface 922 is planar, but the first surface 922 can be any shape that can be received within housing 930. The outer surface 923, which extends between the second surface 921 and the first surface 922 and the first 960 and second ends 961, defines a support surface 925 and a recess 927. The support surface 925 is in a plane spaced apart between the second surface 921 and the first surface 922 and extends between first 960 and second ends 961. The recess 927 is defined along a portion of the first surface 922 and the outer surface 923 wherein the surfaces 922, 923 intersect, and PCB recesses 962*a*, 962*b*, 962*c* are defined at ends 960, 961.

The outer base 920*b* has planar outer 931 and inner surfaces 932 that extend between first surface 934 and second surface 933 of the outer base 920*b*. A tab 935 extends from the first surface 934 along a plane transverse to the inner surface 932, away from the outer 931 and inner surfaces 932. The outer base 920*b* also includes first 936 and second ends 937 that extend between the second surface 933 and the first surface 934, and each end 936, 937 defines an opening 938, 939, respectively.

A first surface 955 of the third light guide segment 908c is disposed on the support surface 925 of the inner base 920a. Inner surfaces 947a, 947b of first 908a and second light guide segments 908b, respectively, are disposed against a portion of the outer surface 948c of the third light guide segment 908c. A first end 944a of the first light guide segment 908a is disposed adjacent the first end 960 of the inner base 920a, and a second end 945b of the second light guide segment 908b is disposed adjacent the second end 961 of the inner base 920a. A second end 945a of the first light guide segment 908a and a first end 944b of the second light guide segment 908b abut each other adjacent an intermediate portion 975 of the inner base 920a. An interface between first end 944b of the second light guide segment 908b and the second end 945a of the first light guide segment 908a includes a light blocking film to prevent light from each segment 908a, 908b from entering the other segment. And, an interface between the portion of the outer surface 948c of the third light guide segment 908c and the inner surfaces 947a, 947b of the first 908a and second light guide segments 908b includes a light blocking film to prevent light from each segment 908a, 908b, 908c from entering the other segments. In other implementations, the interfaces may include other suitable materials for blocking light.

In addition, a transparent lens 940 is disposed on the second surfaces 941a, 941b of the first 908a and second light guide segments 908b, respectively. The lens 940 has a second surface 956 that extends to the second surface 941c of the third light guide segment 908c. A light blocking film is disposed along the interface of the lens 940 and the second surfaces 941a, 941b of the first 908a and second light guide segments 908b to prevent light from these segments 908a, 908b from passing into the lens 940. The light from the third light guide segment 908c is emitted through the lens 940. The lens 940 gives the illumination system 904 a flush appearance. In other implementations, the lens 940 may be translucent or not included.

A first LED 910a and associated PCB 915a are disposed adjacent the first end 944a of the first light guide segment 908a. A second LED 910b and associated PCB 915b are disposed adjacent the second end 945b of the second light guide segment 908b. And, a third LED 910c and associated PCB 915c are disposed adjacent the first 944c and/or second end 945c of the third light guide segment 908c. This arrangement allows the different segments to be illuminated individually or in combination with two or more segments. The PCBs 915a, 915b, 915c are engaged into PCB recesses 962a, 962b, 962c, respectively, defined in the inner base 920a.

The inner surface 932 of the outer base 920b is disposed over a portion of the first 908a and second light guide segments 908b. The tab 935 of the outer base 920b extends into and engages the recess 927 of the inner base 920a with an interference fit, which couples the inner base 920a and the outer base 920b and prevents the light guide segments 908a, 908b, 908c from moving relative to each other.

The second surfaces 941a, 941b, 941c of the light guide segments 908a, 90b, 908c, respectively, and the lens 940 of the assembled illumination system 904 are extended into an opening defined by the back cover 332 such that portions of the light guide segments 908a, 908b, 908c above the outer base 920b are within the window 934 defined by the back cover 932 and housing 930. The illumination system 904 may be coupled to the housing 930 and back cover 932 by any suitable fastening mechanism, such as screws, rivets, adhesive, clips, tabs, interference fits, etc.

In some implementations, each opening 938, 939 defined by the outer base 920b aligns with openings 951, 952 defined in an outer plate 950 coupled to the back cover 932 below the housing 930 and window 934. In this implementation, the outer plate 950 is integrally formed with the back cover 932, but in other implementations, the outer plate 950 is separately formed and coupled to the back cover 932. Aligned openings 951, 952 of the outer plate 950 and the openings 938, 939 of the outer base 920b receive fasteners that couple the illumination system 904 with the back cover 932.

Figure 60:
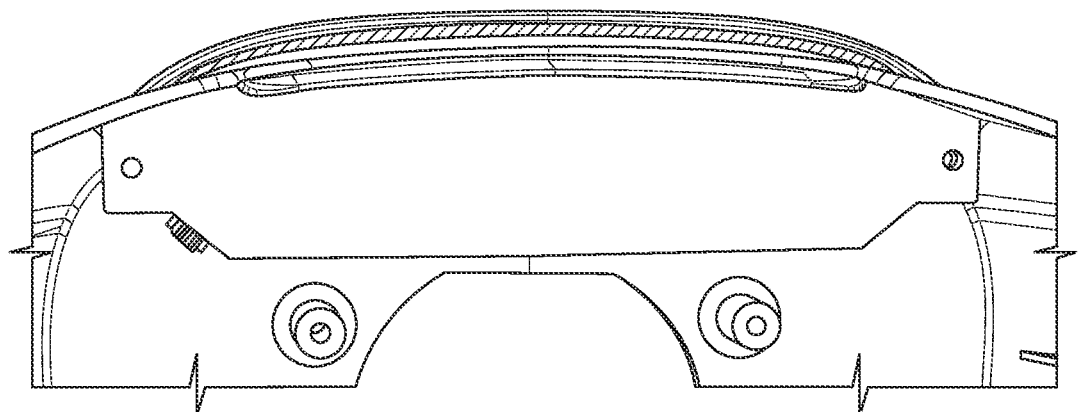
FIG. 60 illustrates a partial front view of the steering assembly with the illumination system of FIG. 48 coupled thereto and the third light guide segment illuminated.
Figure 61:
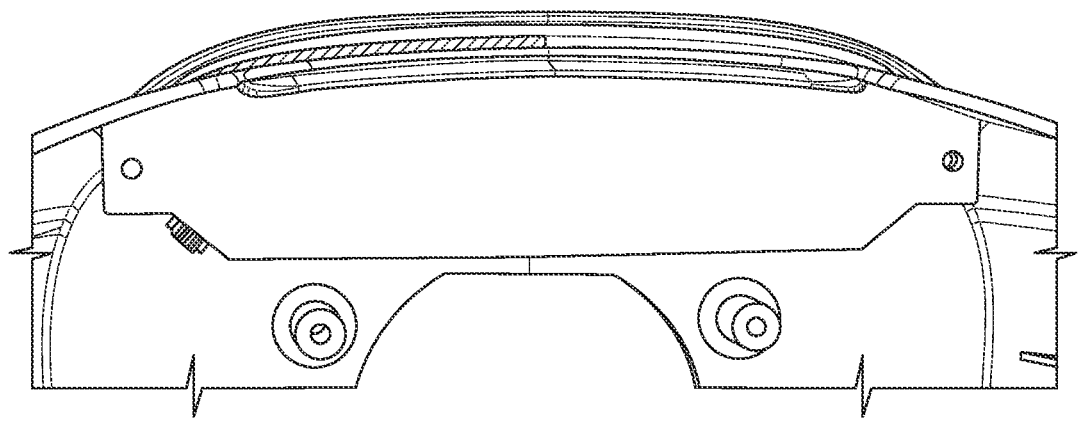
FIG. 61 illustrates a partial front view of the steering assembly with the illumination system of FIG. 48 coupled thereto and the first light guide segment illuminated.
Figure 62:
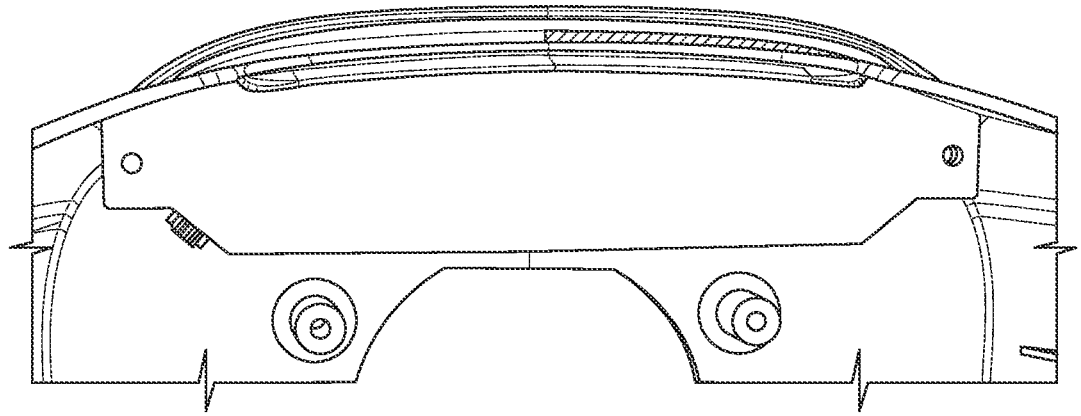
FIG. 62 illustrates a partial front view of the steering assembly with the illumination system of FIG. 48 coupled thereto and the second light guide segment illuminated.

FIG. 60 shows the third light guide segment 908c illuminated but the first 908a and second light guide segments 908b not illuminated. FIG. 61 shows the first light guide segment 908a illuminated but the third 908c and second light guide segments 908b not illuminated. And, FIG. 62 shows the second light guide segment 908b illuminated but the third 908c and first light guide segments 908a not illuminated.

The above described implementations of illumination systems in relation to FIGS. 35-62 are coupled to the back cover of the hub portion of the steering assembly 100. However, in other implementations, the illumination systems may be adapted for coupling to another portion of the hub portion (e.g., air bag cover), the spoke portion, or the rim portion of the steering assembly 100.

In addition, although three light guide segments were described in relation to FIGS. 48-62, two or more light guide segments may be used in the illumination system.

In some implementations in which the housing and base are coupled to a non-rigid surface of the steering assembly, such as a foam surface that is overmolded around a portion of the frame of the steering assembly, a stiff spreader plate or washers may be disposed between engaging surface(s) of the illumination system and the foam to prevent the foam from interfering with the engaging surface(s) of the illumination system.

In some implementations, the illumination systems described above cause the light bars to emit visible light through at least a portion of the light bars in response to receiving an audio signal from one or more microphones disposed within the vehicle cabin and/or to indicate that one or more vehicle communication systems are actively listening for audio input from the vehicle cabin. In some implementations, a first microphone disposed in the cabin is configured for receiving an audio signal, and a second microphone disposed in the cabin is configured for receiving background noise, or vice versa. The signals from the microphones may be communicated to the vehicle communication system, and the background noise signal may be used to effect noise cancellation for the audio signal received.

While the foregoing description and drawings represent the preferred implementation of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In addition, features described herein may be used singularly or in combination with other features. The presently disclosed implementations are, therefore, to be considered in all respects as illustrative and not restrictive, the scope of the invention being indicated by the appended claims and not limited to the foregoing description.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention, as defined by the following claims.

What is claimed is:

1. An illumination system within a vehicle, the illumination system comprising:
   a light guide having an outer surface and an inner surface that extend between a first end and a second end of the light guide;
   at least one visible light source disposed adjacent the first end of the light guide, the light source emitting visible light into the first end of the light guide; and
   a lens having an inner surface and an outer surface, the inner surface of the lens being disposed adjacent the outer surface of the light guide, and the outer surface of the lens being covered by an opaque cover, the opaque cover defining transparent and/or translucent portions,
   wherein the light guide transmits visible light from the visible light source through at least a portion of the outer surface of the light guide, and the light from the outer surface of the light guide passes through the lens and the transparent and/or translucent portions of the opaque cover.

2. The illumination system of claim 1, wherein the illumination system is coupled to a rim of a steering assembly, and the opaque cover matches an outer cover around the rim.

3. The illumination system of claim 2, wherein the light guide and lens have an arcuate shape corresponding to a radius of curvature of the rim of a steering assembly.

4. The illumination system of claim 2, wherein the outer surface of the lens includes a curvature corresponding to a curvature of a portion of the rim adjacent to the lens.

5. The illumination system of claim 4, wherein the inner surface of the lens has a curvature corresponding to the curvature of the outer surface of the lens and the curvature of the portion of the rim adjacent to the lens,
   wherein the inner surface and outer surface of the lens form an arcuate shape as viewed from a cross section of the lens as viewed from a plane that bisects the inner and outer surface.

6. The illumination system of claim 1, wherein the opaque cover is leather, and the transparent and/or translucent portions are perforations defined in the opaque cover.

7. The illumination system of claim 6, wherein a width or diameter of the perforations ranges between 0.2 mm and 4.75 mm.

8. The illumination system of claim 6, wherein a diameter of the perforations at a location adjacent a midline of the light guide is greater than a diameter of the perforations at a location adjacent the first end of the light guide.

9. The illumination system of claim 6, wherein the perforations are filled with a transparent or translucent material.

10. The illumination system of claim 6, wherein a spacing density between adjacent perforations increases from a location adjacent the first end of the light guide toward a location adjacent the midline of the light guide.

11. The illumination system of claim 1, wherein the light source is a visible light emitting diode (LED).

12. The illumination system of claim 1, wherein the light source comprises a first visible LED adjacent the first end of the light guide and a second visible LED adjacent the second end of the light guide.

13. The illumination system of claim 1, wherein the first visible LED emits a first color of light, and the second visible LED emits a second color of light.

14. The illumination system of claim 13, wherein the first and second color are the same.

15. The illumination system of claim 13, wherein the first and second color are different.

16. The illumination system of claim 1, wherein the outer and inner surfaces of the light guide are arcuate-shaped between the ends of the light guide and spaced apart and opposite each other relative to a plane that extends through the first and second ends of the light guide and is parallel to the outer and inner surfaces of the light guide.

17. The illumination system of claim 16, wherein the lens has a first end and a second end, and the outer and inner surfaces of the lens are arcuate-shaped between the ends of the lens as viewed from a first plane that extends through each end and as viewed from a second plane that extends perpendicular to the outer and inner surfaces of the lens.

18. The illumination system of claim 1, wherein the opaque cover is an opaque coating on the lens, and the transparent and/or translucent portions are etched from the opaque coating.

19. The illumination system of claim 1, wherein the light guide comprises two or more light guide segments, the two or more light guide segments being separately formed, and wherein the at least one light source comprises two or more light sources, each light source being disposed adjacent an end of the respective light guide segment, the light sources being separately controllable for illuminating separately or simultaneously.

20. The illumination system of claim 19, wherein adjacent surfaces of the light guide segments abut each other at an interface and the interface comprises a light blocking material for preventing light from the segments from being emitted into the adjacent segments.

21. The illumination system of claim 1 further comprising:
   at least one infrared (IR) light source disposed adjacent the light guide, the IR light source emitting IR light into the light guide,
   wherein the light guide transmits IR light from the IR light source through at least a portion of the outer surface of the light guide,
   wherein the lens includes an infrared transmissive portion that allows the passage of IR light through it and does not allow the passage of visible light.

* * * * *